(12) United States Patent
Muranaka et al.

(10) Patent No.: US 7,878,411 B2
(45) Date of Patent: Feb. 1, 2011

(54) WHEEL BEARING DEVICE AND ITS QUALITY MANAGEMENT METHOD

(75) Inventors: Masahiro Muranaka, Iwata (JP); Hiroaki Itakura, Iwata (JP); Shinji Morita, Iwata (JP); Yoshiaki Kuchiki, Iwata (JP)

(73) Assignee: NTN Corporation, Osaka (JP)

( * ) Notice: Subject to any disclaimer, the term of this patent is extended or adjusted under 35 U.S.C. 154(b) by 1000 days.

(21) Appl. No.: 11/658,725

(22) PCT Filed: Jul. 25, 2005

(86) PCT No.: PCT/JP2005/013557

§ 371 (c)(1),
(2), (4) Date: Jan. 29, 2007

(87) PCT Pub. No.: WO2006/011438

PCT Pub. Date: Feb. 2, 2006

(65) Prior Publication Data

US 2008/0317397 A1    Dec. 25, 2008

(30) Foreign Application Priority Data

Jul. 29, 2004 (JP) .............................. 2004-221168
Jul. 30, 2004 (JP) .............................. 2004-222912
Aug. 6, 2004 (JP) .............................. 2004-230333

(51) Int. Cl.
*G06K 21/00* (2006.01)

(52) U.S. Cl. ...................................... 235/492; 235/387

(58) Field of Classification Search .................. 235/482, 235/385, 487, 492, 386, 382; 384/448; 324/136, 324/150
See application file for complete search history.

(56) References Cited

U.S. PATENT DOCUMENTS 6,471,407 B1   10/2002  Katano
(Continued)

FOREIGN PATENT DOCUMENTS

CN   1424212   6/2003
(Continued)

OTHER PUBLICATIONS

International Search Report for PCT/JP2005/013557 mailed Nov. 1, 2005 (2 pages).
(Continued)

*Primary Examiner*—Daniel St. Cyr
(74) *Attorney, Agent, or Firm*—Osha Liang LLP

(57) ABSTRACT

To provide a wheel support bearing device, in which the status of actual use is detected and stored as a history, an IC tag (9) capable of a contactless communication is affixed to the wheel support bearing device. This IC tag (9) is rendered to be a sensor incorporated IC tag integrated with or electrically connected with a sensor for detecting an object to be detected of the wheel support bearing device and a detection of the sensor is inputted through an input channel separate from a channel for the contactless communication. The sensor referred to above may be, for example, a coil and a magnet (10) capable of passing in the vicinity of the sensor incorporated IC tag (9) by the effect of a relative rotation.

35 Claims, 32 Drawing Sheets

U.S. PATENT DOCUMENTS

| | | | |
|---|---|---|---|
| 6,501,382 | B1 | 12/2002 | Rehfus et al. |
| 6,605,938 | B1 | 8/2003 | Sentoku et al. |
| 6,695,483 | B2 * | 2/2004 | Sakatani et al. ............. 384/448 |
| 7,534,045 | B2 * | 5/2009 | Nakajima et al. ........... 384/448 |
| 2003/0030565 | A1 | 2/2003 | Sakatani et al. |
| 2003/0048962 | A1 | 3/2003 | Sato et al. |
| 2003/0110860 | A1 | 6/2003 | Okada |
| 2003/0218548 | A1 | 11/2003 | Sato et al. |

FOREIGN PATENT DOCUMENTS

| | | |
|---|---|---|
| CN | 1514989 | 7/2004 |
| JP | 11-255224 | 9/1999 |
| JP | 2000-346858 | 12/2000 |
| JP | 2002-49900 | 2/2002 |
| JP | 2002-169858 | 6/2002 |
| JP | 2002-227863 | 8/2002 |
| JP | 2002-306833 | 10/2002 |
| JP | 2002-536726 | 10/2002 |
| JP | 2003-22492 | 1/2003 |
| JP | 2003-186519 | 7/2003 |
| JP | 2003-232345 | 8/2003 |
| JP | 2003-246201 | 9/2003 |
| JP | 2003-271216 | 9/2003 |
| JP | 2004-142577 | 5/2004 |
| JP | 2004-203209 | 7/2004 |
| JP | 2005-353026 | 12/2005 |
| WO | WO-00/45324 | 8/2000 |
| WO | WO-02/101675 | 12/2002 |

OTHER PUBLICATIONS

Patent Abstracts of Japan 2004-142577 dated May 20, 2004 (1 page).
Patent Abstracts of Japan 2003-022492 dated Jan. 24, 2003 (2 pages).
Patent Abstracts of Japan 2003-246201 dated Sep. 2, 2003 (1 page).
Patent Abstracts of Japan 2003-232345 dated Aug. 22, 2003 (1 page).
Patent Abstracts of Japan 2002-306833 dated Oct. 22, 2002 (1 page).
Patent Abstracts of Japan 2002-049900 dated Feb. 15, 2002 (2 pages).
Patent Abstracts of Japan 2002-169858 dated Jun. 14, 2002 (1 page).
Patent Abstracts of Japan 2001-021577 dated Jan. 26, 2001 (1 page); also known as Japanese Application No. 11-196957).
Patent Abstracts of Japan 2005-353026 dated Dec. 22, 2005 (2 pages).
Japanese Notification of Reasons for Rejection for Application No. 2004-221168, mailed on Jan. 12, 2010 (4 pages).
Extended European Search Report for Application No. 05761713.6-2424, mailed on Jan. 20, 2010 (6 pages).
Chinese Office Action for Chinese Application No. 2005800254685, mailed on May 9, 2008 (4 pages).
Esp@cenet patent abstract for Chinese Publication No. 1424212, Publication date Jun. 18, 2003 (1 page).
Esp@cenet patent abstract for Chinese Publication No. 1514989, Publication date Jul. 21, 2004 (1 page).
International Search Report for International Application No. PCT/JP2005/013556, mailed on Oct. 25, 2005 (2 pages).
Patent Abstracts of Japan for Japanese Publication No. 2004-203209, Publication date Jul. 22, 2004 (1 page).
Patent Abstracts of Japan for Japanese Publication No. 2002-227863, Publication date Aug. 14, 2002 (1 page).
U.S. Office Action issued in related application with U.S. Appl. No. 11/658,777, mailed on Jun. 14, 2010, 17 pages.
Japanese Notification of Reasons for Rejections in related patent application No. 2004-230333, dated Jun. 1, 2010, and English translation thereof, 6 pages.
Patent Abstracts of Japan for patent application with Publication No. 2003-271216, Publication Date: Sep. 26, 2003, 1 page.
Patent Abstracts of Japan for patent application with Publication No. 11-255224, Publication Date: Sep. 21, 1999, 1 page.
Patent Abtstracts of Japan for patent application with Publication No. 2003-186519, Publication Date: Jul. 4, 2003, 1 page.
Notice of Allowance in related patent application with U.S. Appl. No. 11/658,777, mailed Oct. 26, 2010, 10 pages.
Notification of Reason(s) for Rejection for Japanese Patent Application No. 2004-222912, Dated Sep. 14, 2010, and English translation thereof, 7 pages.
Patent Abstracts of Japan for patent applications with publication No. 2000-346858, Publication Date: Dec. 15, 2000, 1 page.

* cited by examiner

Fig. 29A
Forging
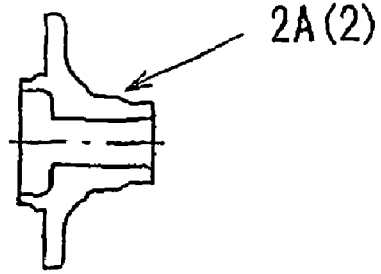
Fig. 29B
IC Tag Affixation
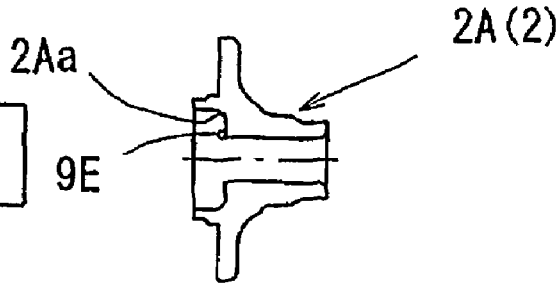
Fig. 29C
Turning
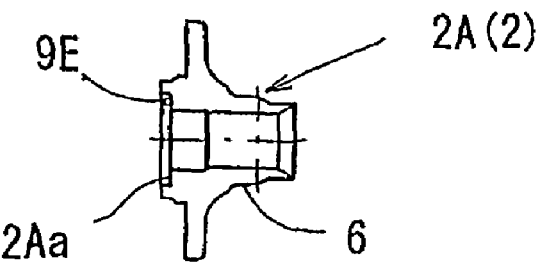
Fig. 29D
Induction Heat Treatment
Fig. 29E
Grinding (Superfinishing)
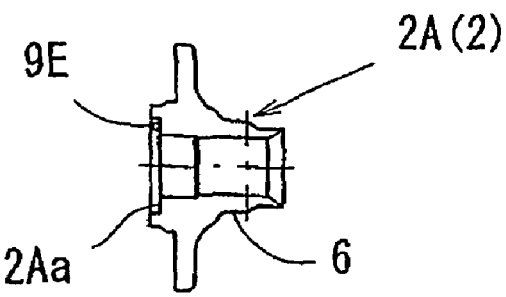

WHEEL BEARING DEVICE AND ITS QUALITY MANAGEMENT METHOD

BACKGROUND OF THE INVENTION

The present invention relates to a wheel support bearing device equipped with an IC tag and a sensor and a method of controlling the quality of the wheel support bearing for enabling a control thereof with the use of the IC tag to facilitate the traceability and to ease a response to the regular servicing.

The IC tag adopting the RFID (Radio Frequency Identification) capable of contactless communication is being compactized and comes to be largely employed in the distribution of articles. Also, in recent years, demands for the traceability, that is, demands for the capability of pursuing the history, applicability and/or whereabouts of an object of interest are increasing, and the system has been suggested, in which ID codes and/or information associated therewith are stored in IC tags affixed to various machine component parts such as, for example, gears so that they can be managed. (See, for example, the Japanese Laid-open Patent Publication No. 2002-049900.)

Also, designing the wheel support bearing device to be intelligent with a rotation sensor and any other various sensors mounted on such wheel support bearing device is suggested. (See, for example, the Japanese Laid-open Patent Publication No. 2001-021577.)

Even in the wheel support bearing device, demands for the traceability is increasing and, as an advance of the conventional forms control and computer-based controls, the wheel support bearing device having an IC tag affixed thereto has been suggested additionally. (See, for example, the Japanese Patent Application No. 2004-206900 (the Japanese Laid-open Patent Publication No. 2005-353026).) However, even though the IC tag is merely affixed, it is used only for the control of, for example, identification information, manufacturing information and distribution information and the status of actual use of the wheel support bearing device cannot be stored.

If the status of actual use can be found out, it appears to be useful for the regular servicing, calculation of the service life left available, further improvement and so on.

Detection of the status of actual use can be achieved by providing the wheel support bearing device with a sensor. However, in any suggested examples of the sensor incorporated wheel support bearing devices, the current status is detected for use in various controls of an automotive vehicle and none of them has a function of storing a result of detection as a history.

On the other hand, in automotive vehicles, even though they fall within the same vehicle family, no control is performed as to when each of the bearings such as wheel support bearings is manufactured at what factory and/or as to the manufacturer's serial number of the bearings.

Also, as hereinbefore discussed, in recent years, demands for the traceability, that is, demands for the capability of tracing the history, application and/or whereabouts of an object of interest are increasing. As for the quality control of mechanical elemental components of, for example, bearings, the manufacturing history including, for example, qualities of various process steps (purchase of materials, a forging step, a heat treatment step, a grinding step and so on) ranging from purchase of material to completion of manufacture and lot numbers is desired to be discernible on one-by-one basis with each of the mechanical elemental components or by lots.

In automotive vehicles, in the case of general components, the control on a lot basis is employed and sampling inspection is performed by lots and, therefore, the manufacturing history for each lot is desired. If the manufacturing history is discernible, countermeasures such as, for example, future improvements can be easily taken and diagnosis of the service life can be eased. Also, determination of contamination of analogous articles can be facilitated. In the case of specialty components, individual inspection is carried out and the history of manufacture is desired to be discernable on a one-by-one basis.

As a quality control method capable of clarifying such a manufacturing history, information generated during each manufacturing step has hitherto been recorded in forms or inputted to a terminal for a database.

On the other hand, the use of IC tags in the distribution control and/or the stock control is increasing and even in the manufacture of products such as, for example, automotive vehicles, the control from a stage of manufacture to a stage of disposal with the use of IC tags has been suggested. (See, for example, the Japanese Laid-open Patent Publication No. 2002-169858.) Since the IC tag is capable of recording and/or reading information on a non-contact basis and has a large storage capacity, a high degree control is expected.

In the wheel support bearing device, discrimination is possible if the identification information such as the manufacturer's serial number of the bearing is available. Also, it can be identified from the manufacturer's serial number indicated in an imprint made on the wheel support bearing or from information on the date of manufacture and/or the place of manufacture.

However, indication of the manufacturer's serial number, the date of manufacture and the place of manufacture shown by the imprint on the wheel support bearing cannot be discernible unless the bearing is removed from a member that defines a bearing housing. Because of this, disassembling and reassembling require a substantial amount of labor. In general, however, the information such as, for example, the manufacturer's serial number is ascertained when and after the wheel support bearing has been removed, resulting in expenditure of a substantial labor and cost.

Also, with the suggested conventional quality control method utilizing the IC tags, various information concerning the mechanical elemental components is directly recorded in the IC tag affixed to each of those mechanical elemental component, or identification information is recorded in the IC tag, and the material, the lot control information and various history data and so on of each mechanical elemental component can be apprehended by making reference to the database. However, it often occurs that only with the above described information concerning the mechanical elemental components, a technical phenomenon occurring in the mechanical elemental component cannot be revealed. By way of example, depending on the difference in processing condition employed in the manufacturing steps, a difference may occur in quality, and such difference resulting from the difference in processing condition may not be often recognized from a result of examination.

The wheel support bearing is made up of a plurality of elemental components and, even though the result of examination or the like of the wheel support bearing itself after the latter has been assembled is known, inconveniences resulting from the difference in quality of the individual elemental components cannot be identified. In the case of the wheel support bearing, which is a mechanical elemental component having rolling elements, even the slightest difference in material and/or precision may result in a large difference in performance as the wheel support bearing and, therefore, the suggested conventional quality control method utilizing the IC tags can hardly work out satisfactorily.

Also, even in the process control, with the conventional control method, in which for each process step records are written down in a book and/or inputted in a terminal, recording and inputting require a substantial amount of labor and, therefore, it is difficult to record in details a number of pieces of information. In particular, in the case of what has been assembled with a plurality of elemental components such as observed in the wheel support bearing and in which each of the elemental components is produced by lots for each process step after having passed through a process ranging from purchase of materials to a grinding step by way of a forging step and then a heat treatment step, the control in the manufacturing process of each of the elemental components is complicated and a substantial amount of labor is required in accomplishing manual recording of the information and inputting operation. Because of this, it is difficult to meet with the demands for the detailed history information on the wheel support bearing and, also, the control requires a substantial amount of cost.

In view of the foregoing, the application of the IC tags has been contemplated, but the control such as used in connection with automotive vehicles themselves cannot be applied to the wheel support bearings. In the case of the example suggested in the previously mentioned patent document (the Japanese Laid-open Patent Publication No. 2002-169858), the IC tag is affixed to an automotive vehicle, which is an article of manufacture that becomes an object to be controlled, and information on each of various manufacturing steps is recorded. The IC tag is affixed to a frame or the like. However, in the case of the wheel support bearing, which is a rolling bearing, since there is no elemental component which is complete and criterial such as the frame or the like in the automotive vehicle and, in the manufacturing process, each elemental component is manufactured through the forging and heat treatment steps, it is difficult to secure the IC tag to the wheel support bearing. Also, in the case of the wheel support bearing, which is a rolling bearing, since the inner race, outer race, rolling elements, the hub and so on are individually controlled at each stage of the manufacturing process including purchase of materials, the forging step, the heat treatment step, the grinding step and son on, the application of the IC tag to the quality control poses a problem of how it should specifically be used and, therefore, the efficient application of the IC tag is difficult to achieve.

SUMMARY OF THE INVENTION

A primary object of the present invention is to provide a wheel support bearing device, in which information can be recorded.

Another object of the present invention is to provide a quality control method for the wheel support bearing, in which manufacturing history can be readily apprehended with no need to dismantle the bearing and which can cope quickly and properly with the regular servicing or the like.

The wheel support bearing device according to a first aspect of the present invention includes an IC tag affixed to a wheel support bearing, which IC tag is capable of conducting a contactless communication and capable of storing information concerning a control or a status of use. The information concerning the control referred to above is intended to encompass all information associated with a quality including manufacture, material and examination. The status of use referred to above is intended to encompass all condition of use that affects on the service life of the wheel support bearing device such as, for example, the total number of revolutions, temperature, and torque.

According to this construction, when the IC tag is affixed to the wheel support bearing, it is possible to record the information concerning the control of the wheel support bearing and the status of use thereof and, also, to read such information on a non-contact basis, thereby facilitating identification and other control of the wheel support bearing.

In a preferred embodiment of the present invention, in the wheel support bearing device for rotatably supporting a wheel relative to an automotive vehicle body, which includes an outer member having an inner periphery formed with double rows of rolling surfaces, an inner member having rolling surfaces opposed to the rolling surfaces, and double rows of rolling elements interposed between the opposed rolling surfaces of the outer and inner members, the IC tag capable of undergoing a contactless communication is fitted and is a sensor incorporated IC tag integrated with or electrically connected with a sensor for detecting an object to be detected of the wheel support bearing device, and is inputted with a detection signal of the sensor through an input channel separate from a contactless communicating channel.

According to this construction, since the sensor incorporated IC tag is affixed to the wheel support bearing and a detection signal of the sensor is inputted through an input channel separate from a contactless communication channel, the status of use detected by the sensor can be recorded in the IC tag as a history. Because of this, the history of use of the wheel support bearing device can be ascertained and can be used in, for example, a regular servicing, calculation of the remaining service life, future improvement and so on.

In the present invention, the sensor may be a coil and the sensor incorporated IC tag may be affixed to one of the outer member and the inner member while a magnet capable of moving past the sensor by a relative rotation of the inner and outer members is provided in the other of the outer member and the inner member, with the IC tag utilizing an output of the coil as an electric power source. The magnet may be provided at one location circumferentially thereof or at a plurality of equally spaced locations.

Since the coil and the magnet are provided in respective members that are rotatable relative to each other, an electromotive force can be generated in the coil during rotation. This electromotive force can be used for driving the IC tag and due to the electromotive force generated each time the magnet passes, rotation of the wheel support bearing device can be detected.

In the case of this construction, the sensor incorporated IC tag may be provided with a counting module for storing in a memory within the IC tag, a count of signals of the sensor when the magnet passes. With it, the number of actual revolutions can be recorded.

Also, the sensor incorporated IC tag may be provided with module for converting the signal of the sensor into a rotational speed when the magnet passes and for recording it in the IC tag.

By way of example, the strongness and weakness of magnetic field resulting from passage of the magnet is recorded and converted into the rotational speed. In this way, it will become possible to record a history of the number or revolutions.

Where the coil and the magnet are employed, a seal may be employed. For example, a seal may be provided for sealing an end portion of a bearing space delimited between the outer member and the inner member and, when this seal is of a combination type seal including a sealing element, fitted to one of the outer member and the inner member, and a sealing element fitted to the other of the outer member and the inner member, the sensor incorporated IC tag is affixed to one of the sealing elements and the magnet is fitted to the other of the sealing elements.

In this case, by the effect of the relative rotation of the sealing elements fitted to the inner and outer members, the number of revolutions of the wheel support bearing device can be accomplished. Since the seal is positioned at a location exposed to the outside of the wheel support bearing device, the contactless communication with the IC tag can easily be accomplished when the IC tag is affixed to the seal. Also, as compared with the case in which it is affixed to a component part such as, for example, the inner member or the outer member, which is processed through complicated steps, securement of the IC tag to the seal, which can easily be manufactured, facilitate fitting of the IC tag.

In the present invention, the sensor may be a temperature sensor.

In such case, a history of temperature inside the bearing and so on can be recorded.

In the present invention, the sensor may be a strain sensor and one of the outer member and the inner member may have a wheel mounting flange, in which case the sensor incorporated IC tag is affixed to a root portion of a wheel mounting flange of such one of the outer member and the inner member.

The root portion of the wheel mounting flange is a location exposed to a severe load condition for the wheel support bearing device. For example, where the inner member is comprised of a hub and an inner race or the like mounted on an outer periphery of the hub, the root portion of the wheel mounting flange of the hub is a location exposed to the severe load condition. Fixture of the strain sensor provided in the sensor incorporated IC tag to such location is effective to permit the magnitude of and the number of the stress received to be recorded.

In the present invention, the sensor may be a strain sensor and one of the outer member and the inner member may have a flange, to which the wheel and a brake rotor are fitted, in which case the sensor incorporated IC tag is fitted having been positioned within a range from a generally intermediate portion of the flange in a radial direction to an outer diametric end thereof.

If the strain sensor of the sensor incorporated IC tag is fitted to the outer diametric portion of the flange, to which the brake rotor is fitted, the brake judder, that is, shake of a flange surface during braking can be recorded.

In the present invention, seals may be provided for sealing respective ends of a bearing space delimited between the outer member and the inner member, in which case the sensor incorporated IC tag is arranged between the seals and the rolling surfaces and the sensor thereof is a water detecting sensor.

In the wheel support bearing device, ingress of water into the interior of the bearing is often observed, depending on the condition of use of the automotive vehicle. With the prior art bearing, it has been difficult to identify the path of ingress of water and the time of occurrence thereof. By way of example, even if deterioration of the grease takes place as a result of ingress of water, the occurrence of the water ingress cannot be identified once the water evaporates. However, if the water detecting sensor is provided in the sensor incorporated IC tag and is arranged at a location, where a path of ingress of water may be formed, the ingress of the water can be monitored and what stage the water ingresses and the number of occurrence of the water ingress can be recorded as a history and can be confirmed during inspection.

In the present invention, the sensor incorporated IC tag may be provided with an electric power supply circuit utilizing an electric power, acquired through a contactless communication of this IC tag as an electric drive power, and a sensor input processing module operable, when an electric operating power of a value higher than a predetermined value is available, to capture an input of the sensor to perform a predetermined storage process, in which case an electric power supply module for supplying an electric power to the IC tag through the contactless communication at all times or when a predetermined condition is satisfied is provided in the wheel support bearing device or an automotive vehicle, on which this wheel support bearing device is mounted.

While the sensor generally requires an electric power, the supply of the electric power can be accomplished if the electric power supply circuit of the IC tag is utilized to drive the sensor. Also, when the IC tag is provided with the sensor input processing module operable, when the electric operating power of a value higher than a predetermined value is available, to capture an input from the sensor to perform a predetermined storage operation, the output of the sensor can be stably recorded.

In the present invention, the wheel support bearing device may be for rotatably supporting a wheel relative to an automotive vehicle body and which comprises an outer member having an inner periphery formed with double rows of rolling surfaces, an inner member having rolling surfaces opposed to the rolling surfaces, and double rows of rolling elements interposed between the opposed rolling surfaces of the outer and inner members, in which a sensor unit for detecting an object to be detected of the wheel support bearing device may be fitted, the IC tag capable of accomplishing a contactless communication and having an external input terminal separate from a contactless communication channel is provided and a signal line of the sensor unit is connected with the input terminal of this IC tag.

In the case of this construction, although the IC tag is not a sensor incorporated IC tag, it is possible to use the output of the sensor for the purpose of controlling the automotive vehicle and also to leave the output of the sensor in the IC tag as a history. Because of this, the history of use of the wheel support bearing device can be confirmed during the subsequent servicing and can be used for, for example, the determination of the service line during the regular servicing.

A quality control method for a wheel support bearing according to a second aspect of the present invention utilizes the wheel support bearing device of the structure described above and a predetermined information associated with the wheel support bearing is recorded in the IC tag and controlled.

The predetermined information referred to above encompasses identifying information, information on quality control or information on the status of use.

According to this method, the manufacturing history can be simply and quickly confirmed with no need to dismantle the bearing, so that countermeasures can be quickly and properly taken during, for example, the regular servicing.

Also, the quality control method for the wheel support bearing of the present invention includes a step of fitting the IC tag to the wheel support bearing, a step of recording a predetermined information concerning the wheel support bearing on the IC tag fitted to the wheel support bearing, and a utilizing step of reading information recorded on the IC tag at any arbitrary time subsequent to shipment and confirming the predetermined information from the information read therefrom. In this method of the present invention, reading of the IC tag during the utilization step may be carried out by the use of a tag reader while the wheel support bearing is left as mounted on the automotive vehicle, and a determination of whether or not the bearing is a predetermined object to be inspected may be carried out by means of an information processing module integrated with the tab reader or an information processing module connected with the tag reader by means of a wired connection or a wireless connection.

According to this method, since the IC tag affixed to the wheel support bearing is recorded with the information on such wheel support bearing, the recorded information of the IC tag can be read out when at any arbitrary time subsequent to shipment, the tag reader is brought close to the wheel support bearing, and a predetermined information can therefore be confirmed. If the tag reader is provided with information on, for example, a range of bearings to be inspected, information on the bearing can be made available from the read-out information. Because of this, without the wheel support bearing being dismantled, the information on the bearing can be obtained and can be confirmed in situ when a servicing person visits a customer or during a period in which at a gas station oil is refilled.

The quality control method for the wheel support bearing of the present invention encompasses the following first to fifth quality control methods for the wheel support bearing.

The first quality control method for the wheel support bearing according to the present invention includes a step of fitting the IC tag to one of a plurality of elemental components, forming the wheel support bearing, to the wheel support bearing;

a step of recording on the IC tag fitted to the wheel support bearing, information concerning a manufacturing process of the wheel support bearing; and a step of reading information, recorded on the IC tag, at any arbitrary time subsequent to shipment, and confirming a predetermined information from the information read therefrom.

In the first quality control method for the wheel support bearing, of the plural elemental components, the IC tag may be fitted to a non-machine finished surface of a forged product subsequent to completion of a processing of such surface and a manufacturing information of each of manufacturing steps of the forging subsequent to the forging may be recorded during each of those manufacturing steps.

In the wheel support bearing, a member, which will become a hub, an inner race or an outer race, is generally manufactured by forging. In the forged product, portions required to meet a specific shape and/or a specific dimensional precision are turned and rolling surfaces are further ground and polished, but there are surfaces left as forged or shot blasted and not subjected to a mechanical processing such as, for example, turning. If such a forge-finished surface is utilized for securement of the IC tag and the IC tag is affixed to such surface after the forging, it is possible to write in the IC tag, information on subsequent process steps for each process step. Because of this, writing of the processing information and the manufacturing information on, for example, results of examination can be carried out efficiently.

For example, as a heat treatment step, a turning step and a grinding step are generally included in the manufacturing steps performed subsequent to the forging, the IC tag may have recorded therein a heat treatment step, a turning step and a grinding step as each of the manufacturing steps subsequent to the forging.

In the present invention, the IC tag may be fitted to a plurality of elemental components forming the wheel support bearing and a manufacturing information on each of the elemental components being fitted with the respective IC tag may be recorded in each of the IC tags. The elemental components may be a subassembly such as, for example, a sensor which is made up of a plurality of constituents.

If the manufacturing information on each of the elemental components is available, the detailed examination can be achieved during the regular examination or the examination performed when the necessity arises. To know the information on each elemental component has been difficult with the conventional control method, but it is possible when the IC tag is affixed to each elemental component. Where as described above, the IC tag is affixed to the non-mechanically processed finished surface of the forged product, it is easy to affix the IC tag to each elemental component and to record the manufacturing information therein for each elemental component.

Where the wheel support bearing is of a type equipped with a sensor for detecting an object to be detected of the wheel support bearing, during an inspection of the sensor, information on the wheel support bearing is recorded on a sensor associated component part. The sensor referred to above may be, for example, a rotation sensor utilized for controlling an anti-lock brake system.

In the wheel support bearing, where the sensor such as, for example, the rotation sensor is employed, such sensor is inspected in an entire number thereof during shipment. Because of this, it is possible to record in the IC tag, information concerning the initial performance at the time of shipment during the inspection. The recorded information can be read out at any time such as, for example, at the time of investigation.

The second quality control method for the wheel support bearing of the present invention makes use of a database having recorded therein, a predetermined manufacturing information on the wheel support bearing is stored in association with an identifying information on the wheel support bearing, contents of which are extractable by the identifying information, and the IC tag, and which includes:

a step of fitting the IC tag to the wheel support bearing to one of a plurality of elemental components forming the wheel support bearing;

a step of recording in the IC tag by a time of shipment or delivery to a customer in accordance with the database, an identifying information on the wheel support bearing and, also, information in connection with the manufacturing process of the wheel support bearing;

a utilizing step of reading information, recorded on the IC tag and confirming the information in connection with the manufacturing process from the information read from the IC tag or by referring the information so read to the database at any arbitrary time subsequent to shipment.

The third quality control method for the wheel support bearing of the present invention makes use of a database having recorded therein, a predetermined manufacturing information on the wheel support bearing, contents of which are extractable, and the IC tag, and which includes:

a step of fitting the IC tag to the wheel support bearing to one of a plurality of elemental components forming the wheel support bearing;

a step of writing a predetermined shipment information on the wheel support bearing in the IC tag, fitted to the wheel support bearing, in accordance with the database; and a step of reading information, recorded on the IC tag, and confirming the information on the wheel support bearing from the information read from the IC tag or by referring the information so read to the database at any arbitrary time subsequent to shipment.

The first quality control method for the wheel support bearing is specifically a method of affixing the IC tag to the wheel support bearing so as to enable the traceability in connection with the quality control relying only on the information recorded in the IC tag and may be a method including the following steps.

This quality control method is a quality control method, in which using the IC tag, the wheel support bearing is controlled by recording a predetermined manufacturing information concerning a process flow, associated with the wheel support bearing, from purchase of material to a step of examination through at least one of forging and turning steps, a heat treatment step and grinding step, which method includes:

a step of attaching the IC tag to one of elemental components forming the wheel support bearing during a manufacture of the wheel support bearing or at a time of completion of manufacture thereof;

a step of recording in the IC tag affixed to the wheel support bearing by a time of shipment or delivery to a customer, at least one of processing condition information and material information at least one of the manufacturing steps for the wheel support bearing; and an information reading and utilizing step of reading the information recorded in the IC tag and confirming the at least one of the processing condition information and the material information from the information read from the IC tag at an arbitrary time subsequent to shipment.

According to this method, during the information reading and utilizing step at an arbitrary time subsequent to shipment, it is possible to confirm the processing condition information on one of the forging and turning step, the heat treatment step and the grinding step or the material information. Since the processing condition information and so on can be confirmed, even in the wheel support bearing which requires a severe quality and precision, a trouble shooting or the like in the event of occurrence of troubles can easily be accomplished. In the case of this method, without the separate database being used, the information can be controlled only with the IC tag and, therefore, in an establishment where the processing condition information or the like is confirmed, the processing condition information or the like can be read out regardless of the presence or absence of a communication facility and the access authority to the database.

The second quality control method for the wheel support bearing is specifically a method of using the IC tag, affixed to the wheel support bearing, and the database so as to enable the traceability in connection with the quality control and may be a method including the following steps.

This quality control method is such that the wheel support bearing is controlled using a database, in which a predetermined manufacturing information for the wheel support bearing concerning a process flow ranging from purchase of material to a step of examination through at least one of forging and turning steps, a heat treatment step and a grinding step, in association with an identifying information, is stored, stored contents of which are extractable therefrom by the identifying information, and the IC tag, and which includes:

a step of attaching the IC tag to one of elemental components forming the wheel support bearing at a time of manufacture of the wheel support bearing or at a time of completion of manufacture thereof;

a step of recording in the IC tag affixed to the wheel support bearing by a time of shipment or delivery to a customer in accordance with the database, an identifying information on the wheel support bearing and, also, at least one of processing condition manufacturing information on at least one of the steps of the process flow and material information; and an information reading and utilizing step of performing one of a confirmation of at least one of purchased material, manufacturing steps and the processing condition information and material information, and a confirmation of results of examination, at an arbitrary time subsequent to shipment from information obtained by reading the information recorded in the IC tag or from information obtained by referring the information read from the IC tag to the database.

Even in this control method, during the information reading and utilizing step at any arbitrary time subsequent to shipment, it is possible to confirm the material information or the processing condition information on one of the forging step, the heat treatment step and the grinding step and so on. Because of this, even in the wheel support bearing, which includes the rolling elements and is made up of a plurality of elemental components and which requires a severe quality and precision, the trouble shooting can be easily accomplished in the event of occurrence of any troubles. Also, since the IC tag affixed to the wheel support bearing has the identifying information recorded therein and the database has various information in correspondence with the identifying information recorded therein, many pieces of information can be drawn from the database without relying on the limited storage capacity of the IC tag. Also, the storage capacity of the IC tag left unoccupied can be utilized for various history controls subsequent to the shipment and/or delivery to the customer.

The third quality control method for the wheel support bearing is specifically a method of using the IC tag, affixed to the wheel support bearing, and the database so as to enable the traceability in connection with the quality control and may be a method including the following steps.

This quality control method is such that the wheel support bearing is controlled using a database, in which a predetermined manufacturing information concerning a process flow ranging from purchase of material for the wheel support bearing to a step of examination through at least one of forging and turning steps, a heat treatment step and a grinding step and so on, in association with an identifying information, is stored, stored contents of which are extractable therefrom by the identifying information, and the IC tag, and which includes:

a step of attaching the IC tag to one of elemental components forming the wheel support bearing at a time of manufacture of the wheel support bearing or at a time of completion of manufacture thereof;

a step of recording in the IC tag affixed to the wheel support bearing by a time of shipment or delivery to a customer in accordance with the database, an identifying information on the wheel support bearing and, also, information on at least one of a date of manufacture, a place of manufacture, a brand of a grease filled, a gap between elemental components, a term of warranty, and handing precautions of the wheel support bearing; and an information reading and utilizing step of performing one of a confirmation of at least one of purchased material, manufacturing steps and the processing condition information and material information, and a confirmation of results of examination, at an arbitrary time subsequent to shipment from information obtained by reading the information recorded in the IC tag or from information obtained by referring the information read from the IC tag to the database.

In the case of this method, during the information reading and utilizing step at any arbitrary time subsequent to shipment, it is possible to accomplish one of the confirmation of the purchased material, the confirmation of the manufacturing process, the confirmation of the processing condition and the confirmation of the result of examination, from the read information read from the recorded information of the IC tag, or from the information obtained by referring to the database with the read information used as a key. It is also possible to confirm one of the date of manufacture, the place of manufacture, the brand of the filled grease, the gap between the elemental components, the term of warranty and handling precautions, all recorded in the IC tag. Considering that one often wishes to know the date of manufacture, the place of manufacture, the brand of the filled grease, the gap between the elemental components, the term of warranty and/or handling precautions, quickly at any situation, it is indeed convenient in terms of facilities and labor if the required information can be available directly from the IC tag with no need to refer to the database. Since the grease is generally available in various types depending on the application, for example, for high temperature use and for low temperature use, and can hardly be identified from the appearance, it would be convenient if it can be read from the IC tag. Also, since the grease tends to deteriorate with passage of time, knowing the brand of the grease together with the date of manufacture will allow one to ascertain at the time of delivery to the customer if it can be used in the form as presented or if replacement of the grease is needed, and, accordingly, it is possible to eliminate the risk of delivery of component parts, filled with the old grease erroneously, to the customer. The gap between the elemental components includes a radial gap or the like in the rolling bearing.

In the present invention, any of the first to third quality control methods for the wheel support bearing may include the following steps. Specifically, it may include a recording, for each process step, in the IC tag for the manufacturing process, that is prepared for each of lot numbers of the elemental components, a predetermined manufacturing information for the elemental components of the wheel support bearing concerning a process flow ranging from purchase of material to the grinding step through at least one of forging and turning steps and the heat treatment step, and a step of reading the information recorded and recording in the IC tag affixed to the wheel support bearing, a portion or whole of information read from the recorded information, and wherein as the manufacturing information to be recorded in the IC tag for the manufacturing process, at least one of processing condition information on at least one of the process steps and material information.

As described above, if recording of the predetermined manufacturing information, during the manufacturing process for each elemental component, concerning the process flow ranging from purchase of material for the elemental components of the wheel support bearing to the grinding step through at least one of forging and turning steps, and the heat treatment step is made, for each process step, in the IC tag for the manufacturing process, that is prepared for each of lot numbers of the elemental components, recording of the detailed information as compared with the manual recording in forms can be accomplished, and, also, unlike, for example, inputting from the terminal to the database, visual recognition is possible because the place, where the information is to be inputted, is the IC tag, resulting in accurate inputting works and minimization of occurrence of errors. Also, since unlike recording, in the database, of the various information of the elemental components on the process ranging from material purchase to the grinding step, those pieces of information are recorded in the IC tag, the database can be less loaded and can easily be controlled. Because of this, the easiness allows the further detailed information to be controlled. Where the lot division changes for each step, the IC tag prepared for each lot number of the elemental components has to be prepared for each changed lot number.

The recording of the manufacturing information at the time of manufacture of the elemental components may be made to the database. In other words, in the present invention, even in any of the first to third quality control method for the wheel support bearing, the recording, in the database for the control of manufacture, of the predetermined manufacturing information of the elemental components for the wheel support bearing on the process flow ranging from the material purchase to the examination step (the step of examination) by way of at least one of the forging and turning steps, the heat treatment step and the grinding step, in association with the lot number of the elemental components or the identifying number of the individual elemental components, and the recording of the recorded information in the IC tag affixed to the wheel support bearing may be included.

As a control method using the IC tag for the manufacturing process prepared for each rot number, which is used in controlling the manufacturing information on the manufacturing process of the elemental components, any of the following fourth and fifth method can be used;

The fourth quality control method for the wheel support bearing according to the present invention is a quality control method for the wheel support bearings that are individually examined. This quality control method for the wheel support bearing is a quality control method for the wheel support bearings, which are assembled with a plurality of elemental components manufactured through a manufacturing process ranging from purchase of material to the grinding step by way of a forging and turning step, which is at least one of forging and turning, and a heat treatment step, in which for each of the elemental components the following stages (1) to (4) are included, and the assembled wheel support bearing employs the process as will be described later.

(1) At the time of purchase of the material for each of the elemental components, the lot number of the material for each of the elemental components and information concerning the purchased material are recorded on each of the IC tags prepared for each of the material lots.

(2) During the forgoing and turning step, the IC tags for each of the material lots, or the IC tags succeeding the information recorded on the IC tags for each of the material lots are separately prepared for each of the forging and turning lots, and the forging and turning lot number for the corresponding forging and turning lot and information that can be obtained during the forging and turning step are subsequently recorded in those IC tags.

(3) During the heat treatment step, the IC tags for each of the forging and turning lots, or the IC tags succeeding the information recorded on the IC tags for each of the forging and turning lots are separately prepared for each of heat treatment lots, and the heat treatment lot number of the corresponding heat treatment lot and information that can be obtained during the heat treatment step are subsequently recorded in those IC tags.

(4) During the examination step, the IC tags for each of the heat treatment lots, or the IC tags succeeding the information recorded on the IC tags for each of heat treatment lots are separately prepared for each the elemental components or each of sets of the elemental components of the same kind, which become units of examination, and the corresponding grinding lot number and information that can be obtained during the examination step are recorded subsequently in those IC tags.

To each of the wheel support bearings that are made up of the elemental components, the IC tags are affixed during a period prior to the assemblage and after the assemblage, and, of the manufacturing number unique to the individual wheel support bearing and the information recorded on the IC tag after the step of examination of each of the elemental components used to form the wheel support bearing, at least the manufacturing number is recorded on the IC tag so affixed to the wheel support bearing. In correspondence with the manufacturing number, the information recorded on the IC tag after the step of examination of each of the elemental components used to form the wheel support bearing and the information on examination after the completion of the wheel support bearing are recorded in the database.

It is to be noted that the flow from the material purchasing step to the grinding step by way of the forging and turning step and the heat treatment step represent broadly divided sections of the flow from purchase of material to completion of the elemental components and each of those steps may be made up of a plurality of substeps or each step may include a step not included within the specific nomenclature. For example, where turning is performed subsequent to the forging before heat treatment, the turning step has to be included in the forging step. Also, during the recording of the information obtained during each of the forging and turning step, the heat treatment step and grinding step in (2) to (4) discussed above, it may be recorded together with processing condition information on the forging and turning step, the heat treatment step and the grinding step. Yet, during the recording of the information obtained during each of the forging and turning step, the heat treatment step and grinding step in (2) to (4) discussed above, it may be recorded together with processing condition information on the forging and turning step, the heat treatment step and the grinding step.

According to this quality control method, since the information on the history from the purchase of material for the elemental component to the contents of examination performed subsequent to completion of the wheel support bearing is stored in the database while the manufacturer's serial number is recorded in the IC tag affixed to the wheel support bearing, the relation between the history information and the wheel support bearing can be controlled one-to-one if the manufacturer's serial number is checked with the database. Since the information generated for each process step of the elemental components is recorded together with the lot number in the IC tag prepared in each of the process steps separately for each process lot in that process step, the detailed history information can be controlled.

Accordingly, countermeasures against the future improvement or the like can be eased and the life assessment can also be performed easily. Since the above described information for each process step is recorded in the IC tag prepared for each lot in that process step, the detailed information can be recorded as compared with the manual recording in forms and, also, unlike inputting from the terminal to the computer, visual recognition is possible, an inputting work is clear and an error will hardly occur. Also, since unlike recording in the computer the various and numerous pieces of information on the manufacturing process at every stage thereof ranging from the purchase of material for the elemental components to the grinding, those pieces of the recorded information are recorded in the IC tag, the computer is rather-less loaded and the control can be facilitated. For this reason, it is possible to achieve an easy control of the detailed information. Also, since the manufacturer's serial number is recorded in the IC tag affixed to the wheel support bearing, this IC tag can be utilized in various applications subsequent to the manufacture, for example, shipment control, distribution control, customer control, maintenance control and so on.

The fifth quality control method for the wheel support bearing according to the present invention is a quality control method for wheel support bearings that are exampled lot-by-lot. This quality control method for the wheel support bearing is such that with respect to the wheel support bearing, which is assembled with the plurality of the elemental components manufactured through the process flow ranging from the purchase of material to the grinding step by way of the forging and turning step, which is at least one of the forging and turning steps, and the heat treatment step, in which with respect to each elemental component, the following process stages (1) to (3) and (4') are included, in which with respect to each assembled wheel support bearing, the following process flow is employed. The process stages (1) to (3) referred to above are identical with those in the fourth quality control method, but will be reiterated.

(1) At the time of purchase of the material for each of the elemental components, the lot number of the material for each of the elemental components and information concerning the purchased material are recorded on each of the IC tags prepared for each of the material lots.

(2) During the forgoing and turning step, the IC tags for each of the material lots, or the IC tags succeeding the information recorded on the IC tags for each of the material lots are separately prepared for each of the forging and turning lots, and the forging and turning lot number for the corresponding forging and turning lot and information that can be obtained during the forging and turning step are subsequently recorded in those IC tags.

(3) During the heat treatment step, the IC tags for each of the forging and turning lots, or the IC tags succeeding the information recorded on the IC tags for each of the forging and turning lots are separately prepared for each of heat treatment lots, and the heat treatment lot number of the corresponding heat treatment lot and information that can be obtained during the heat treatment step are subsequently recorded in those IC tags.

(4') During the examination step subsequent to the grinding step, the IC tags for each of the heat treatment lots, or the IC tags succeeding the information recorded on the IC tags for each of heat treatment lots are separately prepared for each grinding lot and the grinding lot number of the corresponding grinding lot and information that can be obtained during the examination step are recorded subsequently in those IC tags.

To each of the wheel support bearings that are made up of the elemental components, the IC tags are affixed during a period prior to the assemblage and after the assemblage, and, of the manufacturing number and the information recorded on the IC tag after the step of examination of each of the elemental components used to form the wheel support bearing, at least the manufacturing number is recorded in the IC tag so affixed to the wheel support bearing and, in correspondence with the manufacturing lot number, the information recorded on the IC tag after the step of examination of each of the elemental components used to form the wheel support bearing and the information on examination after the completion of the wheel support bearing are recorded in the database.

It is to be noted that in the process of recording the information obtained at each of the forging and turning step, the heat treatment step and the grinding step in the previously described (2) to (4'), the processing condition information on each of the forging and turning step, the heat treatment step and the grinding step may be recorded together therewith.

Although this quality control method is a control of the wheel support bearings for each manufacturing lot number and will not be a one-to-one control, various functions and effects similar to those described in connection with the first quality control method for the wheel support bearing can be obtained so long as other matters are concerned. Reference to the database is carried out using the lot number that can be obtained from the IC tag affixed to the wheel support bearing.

In the present invention, the IC tag prepared for each material lot, the IC tag prepared for each forging step and the IC tag prepared for each heat treatment step may be affixed to containers accommodating therein a plurality of materials of the same material lot, containers accommodating therein the elemental components of the same forging lot, and containers accommodating therein the elemental components of the same heat treatment lot, respectively.

Attachment of the IC tag to the containers may be carried out directly or to tag affixed to the respective container for visual recognition. The IC tags may be affixed to those containers removably.

When the IC tags are affixed to the containers, the IC tags prepared for each lot can be moved at all times with the elemental components and the handling of the IC tag is easy. Also, the information can be recorded in the IC tag in the path of transport of the elemental components.

In the present invention, the wheel support bearing may include elemental components separate from the elemental components manufactured through a process flow ranging from purchase of material to a grinding step by way of at least one of a forging and turning step and a heat treatment step, and information on those separate elements components may be recorded in the database subsequent to assemblage of the wheel support bearing in correspondence with the manufacturer's serial number or the lot number. In this way, the information on the separate elemental components can be available even after completion of the wheel support bearing.

In the case of the wheel support bearing, the elemental components, manufactured through the process flow ranging from the above described purchase of material to the grinding step by way of at least one of the forging and turning steps and the heat treatment step, include an outer race, an inner race, and rolling elements, or an outer race, an inner race, a hub and rolling elements The separate elemental components that do not pass through this process flow include a retainer, seals and others. In the case of the sensor incorporated element, sensors and sensor associated component parts are the separate elemental components, too.

The wheel support bearing may have grease filled therein during assemblage thereof, in which case the IC tag affixed to the wheel support bearing is preferably recorded with a date of assemblage of the wheel support bearing.

Since the grease deteriorates with passage of time, the control will be easy if the date of assemblage is known.

In the present invention, the IC tag affixed to the wheel support bearing may have recorded therein, information on whereabouts of the wheel support bearing starting from shipment of the wheel support bearing to delivery thereof to a customer. This facilitates the shipment control, the distribution control, the customer control, the maintenance control and others.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

FIG. 29 is an explanatory diagram showing a process of making a hub and a step of affixing the IC tag in the quality control method for the wheel support bearing in FIG. 28;

FIG. 37 is an explanatory diagram showing a container or the like of the elemental component and a concept of the manner of writing in an IC tag for the container or the like.

DESCRIPTION OF THE PREFERRED EMBODIMENTS

Figure 1A:
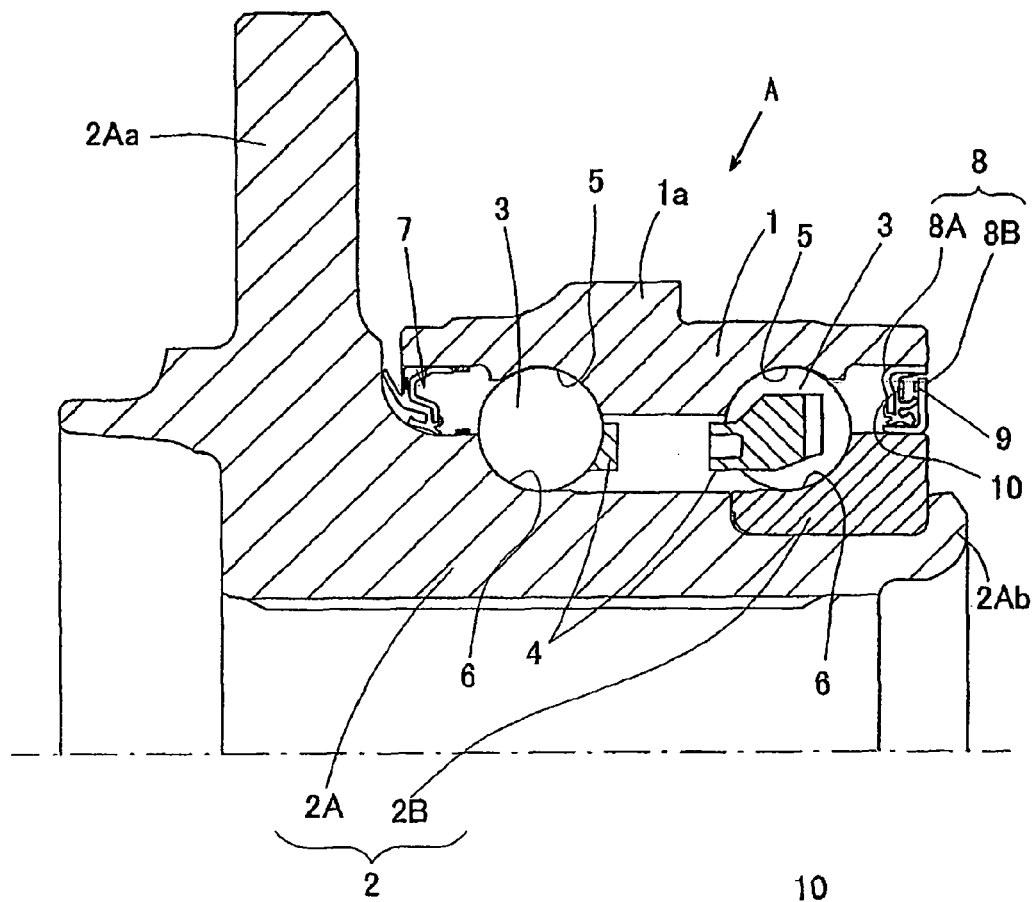
FIG. 1 is a fragmentary sectional view of a wheel support bearing device according to a first preferred embodiment of the present invention and an enlarged sectional view of a seal therefor.

A first preferred embodiment of the present invention will be described with particular reference to FIGS. 1 and 2. This wheel support bearing device is of a third generation model of an inner race rotating type. It is to be noted that in this specification, the position of the bearing relative to a vehicle body that lies on one side of the vehicle body structure remote from the longitudinal center of the vehicle body is referred to as an outboard side and the position of the bearing relative to a vehicle body that lies on the opposite side of the vehicle body structure close towards the longitudinal center of the vehicle body is referred to as an inboard side. In FIG. 1, a left portion of the drawing corresponds to the outboard side and a right portion of the drawing corresponds to the inboard side.

This wheel support bearing device is of a type including an IC tag 9 and a magnet 10 both fitted to a wheel support bearing A. The wheel support bearing A includes an outer member (outer race) 1 having an inner periphery formed with double rows of raceway surfaces 5, an inner member (inner race) 2 having raceway surfaces 6 opposed respectively to the above described raceway surfaces 5, and double rows of rolling elements 3 interposed between the opposed raceway surfaces 5 and 6 of the outer and inner members 1 and 2. Opposite ends of a bearing space delimited between the outer member 1 and the inner member 2 are sealed by respective seals 7 and 8. This wheel support bearing device is rendered to be a double row angular contact ball bearing type and each of the rolling surfaces 5 and 6 is of an arcuate shape in section and the raceway surfaces 5 and 6 are so formed as to have respective contact angles held in back-to-back relation with each other.

The rolling elements 3 are in the form of a ball and are retained by a retainer 4 employed for each row of those rolling elements 3.

The outer member 1 serves as a fixed side member and is a member of one-piece construction adapted to be secured to a knuckle (not shown) of a suspension system. The outer member has a vehicle body fitting flange 1a on an outer periphery thereof for securement to the knuckle. The outer member 1 is a forged component.

The inner member 2 is made up of a hub 2A and an inner race 2B mounted on an outer periphery of an inboard side end of the hub 2A, with the rows of the raceway surfaces 6 formed respectively in the hub 2A and the inner race 2B. The hub 2A has a wheel mounting flange 2Aa defined therein on an outboard side with respect to the outer member 1, and a wheel (not shown), overlapped with a brake rotor (not shown), is secured to the wheel mounting flange 2Aa by means of a plurality of bolts arranged in a direction circumferentially thereof. The inner race 2B is axially fixed in position by means of a crimped portion 2Ab provided on an inboard side end of the hub 2A. Each of the hub 2A and the inner race 2B is in the form of a forged component.

Figure 1B:
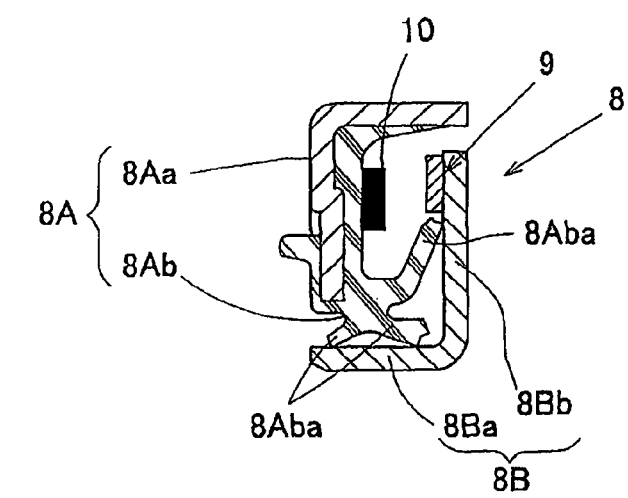

The seal 8 on the inboard side is of a combination seal including a first sealing element 8A fitted to an inner diametric surface of the outer member 1 and a second sealing element 8B fitted to the outer periphery of the inner member 2. As shown in FIG. 1(B) on an enlarged scale, the second sealing element 8B serves as a slinger and is in the form of a generally L-sectioned metallic member having a cylindrical wall 8Ba and a radial upright wall 8Bb extending at an outer periphery of one end the cylindrical wall 8Ba. The first sealing element 8A is made up of a core metal 8Aa and an elastic member 8Ab, and the elastic member 8Ab has a plurality of sealing lips 8Aba having respective free ends slidingly engaged with the second sealing element 8B.

A sensor incorporated IC tag 9 is fitted to the second sealing element 8B of the seal 8 on the inboard side and a magnet 10 is fitted to the first sealing element 8A in face-to-face relation with the sensor incorporated IC tag 9. The magnet 10 may be provided at one location or a plurality of circumferentially equally spaced location of the sealing element 8A. Also, the magnets 10 may be provided at ring-shaped locations to have a plurality of magnetic poles arranged in a circumferential direction thereof. It is to be noted that in FIG. 1(B), the sensor incorporated IC tag 9 may be fitted to the first sealing element 8A and the magnet 10 may be fitted to the second sealing element 8B in face-to-face relation therewith. By way of example, the sensor incorporated IC tag 9 and the magnet 10 both shown in this figure may be reversed in position relative to each other.

Figure 2:
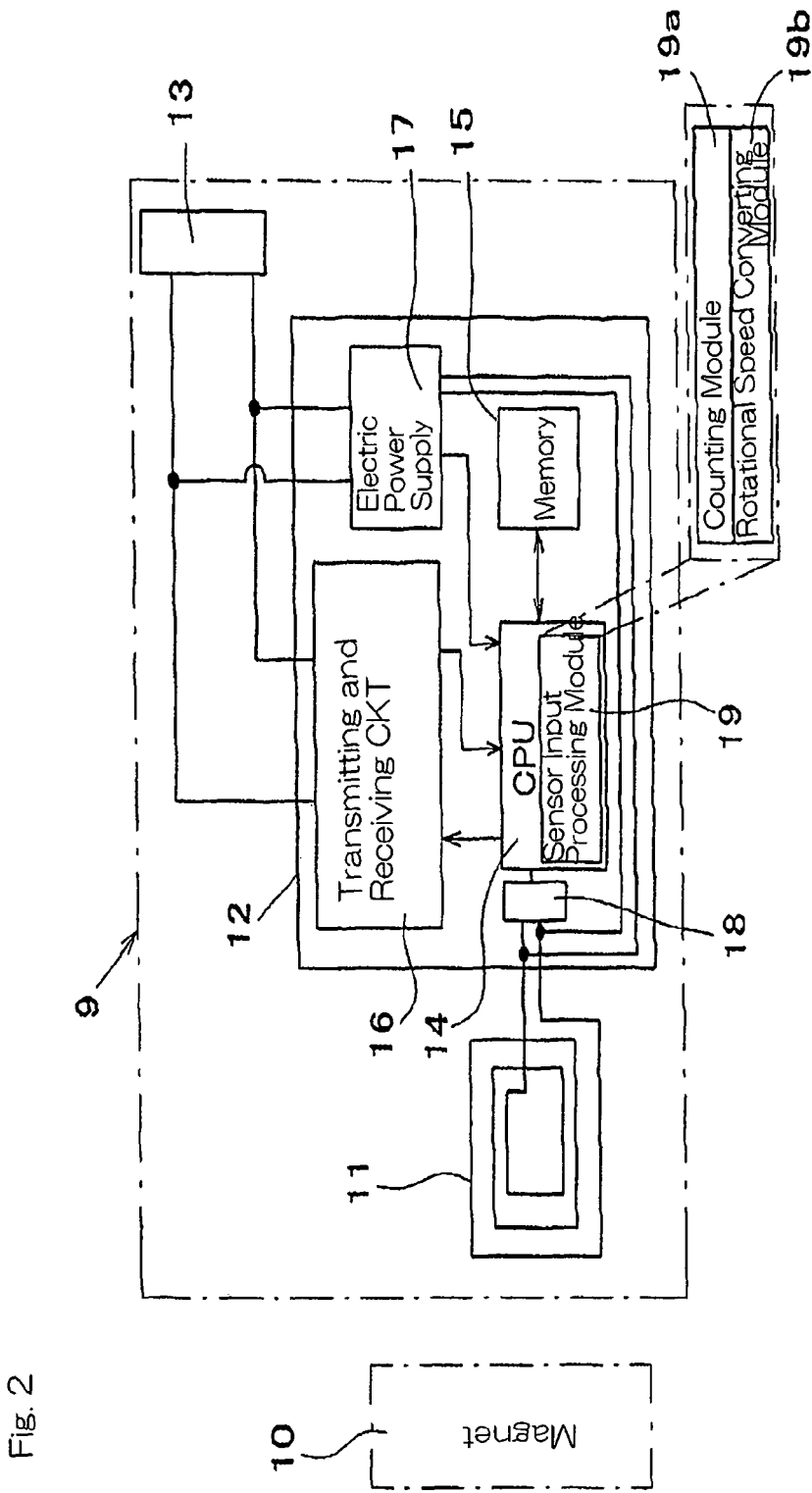
FIG. 2 is a circuit block diagram of a sensor incorporated IC tag employed in the wheel support bearing device.
Figure 3:
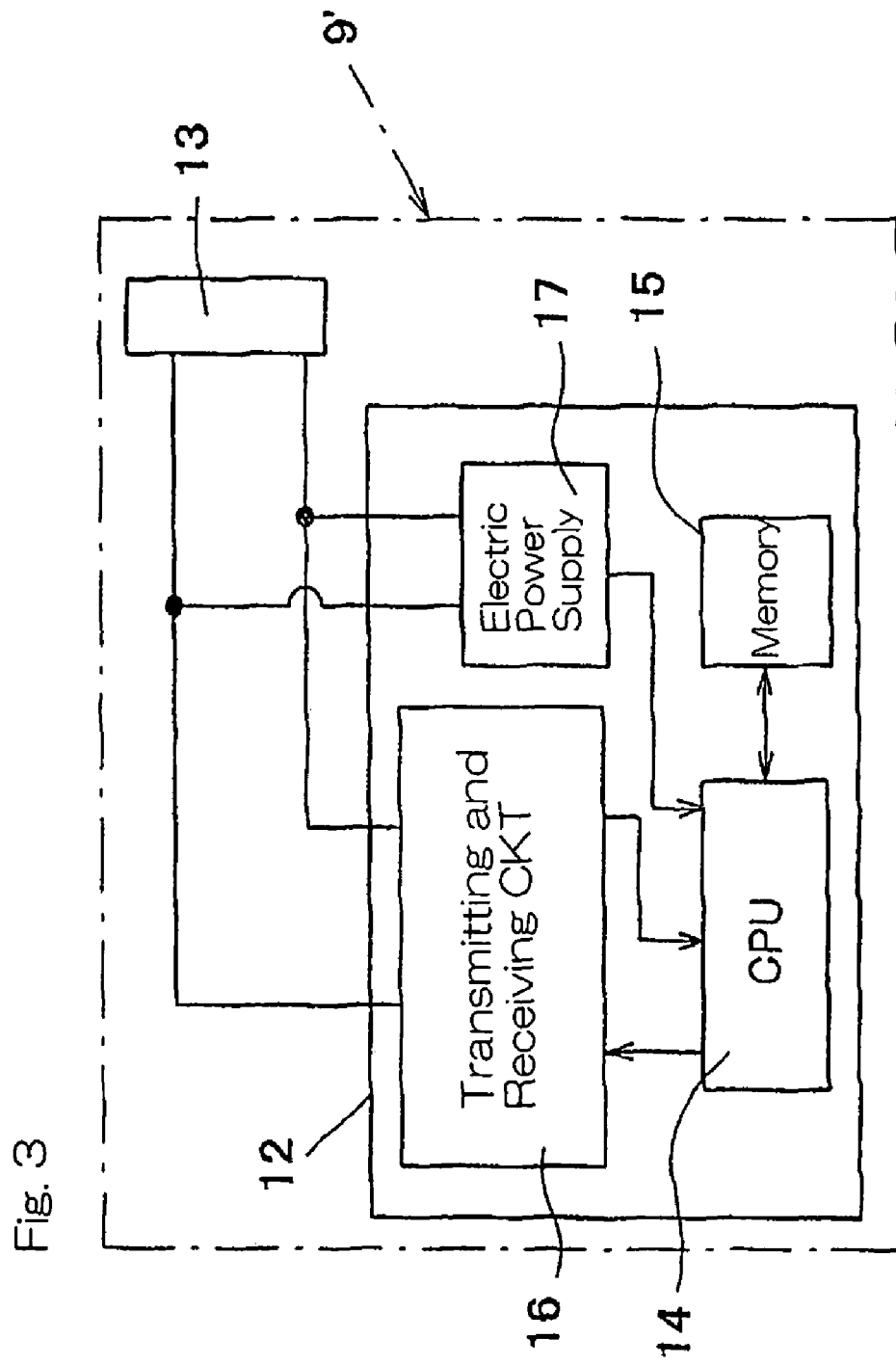
FIG. 3 is a circuit block diagram of an example of the standard IC tag.
Figure 4:
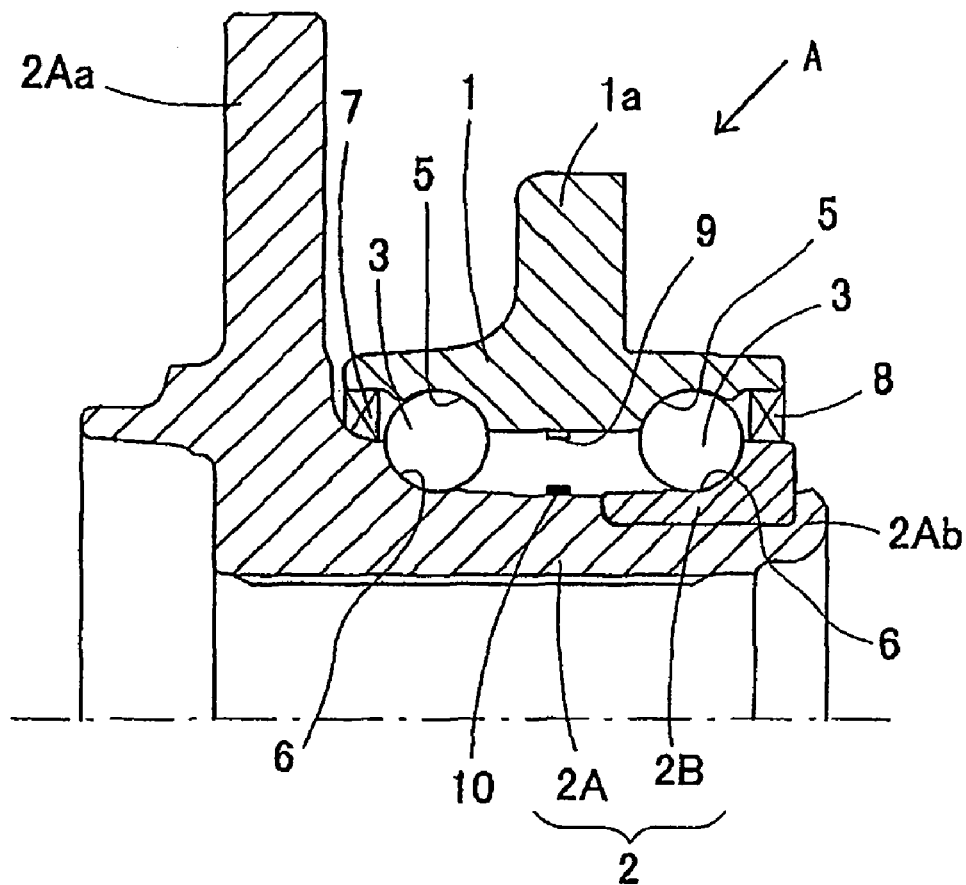
FIG. 4 is a fragmentary sectional view of a second preferred embodiment of the present invention.

The sensor incorporated IC tag 9 is of a type including an RFID based IC tag utilizing the RFID technology, to which a sensor 11 made up of a coil as shown in FIG. 2 is added and encapsulated together with the RFID based IC tag by means of a resin molding. This sensor incorporated IC tag 9 includes an IC chip 12 and an antenna 13 as is the case with the standard RFID based IC tag 9' shown in FIG. 3. The IC chip 12 includes a central processing unit (CPU) 14, a memory 15, a transmitting and receiving circuit 16 and an electric power supply circuit 17, and the electric power supply circuit 17 acquires an electric power through the antenna 13. The memory 15 is of a type that does not require any electric power for storage of information therein. The RFID based IC tag is available in various types depending on the transmission system based on, for example, utilizing electrostatic coupling, electromagnetic coupling, electromagnetic induction, microwaves or light and, of them, any type can be employed, but in the illustrated embodiment, the electromagnetic induction transmission type or the microwave transmission type is employed. The transmitting and receiving circuit 16 and the antenna 13 are so designed as to be compatible with the particular transmission system.

This sensor incorporated IC tag 9 is of a design, in which in the basic structure of the previously described RFID based IC tag, an input processing module 18 is provided, through which a signal is inputted to the CPU 14 by way of an input system separate from a contactless communicating channel leading from the antenna 13 and the sensor 11 is connected with this input processing module 18. The input processing module 18 is rendered to be a module for shaping a voltage waveform of the sensor 11 into a pulse signal. The input processing module 18 may be of a type capable of functioning as an input port for controlling the input signal in dependence on a command from the CPU 14. It is to be noted that depending on the type of the sensor 11, the input processing module 18 may be of a type capable of functioning as an analog-to-digital (A/D) converter for converting an analog signal, which is a sensor output, into a digital data. The electric power supply circuit 17 is of a type capable of utilizing an electromotive force of the sensor 11, made up of the coil, as an electric power source, other than acquiring the electric power from the antenna 13.

Also, the sensor incorporated IC tag 9 is provided with a sensor input processing module 19 for performing a predetermined process on data, which is supplied from the sensor 11 through the input processing module 18, and then recording the data in the memory 15. The sensor input processing module 19 is in the form of a program designed to allow the CPU 14 to perform a predetermined operation, and is provided in a ROM (not shown), in which the program for the control of the CPU 14, or a separate ROM or the like.

The sensor input processing module 19 includes a counting module 19a and a rotational speed converting module 19b.

The counting module 19a is a module for counting a signal from the sensor 11, generated when moving past the magnet 10, and storing it in the memory 15 within the IC tag 9 and records an accumulated value of ON signals.

The rotational speed converting module 19b is module for converting the signal from the sensor 11, generated when moving past the magnet 10, into a rotational speed and recording it in the memory 15 within the IC tag 9, for example, the count value of the sensor ON signals is divided by time at intervals of a predetermined time to provide a speed data. Although if the memory 15 has a spare in its capacity, the speed data is preferably archived and stored in its entirety, the memory usage may be saved by means of a suitable process such as, for example, expansion of the sampling interval or recordal to be performed only when the speed exceeds a predetermined speed.

According to the wheel support bearing device of the above described construction, since the sensor incorporated IC tag 9 is employed and a detection signal from the sensor 11 is inputted through the input system separate from the contactless communicating channel, the status of actual use detected by the sensor 11 can be recorded in the IC tag 9 as a history. Because of this, it is possible to known of a history of use of the wheel support bearing device, which can be used for the regular servicing, clear-up at the time of occurrence of any defect, calculation of the remaining service life, future improvement and so on.

In this first embodiment, since the sensor 11 is the coil, an electromotive forge generates in the sensor 11 when rotated. This electromotive force can be utilized for driving the IC tag 9 and, also, by the effect of an electromotive force generated each time it move past the magnet 10, the rotation of the wheel support bearing device can be detected. A signal generated from the sensor 11 when the magnet 10 moves is counted by the counting module 19a and is then recorded in the memory 15. Also, the rotational speed converting module 19b records strongness and weakness of the magnetic field resulting from passage of the magnet 10 and then convert into a rotational speed. In this way, it is possible to record a history of rotational speeds.

The IC tag 9 is, in this first embodiment, fitted to the seal 8, and since the seal 8 is held at a position exposed to the outside of the wheel support bearing device, a contactless communication with the IC tag 9 is easy to achieve. Also, as compared with the case, in which it is fitted to a component part, such as the outer member 1, the hub 2A or the inner race 2B, which is processed through complicated process steps, fixture of the sensor 11 and the magnet 10 to the seal 8 that can be manufactured simply is effective to facilitate the fitting work.

It is to be noted that although in the first embodiment described above, the sensor incorporated IC tag 9 and the magnet 10 have been fitted to the seal 8, the sensor incorporated IC tag 9 may be fitted to the outer member 1 at a location between the rows of the raceway surfaces 5, 5 and 6, 6 and, on the other hand, the magnet 10 may be fitted to the inner member 2 in opposed relation therewith.

Figure 5:
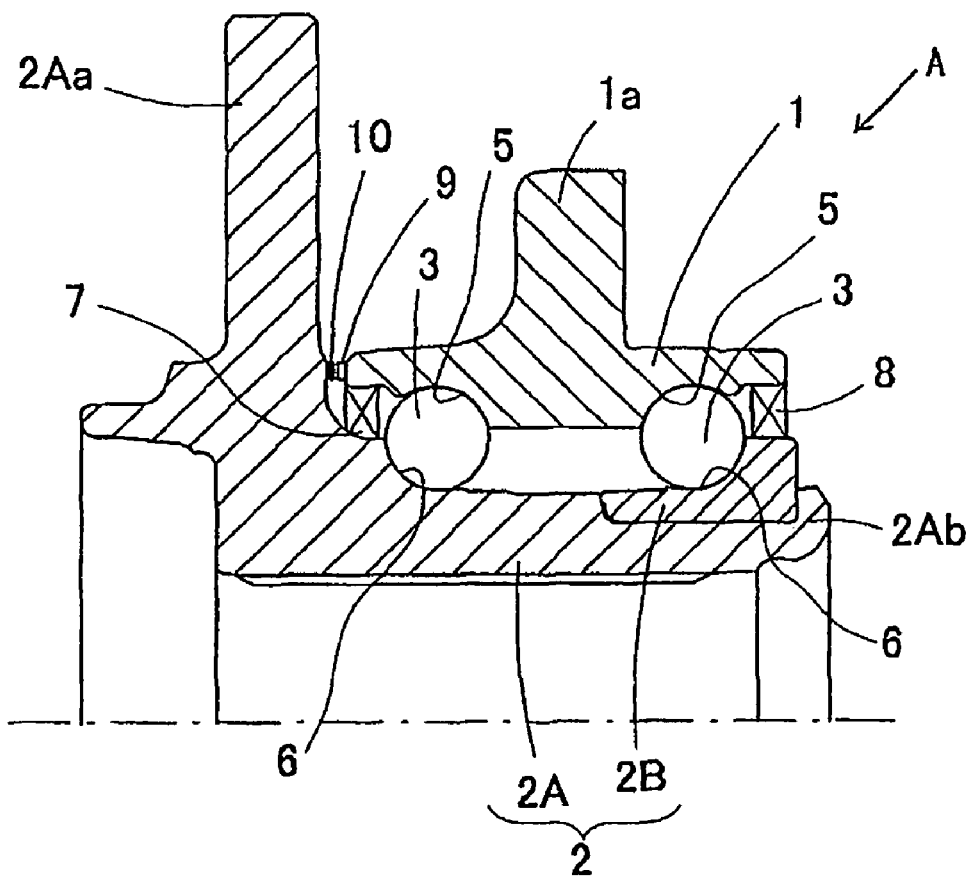
FIG. 5 is a fragmentary sectional view of a third preferred embodiment of the present invention.

Also, as is the case with a three preferred embodiment shown in FIG. 5, the sensor incorporated IC tag 9 may be fitted to an outboard side end face of the outer member 1 and, on the other hand, the magnet 10 may be fitted to the flange 2Aa of the hub 2A in opposed relation thereto.

Figure 6:
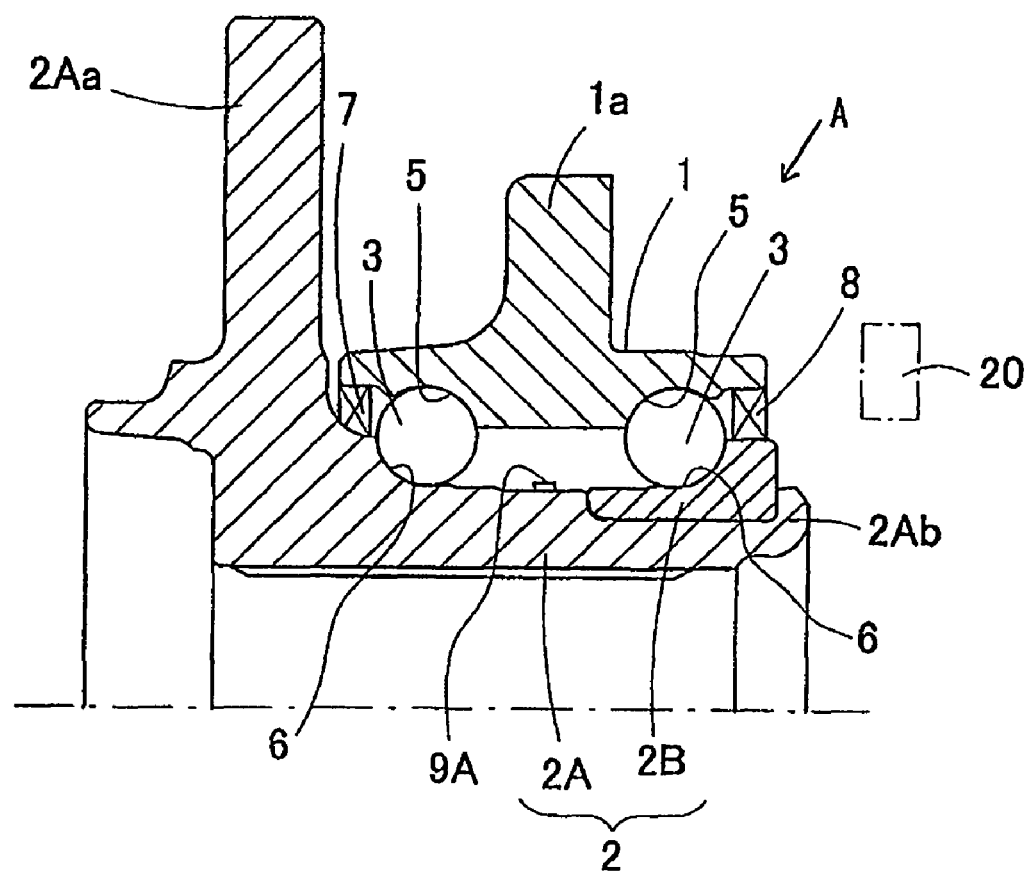
FIG. 6 is a fragmentary sectional view of a fourth preferred embodiment of the present invention.
Figure 7:
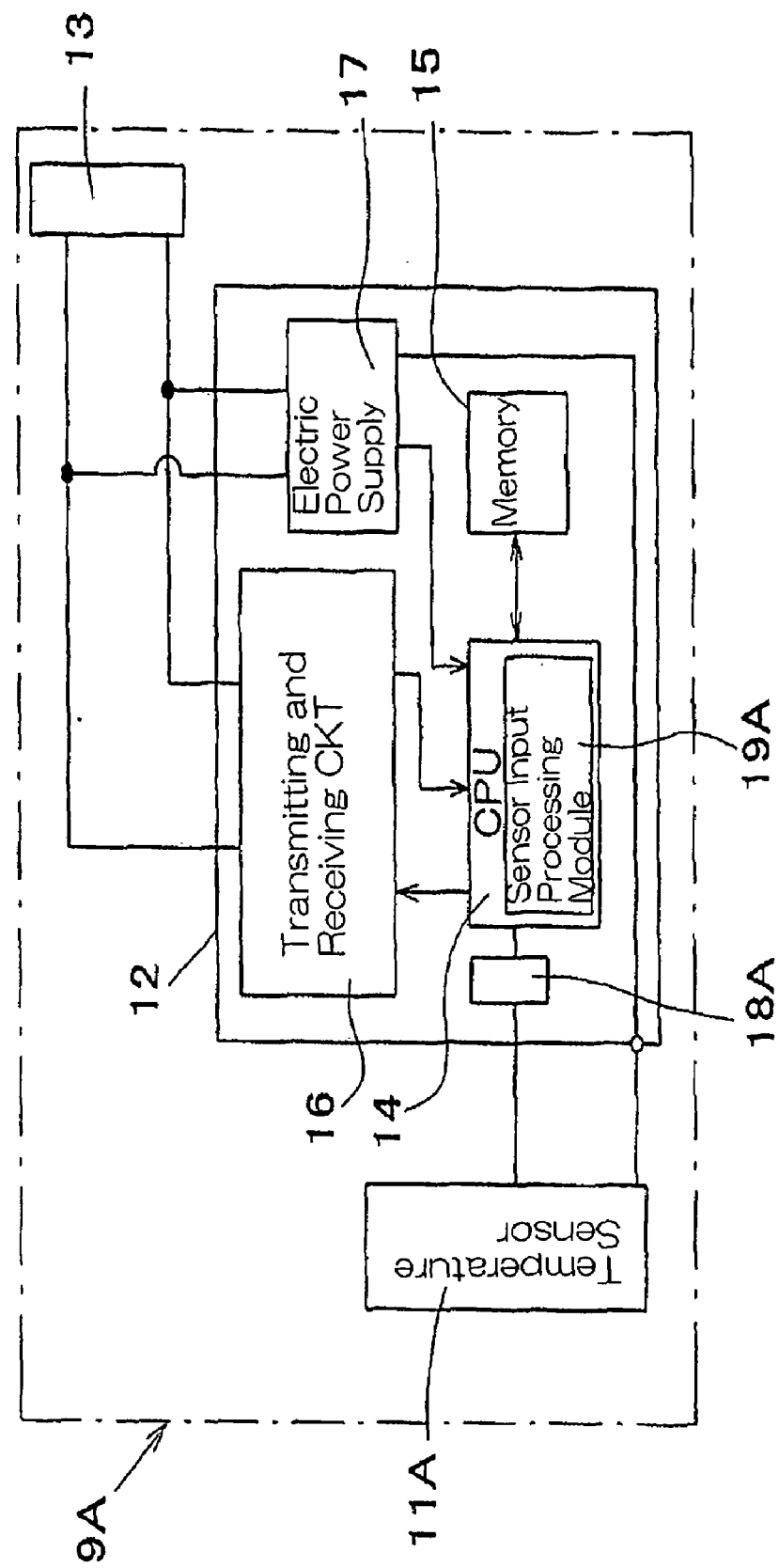
FIG. 7 is a circuit block diagram of the sensor incorporated IC tag employed in the wheel support bearing device according to this embodiment.

FIGS. 6 and 7 illustrate a fourth preferred embodiment of the present invention. This wheel support bearing device is of a type, in which a sensor incorporated IC tag 9A having a temperature sensor 11A shown in FIG. 7 is fitted to a wheel support bearing device at a location within the bearing space. The sensor incorporated IC tag 9A is fitted to, for example, an outer diametric surface of the inner member 2 at a location between the rows of the raceway surfaces 6 and 6.

The sensor incorporated IC tag 9A includes, as is the case with the sensor incorporated IC tag 9 employed in the first embodiment shown in FIG. 2, an input processing module 18A, through which a signal is inputted to the CPU 14 by way of an input system separate from a contactless communicating channel leading from the antenna 13, and the temperature sensor 11A is connected with this input processing module 18A. The input processing module 18A referred to above includes, for example, an A/D converter or the like. Other than that, the sensor incorporated IC tag 9A is provided with a sensor input processing module 19A for performing a predetermined storage process for capturing an input from the temperature sensor 11A and recording it in the memory 15. The sensor input processing module 19A is in the form of a program designed to control the CPU 14 and is provided in a ROM (not shown) or the like built in the sensor incorporated IC tag 9A. The sensor input processing module 19A is of a type capable of operating if an electric operating power of a value higher than a predetermined voltage is available, so that it may counteract with an insufficient electric power.

Also, the temperature sensor 11A, unlike the coil, generally requires an electric power and, therefore, an electric driving power is supplied from the electric power supply circuit 17 built in the sensor incorporated IC tag 9A. The electric power supply circuit 17 acquires the electric driving power by a contactless communication from the antenna 13 and drives the CPU 14 and the transmitting and receiving circuit 16 and includes a capacitor (not shown) or the like so that an electric power can be accumulated for driving the sensor 11A.

With respect to this sensor incorporated IC tag 9A, it is necessary to supply an electric power for driving, and an power supply module 20 (FIG. 6) is provided for supplying an electric power to the sensor incorporated IC tag 9A by a contactless communication at all times or at a predetermined time requiring a condition to be satisfied. The power supply module 20 is provided in, for example, a tire housing or the like. Instead of the contactless power supply module 20, a terminal (not shown) capable of being connected by wiring with the electric power supply circuit 17 shown in FIG. 7 may be provided, with which an electric battery or an electric generator may be connected. When as the electric generator an electric generating type rotation detector (not shown) for the control of the anti-lock brake system is provided in the wheel support bearing device, an electromotive force thereof can be utilized. Other structural features of this fourth embodiment are similar to those shown and described in connection with the first embodiment with reference to FIGS. 1 and 2.

In the case of this fourth embodiment, since the temperature sensor incorporated IC tag 9A is provided, a history of temperature inside the bearing or the like can be recorded.

Figure 8:
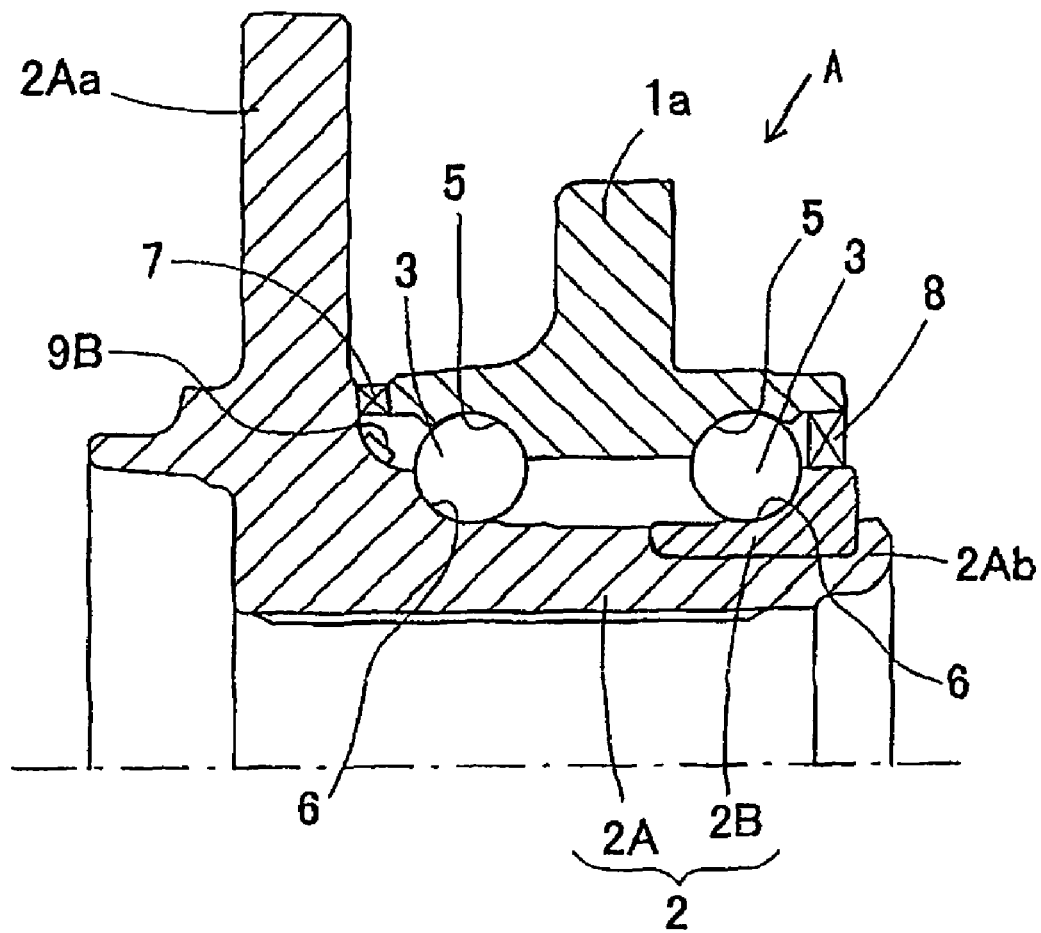
FIG. 8 is a fragmentary sectional view of a fifth preferred embodiment of the present invention.
Figure 9:
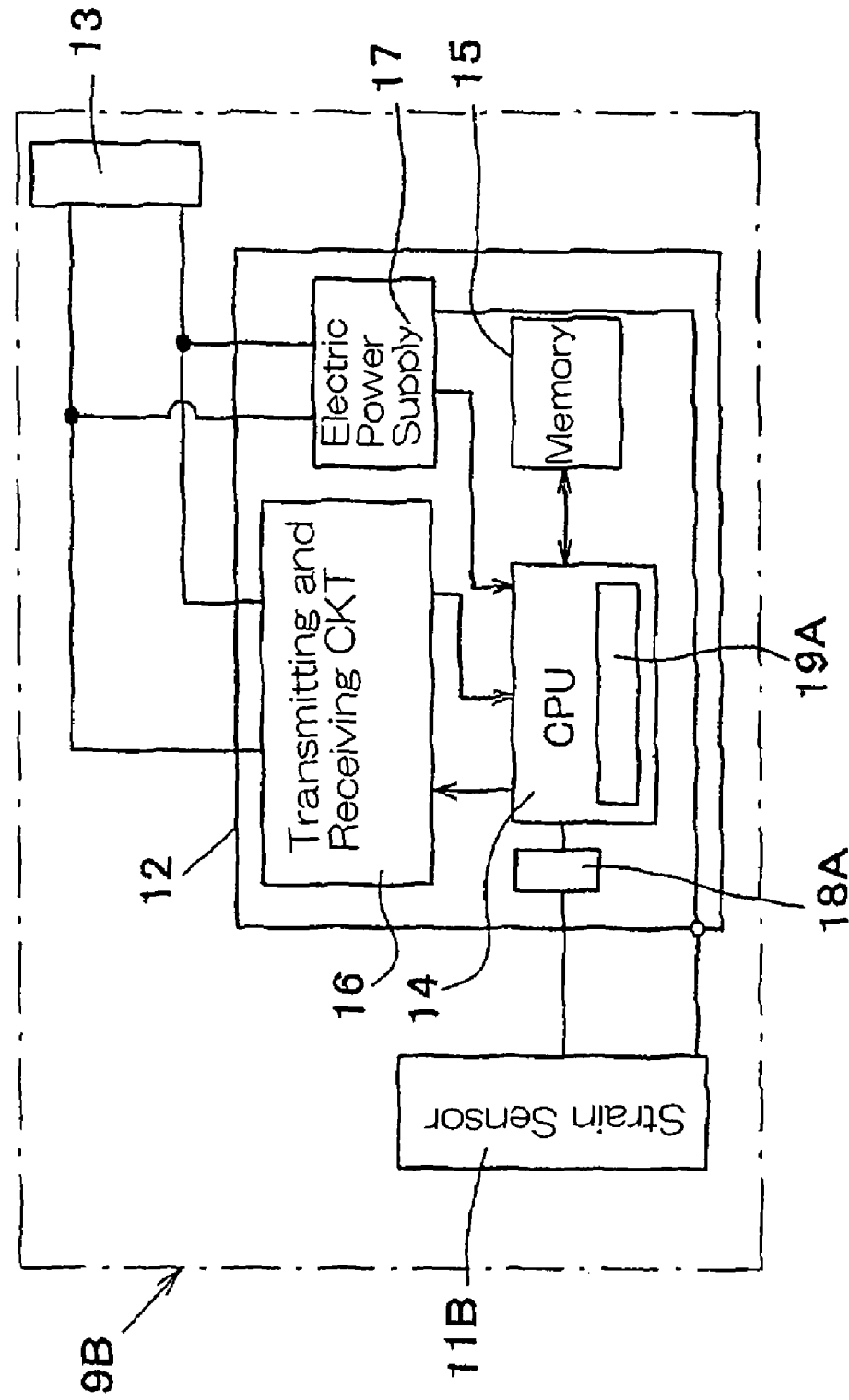
FIG. 9 is a circuit block diagram of the sensor incorporated IC tag employed in the wheel support bearing device according to this embodiment.

FIGS. 8 and 9 illustrate a fifth preferred embodiment of the present invention. This fifth embodiment is such that in the embodiment shown in FIGS. 6 and 7, in place of the IC tag 9A having the temperature sensor 11A incorporated therein, an IC tag 9B having a strain sensor 11B incorporated therein is employed. The strain sensor incorporated IC tag 9B is fitted to a root portion of the flange 2Aa of the hub 2A. The strain sensor 11B incorporated IC tag 9B is such that in the temperature sensor incorporated IC tag 9A shown in FIG. 7, in place of the temperature sensor 11A, the strain sensor 11B is provided as shown in FIG. 9. Other structural features of this fifth embodiment are similar to those shown and described in connection with the fourth embodiment with reference to FIGS. 6 and 7.

That root portion of the wheel mounting flange 2Aa of the hub 2A is a location exposed to a severe load condition. The strain sensor 11B of the sensor incorporated IC tag 9B is affixed to such a location so that the magnitude and the number of times or the like of stress received are recorded. In this way, it is possible to read the record during, for example, the regular servicing and to replace the wheel support bearing device before the latter reaches the fatigue limit.

Figure 10:
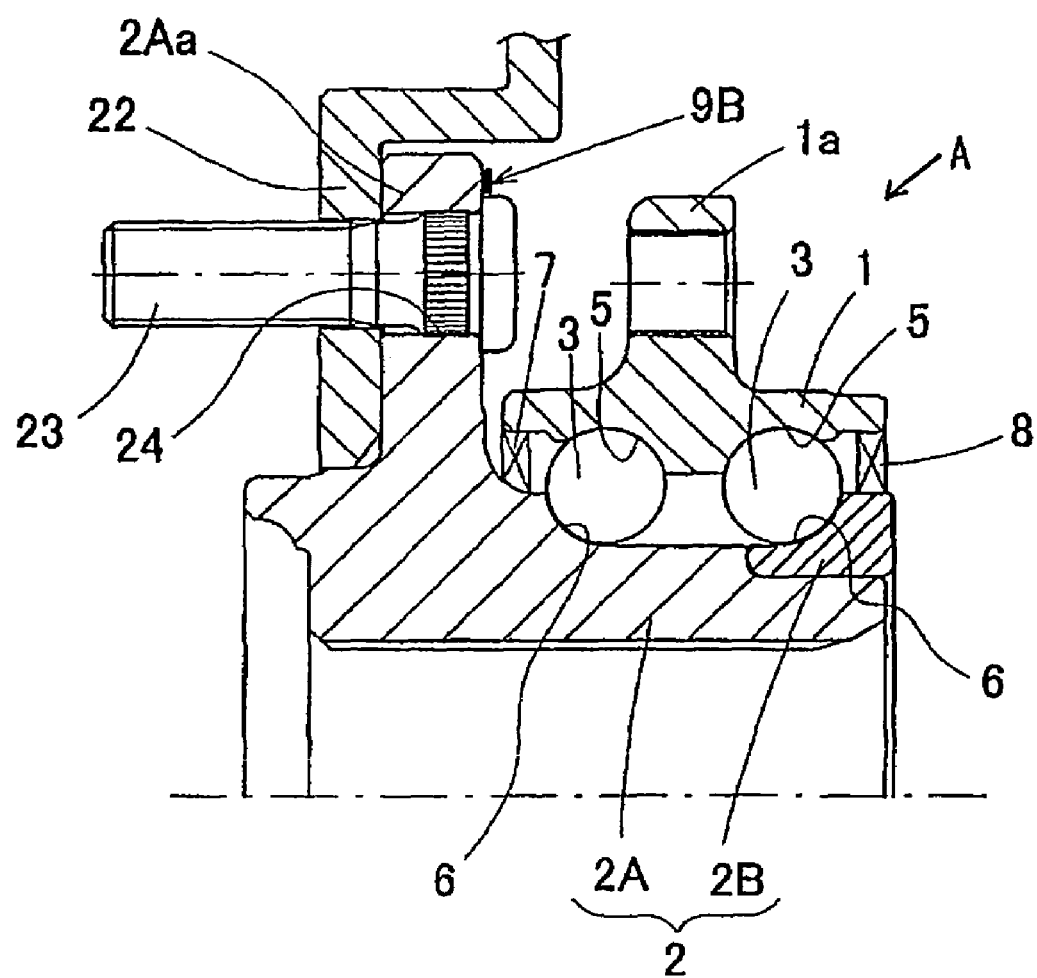
FIG. 10 is a fragmentary sectional view of a sixth preferred embodiment of the present invention.
Figure 11:
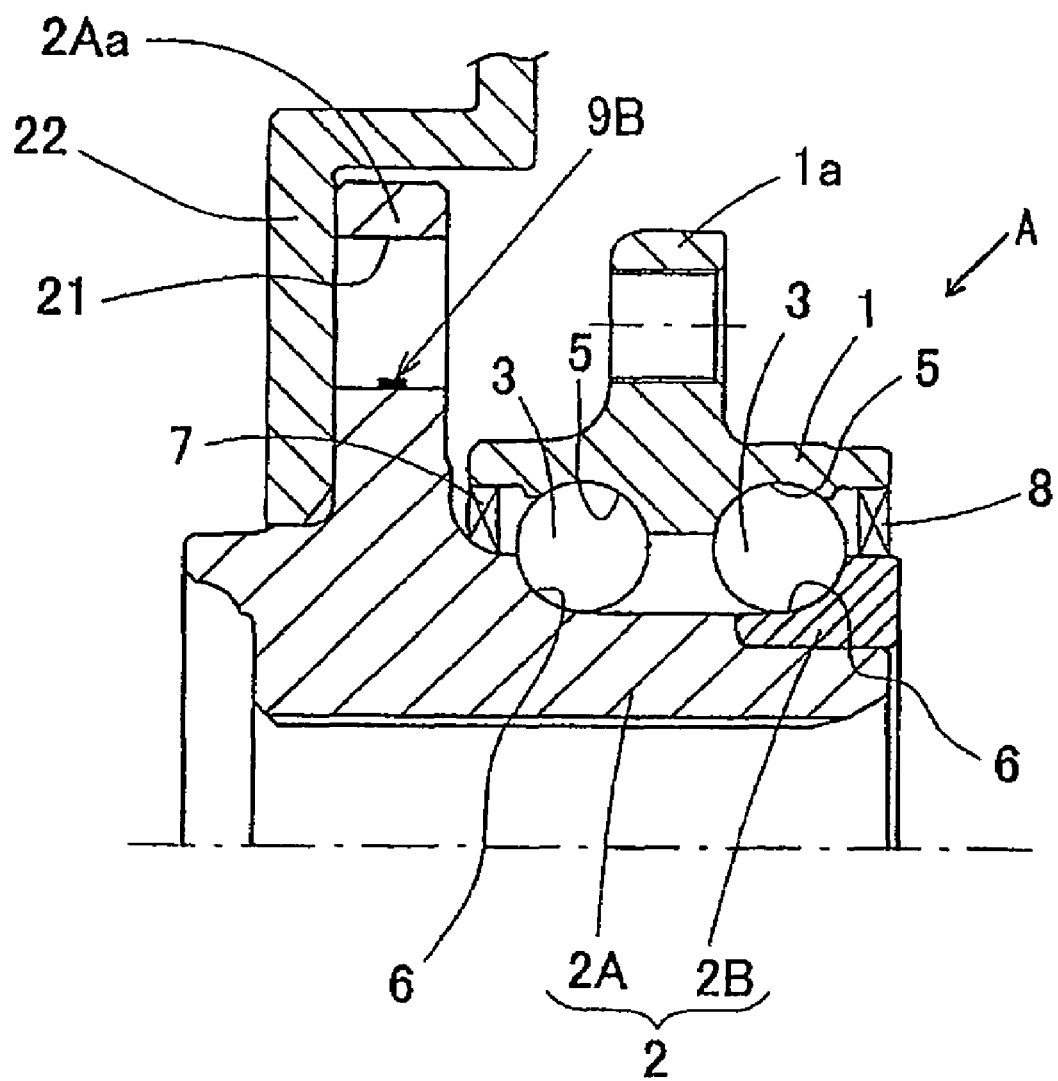
FIG. 11 is a fragmentary sectional view of a seventh preferred embodiment of the present invention.

FIG. 10 illustrates a sixth preferred embodiment of the present invention. This sixth embodiment is such that in the fifth embodiment shown in FIG. 8, the strain sensor incorporated IC tag 9B is fitted to the flange 2Aa of the hub 2A. The position where the sensor incorporated IC tag 9B is fitted is an outer diametric edge of a side face on the inboard side of this flange 2Aa. It may not be necessarily limited to the outer diametric edge and it may be within a range from a generally intermediate portion of the flange 2Aa in a radial direction thereof to an outer diametric end thereof. Also, as is the case with, for example, a seventh preferred embodiment shown in FIG. 11, a recess 21 is provided in the flange 2Aa and the sensor incorporated IC tag 9B may be fitted inside this recess 21. The recess 21 may be a throughhole. A portion of the flange 2Aa, from which the wall is hollowed out for the purpose of reducing the weight can be utilized for those recesses (openings) 21.

The hub 2A has a brake rotor 22 fitted thereto together with the wheel (not shown) by means of wheel mounting bolts 23. The bolts 23 are those press-fitted into corresponding press-fit holes 24 extending completely through the flange 2Aa. The brake rotor 22 may be either a brake disc or a brake drum. Other structural features of this embodiment are similar to those shown and described in connection with the fifth embodiment with reference to FIGS. 8 and 9.

If as is the case with this sixth embodiment, the strain sensor 11B (FIG. 9) of the sensor incorporated IC tag 9B is affixed to an outer diametric portion of the flange 2Aa to which the brake rotor 22 is fitted, brake judders, that is, shakes of a flange surface during braking can be recorded. In this way, precision confirmation of the flange shape can be accomplished during the regular servicing.

It is to be noted that the sensor incorporated IC tag 9B having the strain sensor incorporated therein may be disposed at, for example, a root portion of one of the wheel mounting bolts 23, other than that in any one of the foregoing embodiments. In such case, the magnitude and the number of times of the stress received can be recorded in the sensor incorporated IC tag 9B and when this recorded data are read out on a non-contact basis, the wheel support bearing device can be replaced before the bolts 23 reach the fatigue limit.

Also, when a plurality of sensor incorporated IC tags 9B are affixed to the raceway surfaces 5 and 6 and a detected value of each of those strain sensors 11B is recorded in the memory 15, it is possible to confirm the position at which the stress is maximum and, therefore, an accurate contact angle can be confirmed.

Figure 12:
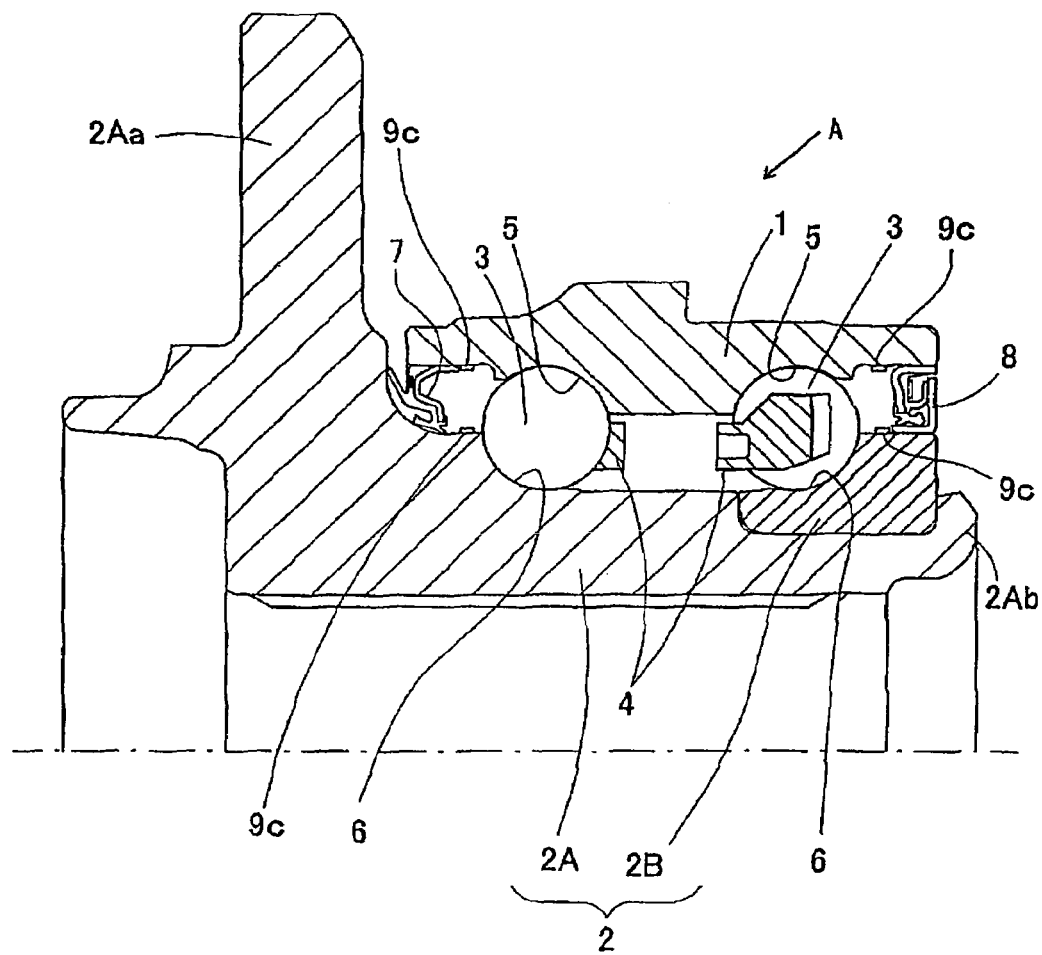
FIG. 12 is a fragmentary sectional view of an eighth preferred embodiment of the present invention.

FIG. 12 illustrates an eighth preferred embodiment of the present invention. This eighth embodiment is such that in the fourth embodiment shown in FIGS. 6 and 7, in place of the IC tag 9A having the temperature sensor 11A incorporated therein, a sensor incorporated IC tag 9C having a water detecting sensor (not shown) incorporated therein is employed. The water sensor incorporated IC tag 9C corresponds to the sensor incorporated IC tag 9A of FIG. 7 provided with the water detecting sensor in place of the temperature sensor 11A.

The position at which the water sensor incorporated IC tag 9C is fitted is within the bearing space delimited between the outer member 1 and the inner member 2. By way of example, it may be a portion of an inner peripheral surface of the outer member 1 between the seals 7 and 8 and the raceway surfaces 5 and 6 or an outer peripheral surface of the inner member 2. Other structural features of this embodiment are similar to those shown and described in connection with the fourth embodiment with reference to FIGS. 6 and 7.

In the case of the eighth embodiment, a history of water seeping into the bearing can be recorded in the IC tag 9C. In the wheel support bearing device, depending on use conditions it often occurs that water may seep into the bearing. To identify the channel of water seeping and the time of occurrence are difficult with the conventional bearing. By way of example, even though the grease deteriorates as a result of seeping water, the occurrence of the water seeping cannot be ascertained once the water evaporates. If the water detecting sensor is provided in the sensor incorporated IC tag 9C and is arranged at a location which is suspected to form a channel for the water seeping, the water seeping can be monitored and the time of occurrence of the water seeping and the number of water seeping occurred are recorded as a history, which can be subsequently confirmed during the regular servicing.

Figure 13:
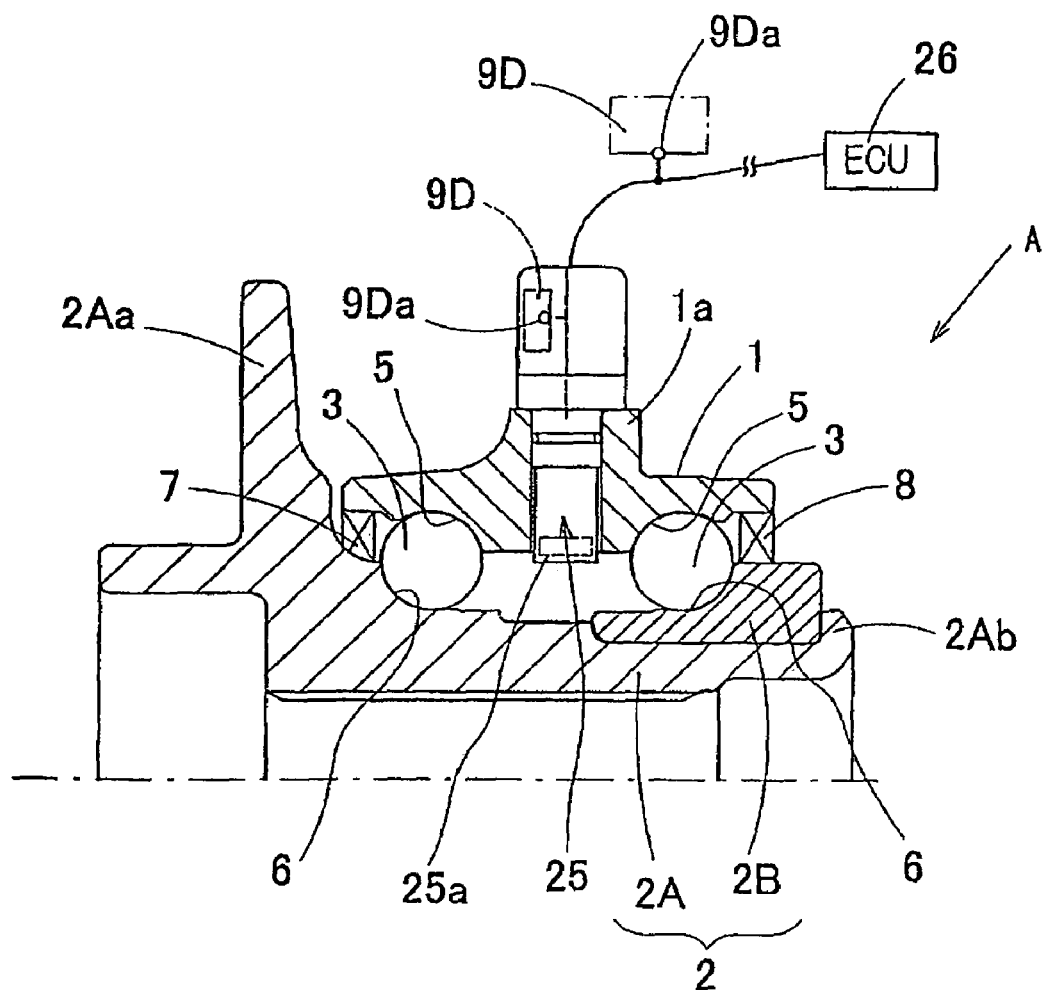
FIG. 13 is a fragmentary sectional view of a ninth preferred embodiment of the present invention.

FIG. 13 illustrates a ninth preferred embodiment of the present invention. This example is such that in the first embodiment shown in FIGS. 1 and 2, in place of the sensor incorporated IC tag 9 and the magnet 10, a sensor unit 25 for detecting an object to be detected of the wheel support bearing device is fitted and an IC tag 9D for recording a sensor output from this sensor unit 25 is provided. The IC tag 9D in this case corresponds to the IC tag capable of accomplishing a contactless communication such as, for example, the standard RFID based IC tag or the like, in which an external input terminal 9Da separate from a channel for the contactless communication is employed. This external input terminal incorporated IC tag 9D is provided within the sensor unit 25 or is provided connected with a signal line through which a signal from the sensor unit 25 is transmitted to an ECU (electronic control unit) 26 of an automotive vehicle. The sensor 25a in the sensor unit 25 is a rotation sensor or a displacement sensor or the like. Other structural features of this embodiment are similar to those shown and described in connection with the first embodiment with reference to FIG. 1.

In the case of this construction, the IC tag 9D is not designed to be a sensor incorporated IC tag, but an output of the sensor 25a is utilized for vehicle control purpose or the like and can be left in the IC tag 9D as a history. Because of this, the history of use of the wheel support bearing device can be confirmed during the eventual inspection and can be used for determination of the service life during the regular servicing.

It is to be noted that although any one of the first to ninth embodiments has been described as applied to the wheel support bearing device of a third generation type, the present invention can be applied regardless of any generation type. Also, although any one of the foregoing embodiments has been described as applied to the wheel support bearing device of an inner race rotating type, the present invention can be applied also to the wheel support bearing device of an outer race rotating type.

Figure 14:
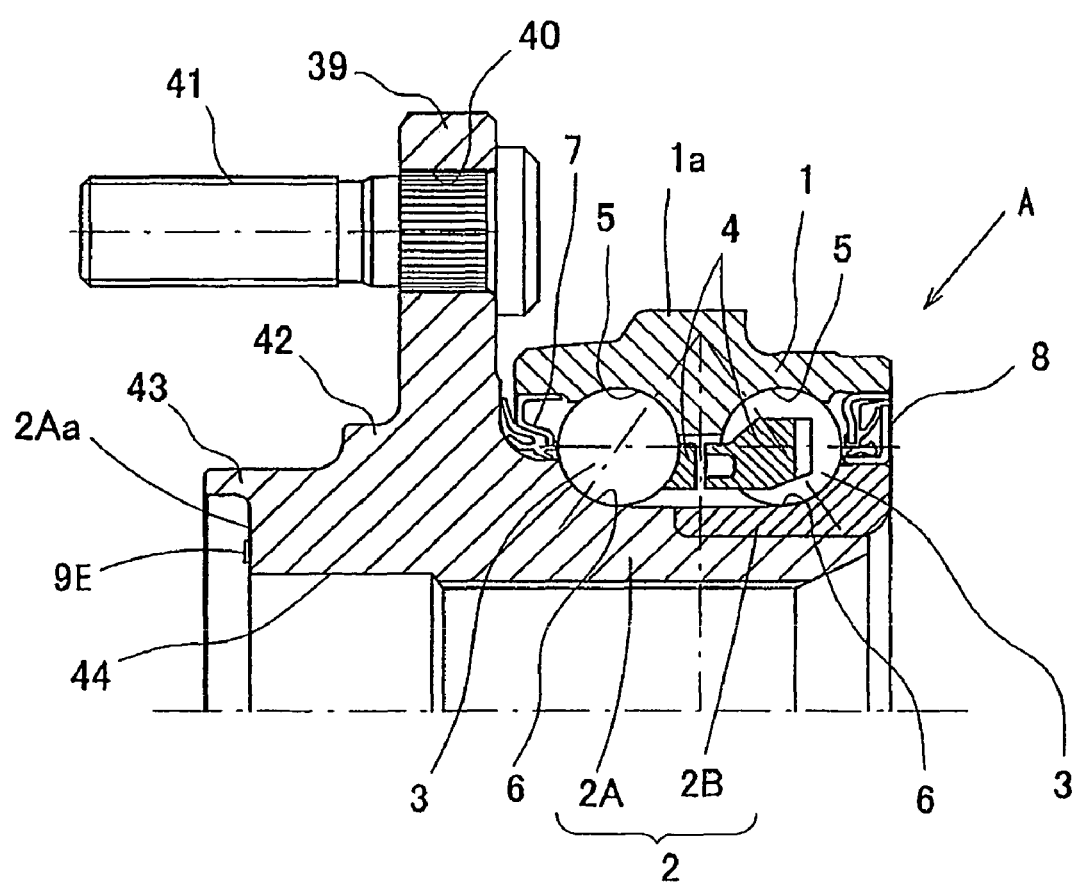
FIG. 14 is a fragmentary sectional view of the wheel support bearing, showing an example of a wheel support bearing subject to control by a quality control method according to a tenth preferred embodiment of the present invention.

In the next place, a quality control method of the wheel support bearing will be described. FIG. 14 illustrates a tenth preferred embodiment, showing an example of a wheel support bearing A, which forms an object to be controlled by the quality control method of the present invention, and like reference numerals used to denote the respective parts of the wheel support bearing device shown in FIG. 1 are employed to denote like parts and the details thereof are not reiterated.

The hub 2A has a wheel mounting flange 39 formed on an outer periphery of a portion on an outboard side with respect to an outer race 1 and a plurality of circumferentially spaced bolt press-fit holes 40 are defined in this flange 39. Each of the bolt press-fit hole 40 has a corresponding wheel mounting bolt 41 press-fitted thereinto.

On the hub 2A at an outboard side with respect to the flange 39, there are provided a brake pilot 42 and a wheel pilot 43. Also, the hub 2A has an inner diametric bore 44, into which a stem portion (not shown) of an outer race of a constant velocity universal joint is inserted and fitted thereto by spline. When a nut threadedly mounted on a male thread portion at a free end of the stem portion is fastened, the inner member 2 and the constant velocity universal joint outer race are coupled with each other for rotation together therewith.

An IC tag 9E of a contactless communicating type is affixed to the inner member 2 of this wheel support bearing A. The position at which the IC tag 9E is fitted is chosen to be an end face 2Aa at an outboard side on an inner diametric side of the hub 2A with respect to the wheel pilot 43. It is, however, to be noted that where this end face 2Aa forms a seat for a coupling nut (not shown) used to connect with the constant velocity universal joint outer race, the IC tag 9E has to be fitted to a region excluding that portion defining the seat.

The IC 9E is, in this instance, affixed by bonding to the surface of the above described end face 2Aa. It is to be noted that the IC tag 9E is employed in the form of an IC tag capable of affixing to a metallic surface or the IC tag 9E is affixed with the intervention of an insulating material or a radio frequency noise suppressing material (not shown) such as, for example, a dielectric material.

Figure 24:
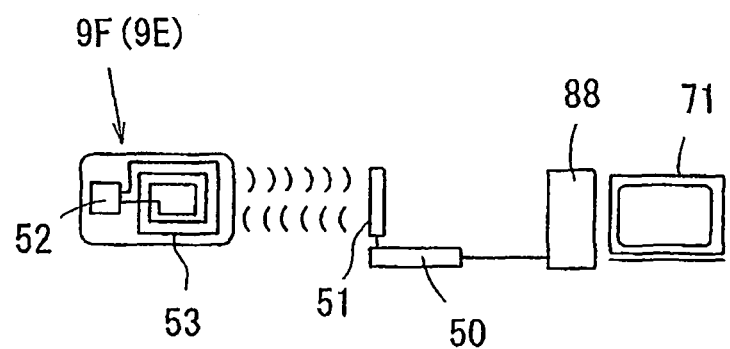
FIG. 24 is an explanatory diagram showing a relation between the IC tag and a tag communicator.

The IC tag 9E will now specifically described with reference to FIGS. 24 and 25. Reading and writing of information in the IC tag 9E is performed by means of a tag communicator 50. Where the IC tag 9E is of a read/write type, an IC tag reader/writer is used as the tag communicator 50, but where the IC tag 9E is of a read-only type, a tag reader having no write functionality is used as the tag communicator 50. The tag communicator 50 has an antenna 51 to be opposed to the IC tag 9E. Where the IC tag 9E is of a type capable of recording and reading information on a non-contact basis or of a type incapable of overwriting and is made up of an IC chip (integrated circuit chip) 52 and an antenna 53. The IC chip 52 and the antenna 53 are encapsulated with, for example, resin (not shown). The IC tag 9E is available in various types, shapes and sizes and may be rectangular or plate-like in shape as well as squared or spherical in shape of a size smaller than, for example, 1 mm. Also, an IC tag 9E that can be formed directly on an object by means of printing is also available. The storage capacity is varying, but proper selection may be made depending on the application, the size and/or the variety of an object to which it is affixed.

For the IC tag 9E, for example, an RFID based tag that utilizes the RFID technology can be employed. The RFID based IC tag is available in various types utilizing electrostatic coupling, electromagnetic coupling, electromagnetic induction, microwaves and light for a transmission system and, of them, any type can be employed. By way of example, the IC tag of an electromagnetic induction type or a microwave type can be employed.

Figure 25:
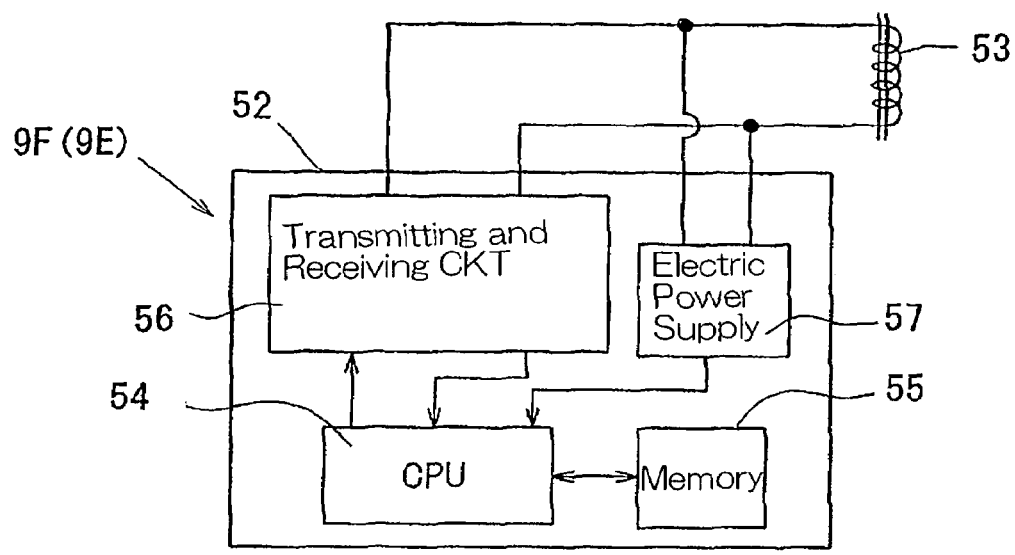
FIG. 25 is a block diagram of an example of the circuit of the IC tag.

FIG. 25 illustrates a specific circuit example of the IC tag 9E. The IC chip 52 of this IC tag 9E includes a central processing unit (CPU) 54, a memory 55, a transmitting and receiving circuit 56 and an electric power supply circuit 57, and the electric power supply circuit 57 is rendered to be of a type capable of acquiring an electric power through the antenna 53. The memory 55 is of a type that does not require an electric power for the storage of information.

According to the wheel support bearing A shown in FIG. 14, since the IC tag 9E is affixed to an elemental component that forms this bearing device, it is possible to record an identification information such as, for example, the lot number and the manufacturer's serial number of the wheel support bearing A and, also, to record a manufacturing history information in the IC tag 9E. For the manufacturing history information, it includes the site of manufacture, the date of manufacture, information on processing conditions, dimensions after processing and inspection results of various kinds. Information concerning a preload may be recorded in the IC tag 9E. Since for the IC tag, a contactless communicating type is employed, when the IC tag communicator 50 is appropriately used, information recorded in the IC tag 9E can be read out as shown in, for example, FIG. 26, while the wheel support bearing A remains fitted to the automotive vehicle. Because of this, it is possible to easily acquire information concerning the wheel support bearing, at the time of regular servicing or at the time the necessity occurs. If the tag communicator 50 is provided, in addition to a tag reader 50a capable of performing communication, with an information processing module 50b for processing results of information read out from the IC tag 9E, it is possible to determine from the manufacturer's serial number or the like whether or not it is a predetermined object to be inspected. Also, if the IC tag 9E of a large capacity is employed, it is possible to record in the IC tag 9E, the entire manufacturing history of various elemental components used to form the wheel support bearing A. In such case, without reference required to a database or the like, the manufacturing history of the wheel support bearing A can be read out easily.

In the example of the wheel support bearing shown in FIG. 14, the place of installation of the IC tag 9E is chosen to be the outboard side end face 2Aa on an inner diametric side of the hub 2A, which is a forged component part, with respect to the wheel pilot 43. Since this face 2Aa is a face to which no turning is applied subsequently, the IC tag 9E can be affixed thereto immediately after the forging of the hub 2A. However, where a shot blasting is applied immediately after the forging, the IC tag 9E is affixed after it. In this way, the history of the entire process steps after the forging, for example, the process steps ranging from a primary turning to grinding by way of induction hardening and secondary turning can be brought down, having been recorded for each process step. While heat treatment is carried out for, for example, surface hardening of the raceway surfaces 6, since an induction hardening is employed, it is possible to minimize transmission of influences, brought about by a heat treatment, to the IC tag 9E even though the IC tag 9E is affixed immediately after the forging.

Also, since in a condition, in which the wheel support bearing device 1 is fitted to the automotive vehicle, the outboard side end face 2Aa is a face oriented outwardly of the automotive vehicle, the information recorded can easily be read out when the tag communicator 50 or the like is brought close to while the wheel support bearing A remains fitted to the automotive vehicle.

Figure 15A:
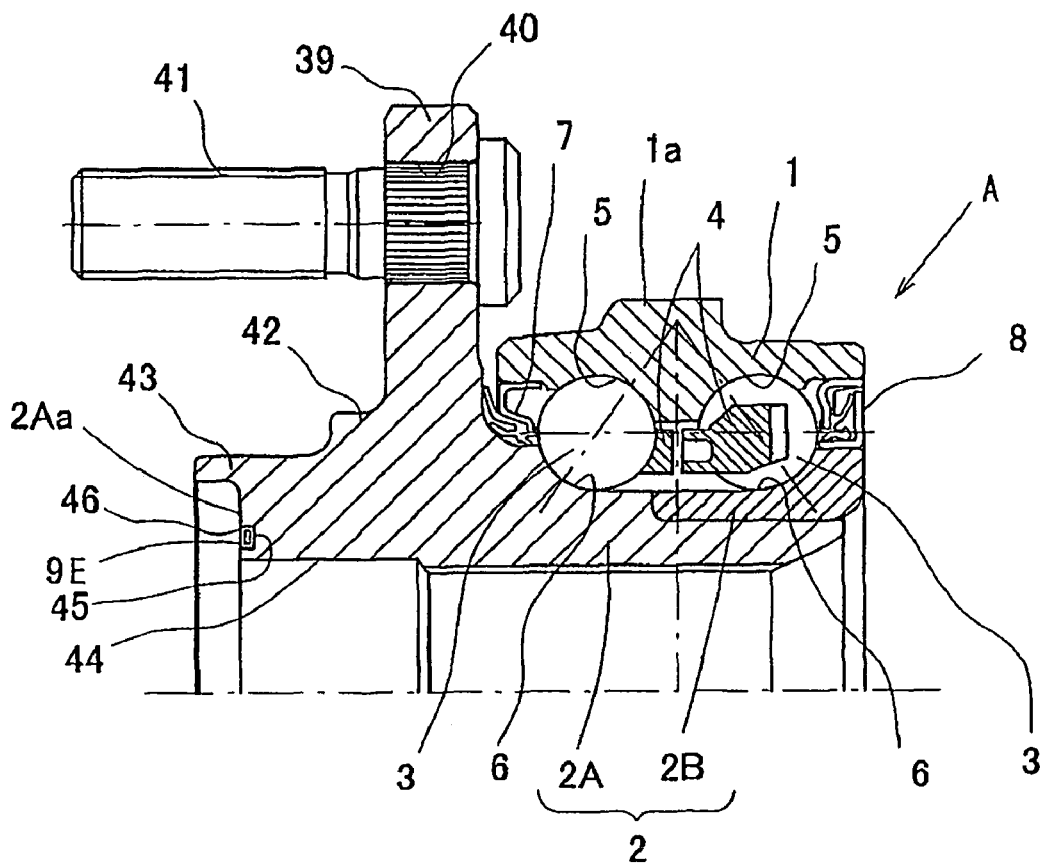
FIG. 15 is a fragmentary sectional view of an example of the wheel support bearing according to an eleventh preferred embodiment of the present invention and a fragmentary enlarged view of a portion thereof.

FIG. 15 illustrates an eleventh preferred embodiment of the wheel support bearing A, which forms an object to be controlled by the quality control method of the present invention. While in the example shown in FIG. 14, the IC tag 9E has been affixed directly to a surface of the hub 2A, in the example shown in FIG. 15, a tag mounting recess 45 is provided in the hub 2A and the IC tag 9E is provided within this tag mounting recess 45. In such case, as a countermeasure against radio wave absorption, it is preferable that an insulating member 46 may be provided for covering an inner surface of the tag mounting recess 45 and the IC tag 9E may then be fitted in the form as embedded in this insulating member 46. The insulating member 46 may be a member made of, for example, resin or any other suitable material effective to obtain a gap, in which no electrical interference occurs between a metal and the IC tag 9E. In such case, by means of resin molding, the IC tag 9E may be fixed within the tag mounting recess 45. Also, after the IC tag 9E has been covered with the insulating member 46, the IC tag 9E with the covering thereof may be fitted within the tag mounting recess 45.

When the insulating member 46 for covering the inner surface of the tag mounting recess 45 is provided in this way, the IC tag 9E can be read without accompanying a problem such as, for example, radio disturbance on the metallic surface. Also, if it is fitted in the form as embedded, a problem of interference with other articles and a problem of separation will occur hardly. Other structural features of this example are similar to those shown and described in connection with the tenth embodiment with reference to FIG. 14.

Figure 15B:
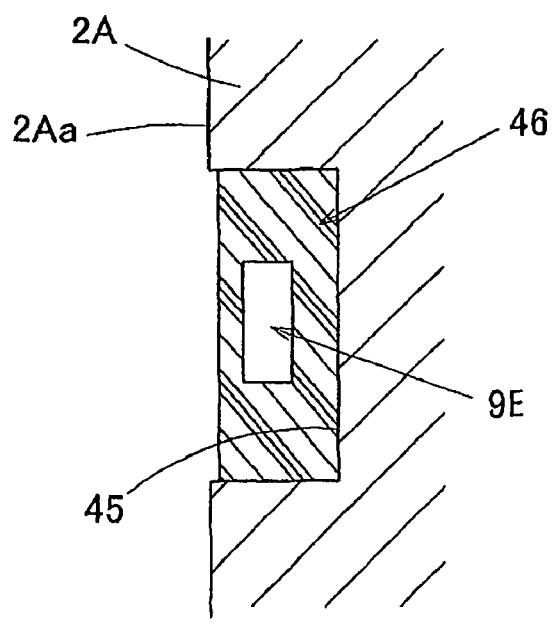

It is to be noted that the structure such as shown in FIG. 15(B), in which the insulating member 46 for covering the inner surface of the tag mounting recess 45 is provided and the IC tag 9E is then fitted in the form as embedded in the insulating member 46 or the IC tag 9E is, after having been covered with the insulating member 46, embedded within the tag mounting recess 45, may be applied not only to the case, in which it is fitted to the hub 2A, but also to the case, in which the IC tag 9E is fitted to the outer race 1, core metals of the seals 7 and 8 or a metallic component part.

Figure 16:
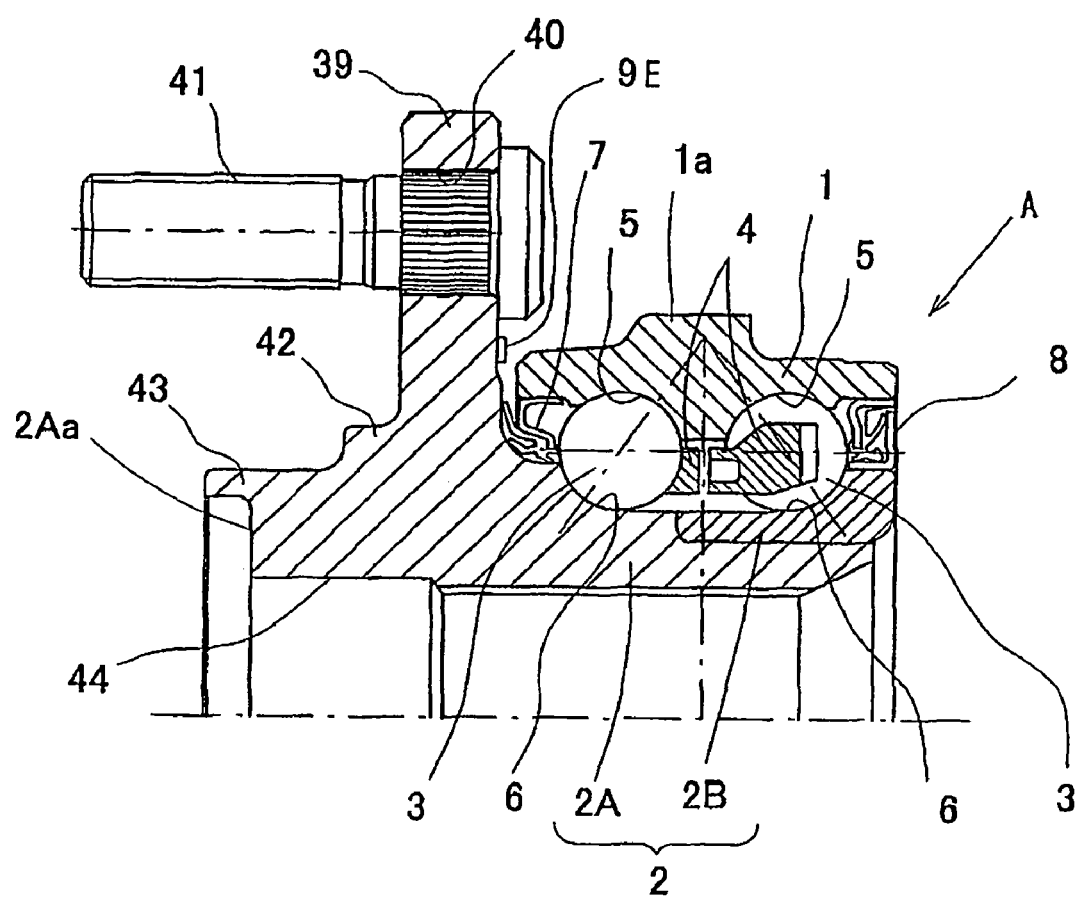
FIG. 16 is a fragmentary sectional view of an example of the wheel support bearing according to a twelfth preferred embodiment of the present invention.

In the hub 2A, the place of installation of the IC tag 9E may be a side face on an inboard side of the flange 39 as shown in, for example, FIG. 16 in connection with a twelfth preferred embodiment, other than that described above. This face can provide a space around it even after the wheel support bearing A has been fitted to the automotive vehicle and communication with the IC tag 9E can be carried out easily.

Figure 17:
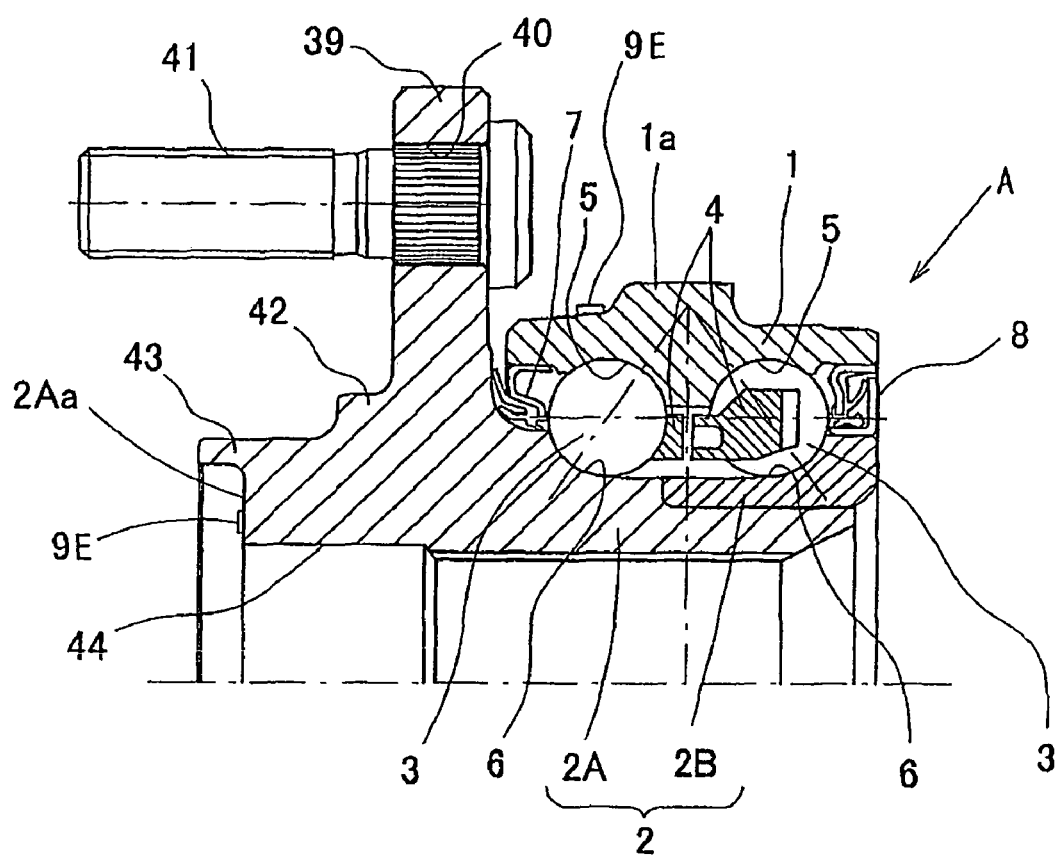
FIG. 17 is a fragmentary sectional view of an example of the wheel support bearing according to a thirteenth preferred embodiment of the present invention.

As shown in FIG. 17 in connection with a thirteenth preferred embodiment, the IC tag 9E may be fitted to the outer member 1. The place of installation is preferably an outer peripheral surface on the outboard side with respect to the vehicle body fitting flange 1a. This outer peripheral surface portion can provide a space therearound even after the mounting of the wheel support bearing on the automotive vehicle and communication with the IC tag 9E can be carried out easily. Since the outer member 1 is generally rendered to be a forged component part, information of the various process steps subsequent to the forging can be recorded when even in this case the IC tag 9E is fitted after the forging.

In the thirteenth embodiment shown in FIG. 17, the IC tag 9E is fitted to both of the outer member 1 and the hub 2A and, in such case, information on the outer member 1 and the hub 2A after the forging can be recorded in the IC tag 9E on the outer member 1 and in the IC tag 9E on the hub 2A, respectively.

It is to be noted that even the inner race 2B is a forged component part and the IC tag 9E may be affixed thereto.

Figure 18:
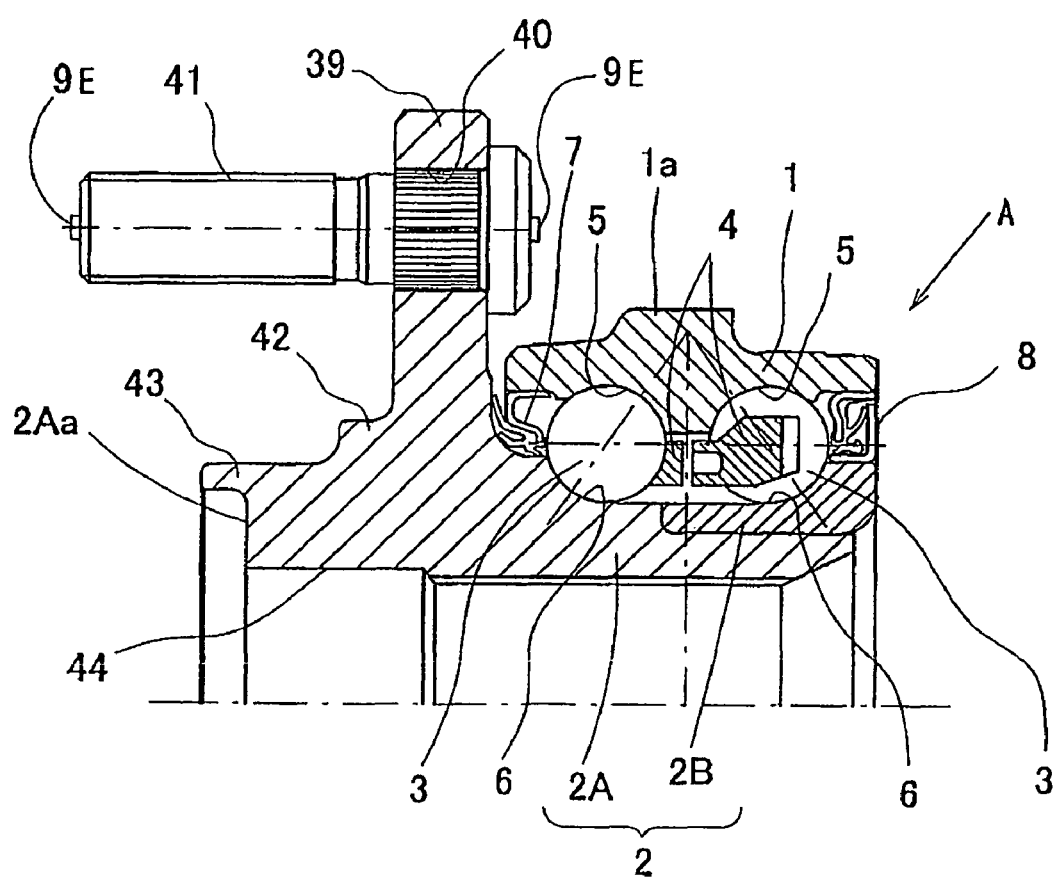
FIG. 18 is a fragmentary sectional view of an example of the wheel support bearing according to a fourteenth preferred embodiment of the present invention.

In a fourteenth preferred embodiment shown in FIG. 18, there is shown an example, in which the IC tag 9E is affixed to an end face of one of the wheel mounting bolts 41 press-fitted into the respective bolt press-fit holes 40 defined in the flange 39 of the hub 2A. In this figure, although the IC tag 9E is shown as affixed to opposite ends of one of the wheel mounting bolts 41, it is affixed to either one of them. In other words, the IC tag 9E is affixed to either a head or one of a free end of a shank of the bolt. Even in this case, the IC tag 9E may be provided on a surface or provided in the form as embedded. Even in the end face of the wheel mounting bolt 41 a space therearound can be obtained after the mounting of the wheel support bearing on the automotive vehicle and communication with the IC tag 9E can be carried out easily.

The IC tag 9E of a compact construction is available and, when such IC tag 9E is employed, the IC tag 9E can be affixed to a place difficult to be embossed or marked with a laser beam such as, for example, the bolt end face or the inner diametric side portion of the hub 2A with respect to the wheel pilot 43 shown in FIG. 14.

Figure 19:
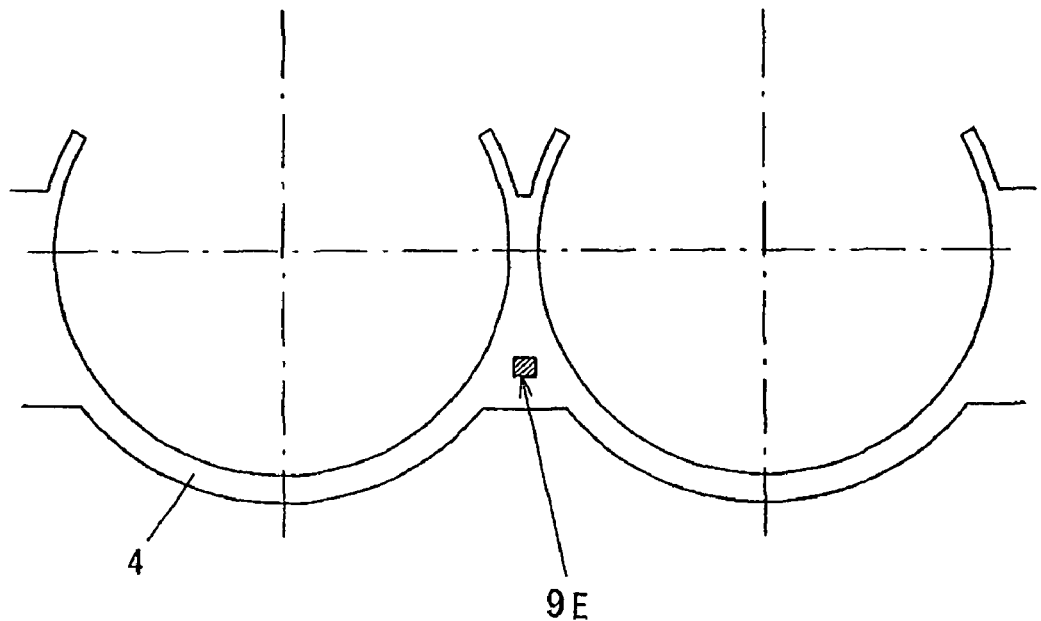
FIG. 19 is a fragmentary front elevational view of a retainer employed in an example of the wheel support bearing according to a fifteenth preferred embodiment of the present invention.

The place of installation of the IC tag 9E may be a retainer 4 as is the case with a fifteenth preferred embodiment shown in FIG. 19 other than the above. If the retainer 4 is made of a synthetic resin, the IC tag 9E of a kind that cannot be affixed directly to the metallic surface can be affixed thereto with no problem.

Figure 20:
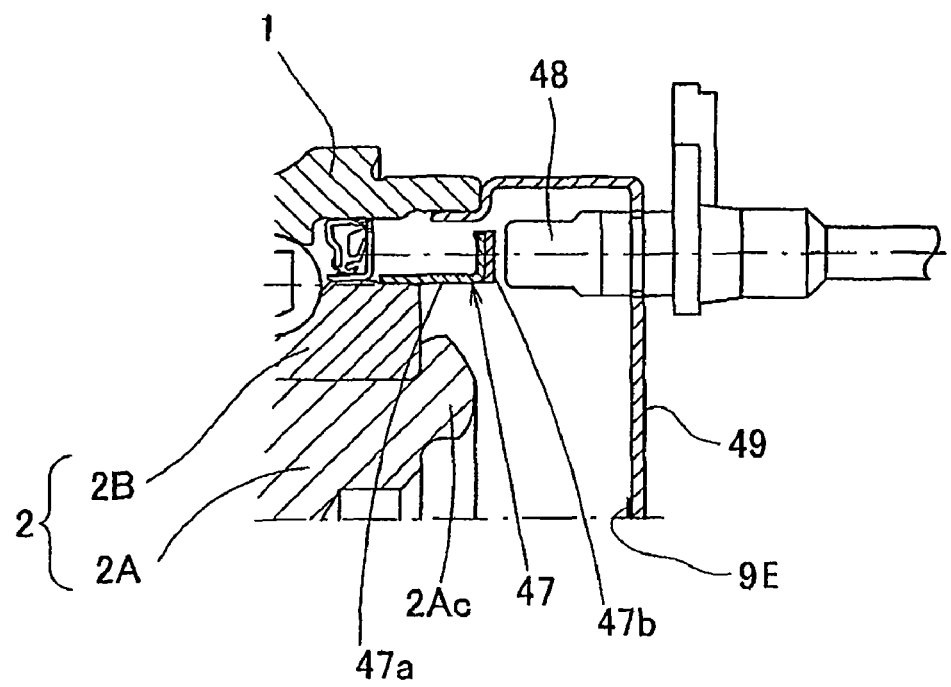
FIG. 20 is a fragmentary sectional view of the neighborhood of a sensor installed position an example of the wheel support bearing according to a sixteenth preferred embodiment of the present invention.
Figure 21:
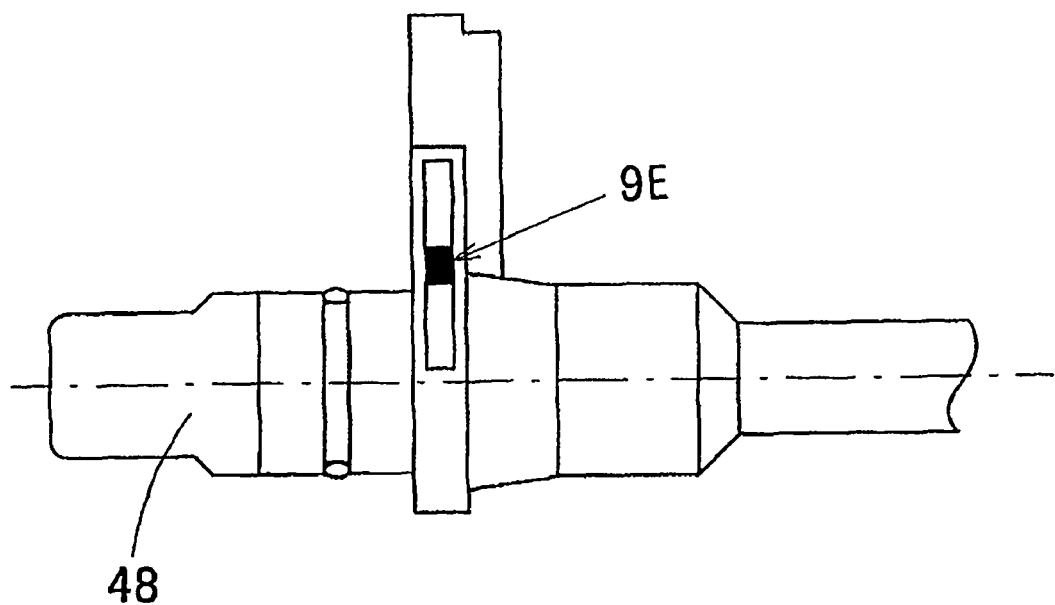
FIG. 21 is an enlarged front elevational view of the sensor thereof.
Figure 22:
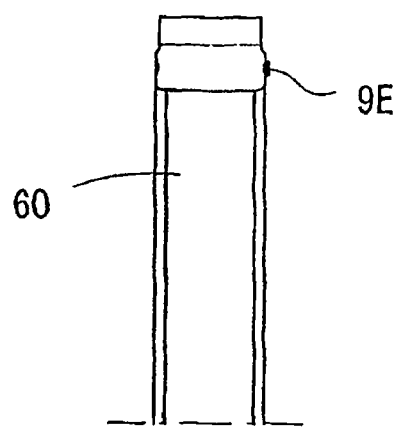
FIG. 22 is a fragmentary enlarged side view of a sensor mounting ring therefor.
Figure 23A:
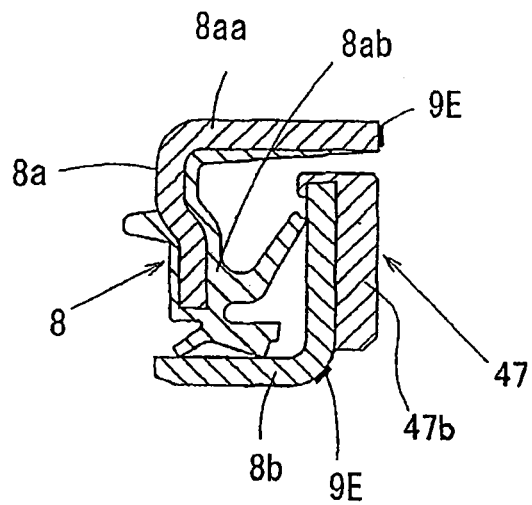
FIG. 23 is a sectional view of some examples of a seal used in the example of the wheel support bearing pertaining to the seventeenth embodiment.

A sixteenth preferred embodiment shown in FIG. 20 to FIG. 22 and a seventeenth preferred embodiment shown in FIG. 23(A) are such that in the wheel support bearing A, the IC tag 9E is affixed to a sensor associated component part. Although the sixteenth embodiment is an example, in which the rotation sensor 48 is provided, similar is the case, in which a sensor (not shown) for detecting an object to be detected other than rotation, for example, a temperature or a load is provided.

In the sixteenth preferred embodiment shown in FIG. 20, in the tenth embodiment shown in FIG. 14, an encoder 47 is fitted to the inner member 2 and a rotation sensor 48 is fitted to the outer member 1 through a sensor cap 49. The encoder 47 is a magnetic encoder made up of a core metal 47a and a multipolar magnet 47b. The rotation sensor 48 is employed in the form of, for example, a Hall element or a magnetoresistive element. The rotation sensor 48 is of a type utilized in controlling an anti-lock brake system. It is to be noted that although in the case of this example, the inner race 2B is fixed to the hub 2A by means of a crimped portion 2Ac, other structural features as the wheel support bearing A are similar to those shown and described in connection with the tenth embodiment shown in FIG. 14.

In the case of the wheel support bearing A with sensors such as the rotation sensor 48 or the like fitted thereto as described above, the IC tag 9E may be affixed to the encoder 47, which becomes a sensor associated component part, the rotation sensor 48 or a mounting component therefor or the like.

By way of example, as is the case with the example shown in FIG. 20, the IC tag 9E may be affixed to the sensor cap 49, or to the rotation sensor 48 as is the case with the example shown in FIG. 21. Other than it, the IC tag 9E may be affixed to a sensor ring 60 where the sensor 48 is fitted to the outer member 1 through the sensor ring 60 as is the case with the example shown in FIG. 22.

The sensor such as, for example, the rotation sensor 48 is generally inspected in a total number thereof at the time of shipment. For this reason, at the time of inspection, information concerning the initial performance at the time of shipment or the like can be written in the IC tag 9E and, therefore, no extra step of information writing is needed, allowing an efficient writing to be performed. While the product information such as, for example, the model number and/or the manufacturing lot number have hitherto been indicated by imprinting or the like it on a product itself, or printed on a package box, the contents that can be described in the product itself and the package box are limited to a minimum number. IF the IC tag 9E is affixed to the sensor associated component part as described above, a substantial amount of information at the time of shipment can be recorded and the information so written can be read out at any time when the necessity arises for examination purpose or the like.

Figure 23B:
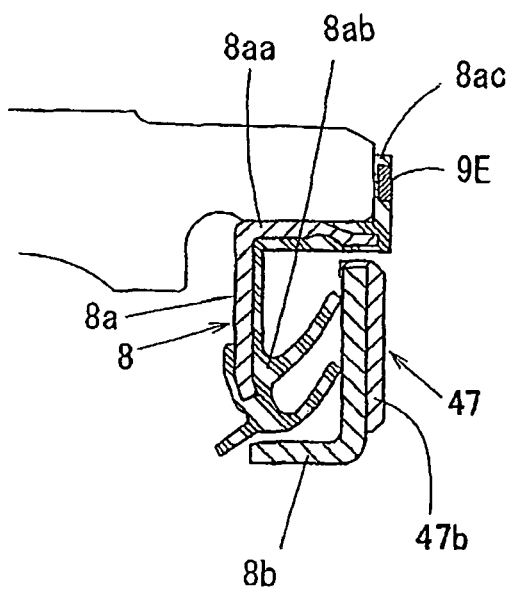

FIGS. 23(A) and 23(B) illustrate examples, in which the IC tag 9E is affixed to the seal 8. In those figures, the seal 8 is of a combination type made up of a fixed side seal 8a and a slinger 8b. The fixed side seal 8a is fitted to the outer member 1 of the tenth embodiment shown in FIG. 14 whereas a rotating side seal 8b is fitted to the inner member 2. Also, the fixed side seal 8a is made up of a core metal 8aa and an elastic member 8ab such as, for example, rubber. The rotating side slinger 8b concurrently serves as a core metal for the encoder 47 and is provided with a multipolar magnet 47b.

In the example shown in FIG. 23(A), the IC tag 9E is affixed to an end face of the fixed side seal 8a, which is oriented outwardly of the bearing, or to a surface of the rotating side seal 8b, which is oriented outwardly of the bearing. In this figure, examples of installation at various places are shown in the same figure and IC tag 9E is shown at two locations, but those IC tags 9E at those two locations are selectively provided.

The example shown in FIG. 23(B) is such that a portion 8ac extending towards an end face of the outer member 1 is provided integrally in the elastic member 8ab of the fixed side seal 8a and the IC tag 9E is provided as embedded in this portion 8ac.

Those examples shown respectively in FIGS. 23(A) and 23(B) are such that since the IC tag 9E is affixed to the face oriented outwardly of the bearing, communication can be easily carried out. In the example shown in FIG. 23(B), since the IC tag 9E is provided embedded in the elastic member 8ab, the IC tag 9E of a kind that cannot be installed directly on a metal can be used and, since it is embedded, the IC tag 9E can be protected.

It is to be noted that in any one of the foregoing examples, reference has been made to the wheel support bearing of the third generation type, the quality control method for the wheel support bearing according to the present invention can be equally applied to the wheel support bearing of any one of the first to fourth generation types.

Figure 27:
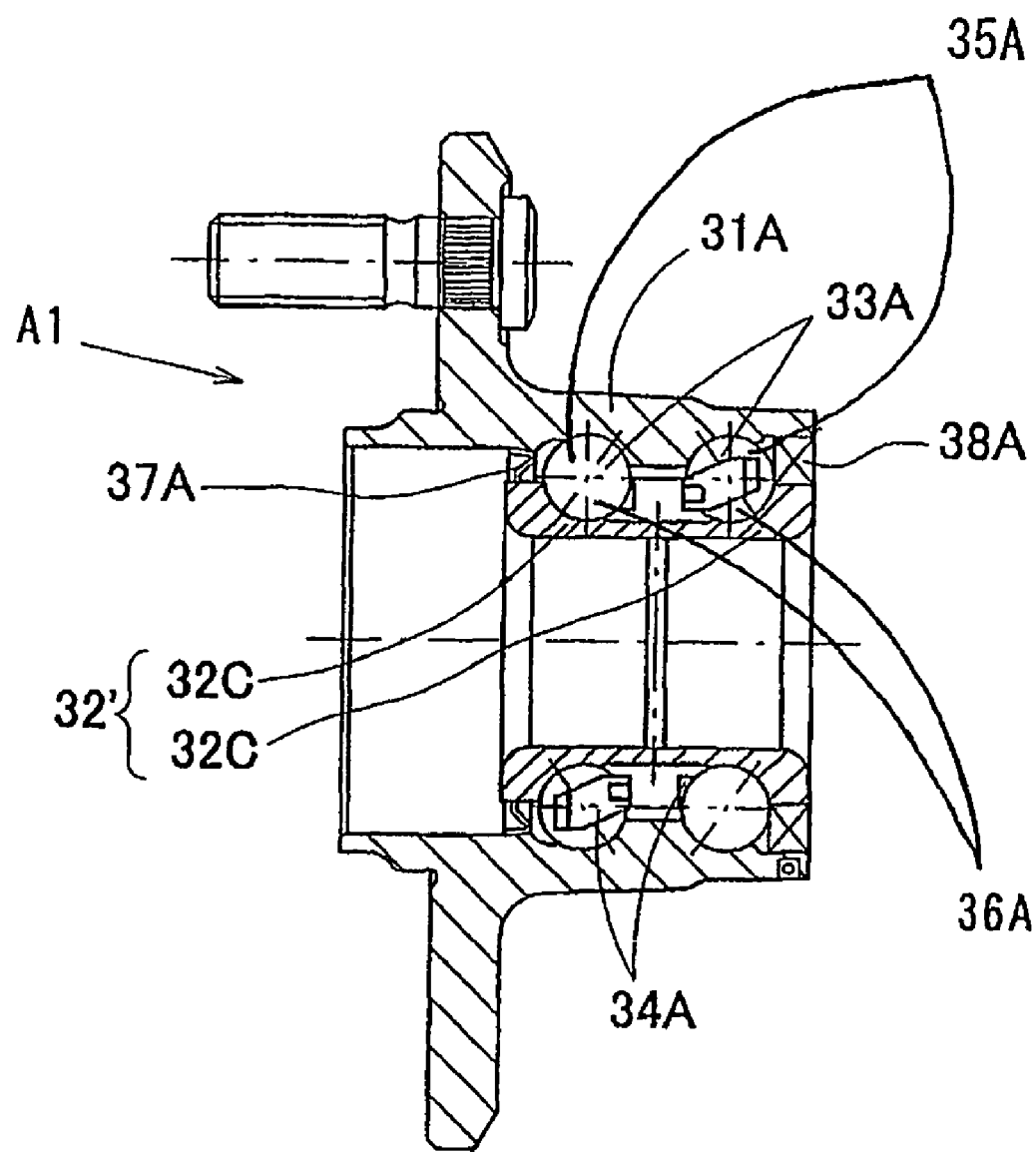
FIG. 27 is a sectional view of an example of the wheel support bearing according to an eighteenth preferred embodiment of the present invention.

Also, as shown in an eighteenth preferred embodiment in FIG. 27, it can be applied to the wheel support bearing A1 of the outer race rotating type. The wheel support bearing A1 shown therein includes an outer race 31A and a pair of inner races 32C and 32C, with rolling elements 33A interposed between double rows of rolling surfaces 36A and 35A of the inner and outer races 32C and 31A. Each row of the rolling elements 33A is retained by a respective retainer 34A. Also, opposite ends of a bearing space delimited between the inner and outer races 32C and 31A are sealed by respective seals 37A and 38A.

Figure 28:
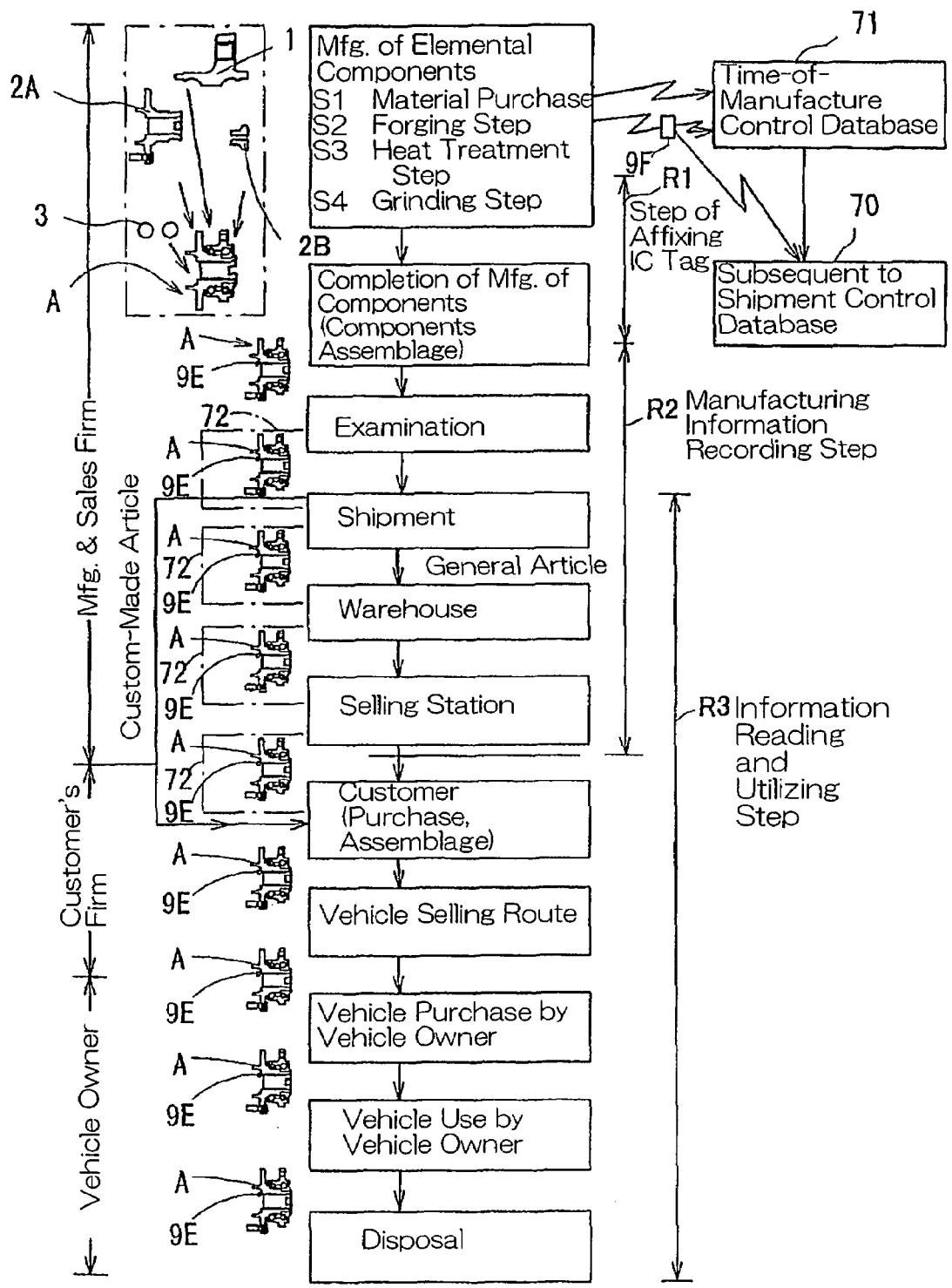
FIG. 28 is an explanatory diagram showing the quality control method for the wheel support bearing according to the tenth embodiment.

Hereinafter, the quality control method for the wheel support bearing according to the tenth embodiment of the present invention will be described with reference to FIG. 28. FIG. 28 illustrates various stages of the flow from manufacture to disposal of the wheel support bearing A and, also, quality control steps utilizing the IC tag 9E at each stage thereof. The quality control method for the wheel support bearing A is a method including affixing the IC tag 9E to the wheel support bearing, recording a predetermined manufacturing information, ranging from purchase of material to inspection through a forging step, then through a heat treatment step and finally through a grinding step associated with the wheel support bearing A, in the IC tag 9E, and enabling the traceability, associated with the quality control of the wheel support bearing, from the recorded information read out from the IC tag 9E. The forging step may include a turning step subsequent to the forging or may be a step of turning a raw material without being forged.

The quality control method for this wheel support bearing includes a step R1 of affixing the IC tag, a step R2 of recording manufacturing information, and a step R3 of reading and utilizing the recorded information, as described below.

(IC Tag Affixing Step R1)

During this step, the IC tag 9E is affixed to the wheel support bearing A at the time of the manufacturing or completion of the manufacture thereof. In such case, the wheel support bearing A may be assembled after the IC tag 9E has been affixed to one of the elemental components 95 forming the wheel support bearing, or the IC tag 9E may be affixed to the wheel support bearing after the assemblage of the wheel support bearing A has completed. The elemental components 95 referred to above are intended to speak of the outer race 1, the hub 2A, the inner race 2B, the rolling elements 3 and so on in the example shown in FIG. 14 and, unless the necessity to specify one of them arise, they are collectively referred to as the elemental components 95.

(Manufacturing Information Recording Step R2)

During this step, manufacturing information on various stages of the production process occurring by the time of shipment or delivery to a customer, including purchase of material, a forging step, a heat treatment step, a grinding step and a step of examination for the wheel support bearing A, is recorded on the IC tag 9E affixed to the wheel support bearing A. The manufacturing information so recorded also includes information on processing conditions of at least one of the forging, heat treatment and grinding steps. The material purchase, forging, heat treatment and grinding, described above in connection with wheel support bearing A, are those performed on each of the elemental components 95 of the wheel support bearing A. The information on the processing conditions includes, for example, the press pressure, the cycle time and other parameters, so long as the forging step is concerned; the heat treatment temperature, the heating time and the heating method and other parameters, so long as the heat treatment step is concerned; and the rotational speed of a grinding stone, the cutting speed, the feed speed and other parameters, so long as the grinding step is concerned. It is preferred that in addition to the processing condition information referred to above, the manufacturing information may include at least one of pieces of information concerning the date of manufacture of the wheel support bearing, the place of manufacture of the wheel support bearing, the brand of the grease employed therein, the gap size between the elemental components employed, the term of warranty and handling cautions of the wheel support bearing. Information on various results of examination may also be included preferably in the manufacturing information. Those results of examination may include results of examination on each of the elemental components 95 and results of examination of the complete product. Again, other than those pieces of information, the manufacturing information may additionally include a piece of information on identification of the wheel support bearing A. The identification information on the wheel support bearing A may in turn include information on identification unique to each of the wheel support bearings such as, for example, the manufacturer's serial number and/or identifying information specific to a particular lot of the wheel support bearings A, for example, the lot number. Recording of those pieces of manufacturing information may be carried out all at a time or on a piecemeal basis. By way of example, when assemblage of the wheel support bearing A completes and the complete product is subsequently examined, some of those pieces of information, which are associated with the results of examination and examining conditions may recorded, while the remaining pieces of information may be recorded subsequently, or all of those pieces of information including the information of the examination may be recorded all at a time.

(Example Applicable where the IC Tag is Affixed During the Manufacturing Step and Recording is Made for Each Step)

Affixation of the IC tag 9E to the wheel support bearing A may be carried out immediately after forging such as shown in, for example, the example of the hub 2A in FIG. 29. As described in connection with the example shown in FIG. 14, if it is the surface where no machining is applied after forging, the IC tag 9E may be affixed immediately after the forgoing. Where the shot blasting or the like is performed after forging, the IC tag 9E is affixed after such treatment.

The hub 2A is subsequently manufactured through the turning, induction heat treatment and grinding (including polishing or superfinishing) steps, but where the IC tag 9E is affixed immediately after the forging, the manufacturing information on the subsequent process steps can be recorded in the IC tag 9E for each process step. Since the heat treatment is an induction heat treatment of the raceway surfaces, a problem associated with thermal damage of the IC tag 9E can be avoided.

FIG. 29 illustrates an example applicable where the elemental component 95 is the hub 2A, but even with the forged component such as, for example, the outer race 1 and the inner race 2B or the like, the IC tag 9E can be affixed immediately after the forging as is the case with the hub 2A and the manufacturing information on such elemental component 95 can be recorded in the IC tag 9E for each process step.

As described above, the information recorded in the elemental component 95 such as, for example, the hub 2A, may be transferred in its entirety to the IC tag 9E affixed subsequently to any elemental component 95 or the like of the wheel support bearing A. The IC tag 9E recorded with the entire information in such case is preferably at a location accessible for reading while the wheel support bearing A is left mounted on the automotive vehicle. By way of example, as is the case with the example shown in FIG. 14, it may be the IC tag 9E affixed to the end face 2Aa on the inner diametric side of the hub 2A with respect to the wheel pilot 43, or the IC tag 9E affixed to the sensor 48 or the sensor associated part described with reference to FIGS. 20 and 21.

(Information Reading and Utilizing Step R3)

This step is such that at an arbitrarily chosen time subsequent to the shipment, the information recorded in the IC tag 9E is read out and at least the processing condition information is then confirmed from the information so read out.

The flow of the wheel support bearing A from completion of the manufacture to disposal generally includes, as shown in FIG. 28, completion of assemblage of the wheel support bearing A to disposal thereof by way of examination of the complete product, shipment, storage in a warehouse, storage at business premises, delivery to a customer (inclusive of customer automotive vehicle manufacturing corporation's purchase and incorporation of the wheel support bearing into the automotive vehicle), an automobile sales route in the customer or the automobile dealer (or an automobile leasing route), purchase and use of the automotive vehicle by the user and disposal. In the case of a custom-made article, it may occur that the custom-made article is delivered directly to a customer immediately after the shipment.

Reading and utilization of the information recorded on the IC tag 9E takes place at any time subsequent to the shipment, depending on the necessity and some of the pieces of the information so read out from the IC tag 9E, which are required, are then confirmed. By way of example, at the stage of use of the automotive vehicle by an owner thereof, or at a maintenance shop or the site of the automotive vehicle, various pieces of information concerning material and performance or the like of the wheel support bearing are read from the IC tag 9E affixed to the wheel support bearing A and a technical analysis is then carried out. At this time, if the recorded information contains not only that on the material and the result of examination of each of the elemental components 95, but also the processing condition information, the trouble shooting can easily and precisely be accomplished.

Figure 26:
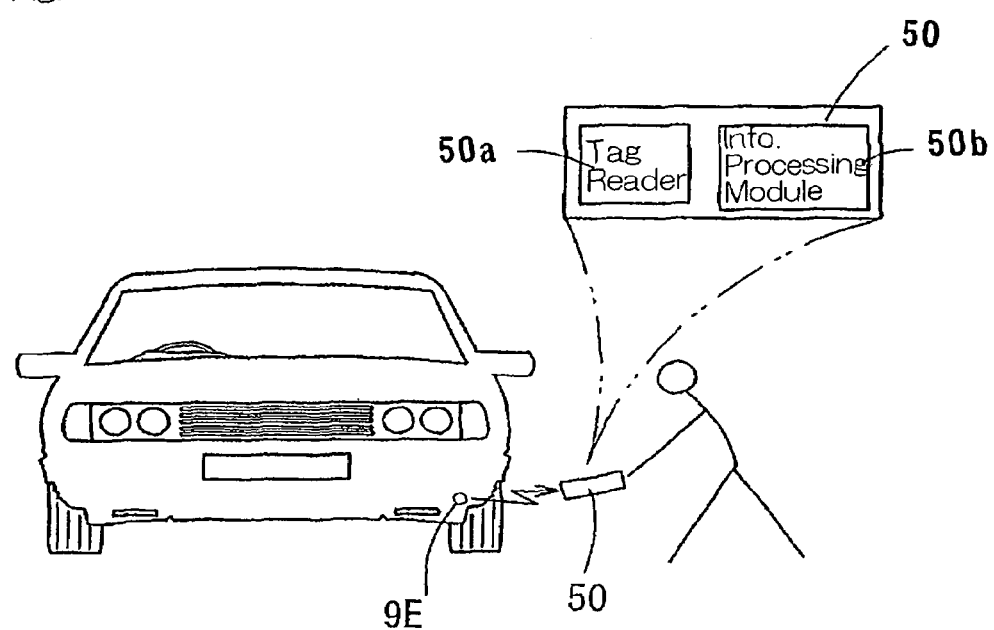
FIG. 26 is an explanatory diagram showing an example of the manner of reading of the IC tag.

While the wheel support bearing A mounted on the automotive vehicle is left as mounted on the automotive vehicle, the reading of the information from the IC tag 9E can be accomplished by bringing the tag communicator 50 close to the automotive vehicle as hereinbefore described with reference to, for example, FIG. 26. Because of this, the information on the wheel support bearing A can be simply and quickly available.

By way of example, the information processing module 50b provided in the tag communicator 50 may have stored therein information on the range of objects to be inspected of the bearing or the information processing module added to the tag communicator 50 may have stored therein the range of the objects to be inspected, so that the information read from the IC tag 9E and the information on the range of the objects to be inspected are compared to output a result of determination as to whether or not it is an object to be inspected. The information on the range of the objects to be inspected may be information on the range of, for example, the manufacturer's serial numbers or information on the range of the dates of manufacture and the places of manufacture. The example shown in FIG. 26 illustrates a portable type of the tag communicator 50 including a tag reader 50a and an information processing module 50b. The tag communicator 50 may be a tag reader/writer.

In FIG. 28, as an additional utilization that can be available during this information reading and utilizing step R3, the capacity of a memory built in the IC tag 9E affixed to the wheel support bearing A, which is left unoccupied, can be used for shipment control, stock management, delivery management, maintenance control and others.

According to the foregoing quality control method for the wheel support bearing, since one of the pieces of the processing condition information including the forging step, the heat treatment step, the grinding step and others can be confirmed during the information reading and utilizing step R3 taking place at any desired time subsequent to the shipment, even in the wheel support bearing A, which includes the rolling elements 3 and is made up of the plural elemental components 95 and which requires a severe quality and precision, it is possible to facilitate a technical analysis. Also, in the case of this method, no database is required and the information can be controlled only by the IC tag 9E and, therefore, in the facilities where the processing condition information is confirmed, the processing condition information can be read out from the IC tag 9E regardless of the use of communication facilities necessary to make access to the database and the access authority.

Although the above described embodiment is a method of conducting the quality control by the use of the recorded information while the manufacturing information has been recorded in the IC tag 9E as many as possible, it may be used in combination with the database 70.

In other words, as the database 70, the predetermined manufacturing information on the flow from the purchase of material to the inspection by way of the forging step, the heat treatment step and the grinding step for the wheel support bearing A is stored in association with the identifying information on the wheel support bearing A, so that contents stored in the database 70 can be extracted based on the identifying information. The quality control is carried out by the utilization of the database 70 and the IC tag 9E affixed to the wheel support bearing A. In such case, during the various steps R1 to 3, the following processing takes place.

(IC Tag Affixing Step R1)

This step R1 is identical with that described in connection with the previous embodiment.

(Manufacturing Information Recording Step R2)

During this step R2, by a time of shipment or delivery to a customer the identifying information, for example, the manufacturer's serial number and the lot number of the wheel support bearing A and also information in connection with the manufacturing process of the wheel support bearing A are recorded on the IC tag 9E affixed to the wheel support bearing A in accordance with the database 70. The manufacturing information so recorded also include information on processing conditions of at least one of the forging, heat treatment and turning steps for each of the elemental component 95. Since the database 70 is used concurrently, the manufacturing information to be recorded on the IC tag 9E may be limited to only information that is convenient to read out directly from the IC tag 9E. For example, pieces of information concerning the date of manufacture of the wheel support bearing A, the place of manufacture of the wheel support bearing A, the brand of the grease employed therein, the gap size between the elements employed, the term of warranty and handling cautions of the wheel support bearing A are preferably recorded on the IC tag 9E.

(Information Reading and Utilizing Step R3)

During this step, at an arbitrarily chosen time subsequent to the shipment, the information recorded on the IC tag 9E is read out and one of confirmation of the purchased material, confirmation of the manufacturing process, confirmation of the processing condition information thereof, confirmation of the result of examination and others is carried out making reference to the information so read out or to information obtained by collating the information so read out with the database 70. Other utilizations recorded on the IC tag 9E and the database 70 may be carried out.

Even in this control method, during the information reading and utilizing step R1 taking place at any desired time subsequent to the shipment, one of the pieces of the processing condition information, such as the forging stage, the heat treatment stage, the turning stage and others, can be confirmed. Because of this, the technical analysis or the like can be carried out easily even in the case of the wheel support bearing A which requires a severe quality and precision. Also, since the IC tag 9E affixed to the wheel support bearing A contains the identifying information and, also, the database 70 contains the various pieces of information in correspondence with the identifying information, many of the pieces of information can be extracted from the database 70 with no need to rely on the limited storage capacity of the IC tag 9E. The capacity of the memory built in the IC tag 9E, which is left unoccupied, can be used for the maintenance of the various histories subsequent to the shipment and/or subsequent to the delivery to the customer or the like. The details of the foregoing control method and the details of the database 70 will be described later with particular reference to FIG. 30 and the subsequent drawings.

In any one of the foregoing embodiments, collection of the various pieces of the manufacturing information to be recorded during the manufacturing information recording step R2 may be carried out by recording them in a time-of-manufacture control database 71 and subsequently recording them on the IC tag 9E affixed to the wheel support bearing A or, alternatively, recording them in a different IC tag 9F for use during the manufacture, which is different from the IC tag 9E affixed to the wheel support bearing A. The IC tag 9F for use during the manufacture is employed in the form of an RFID based IC tag or the like as is the case with the IC tag 9E affixed to the wheel support bearing A, but as compared with the IC tag 9E affixed to the wheel support bearing A, the tag of a large size in shape and dimension can be employed.

A method of recording in the time-of-manufacture control database 71 includes a step of recording in the time-of-manufacture control database 71, the manufacturing information on the manufacturing process including the purchase of material, the forging step, the heat treatment step, the grinding step and the examination step for the elemental components 95 of the wheel support bearing A, which has been associated with the lot number of the elemental components 95 or the identifying number for each of the elemental components 95, and a step of recording the information so recorded in the IC tag 9E affixed to the wheel support bearing A. It is to be noted that the time-of-manufacture control database 71 is provided in one or a plurality of computers (not shown) linked to, for example, a computer network.

Figure 30:
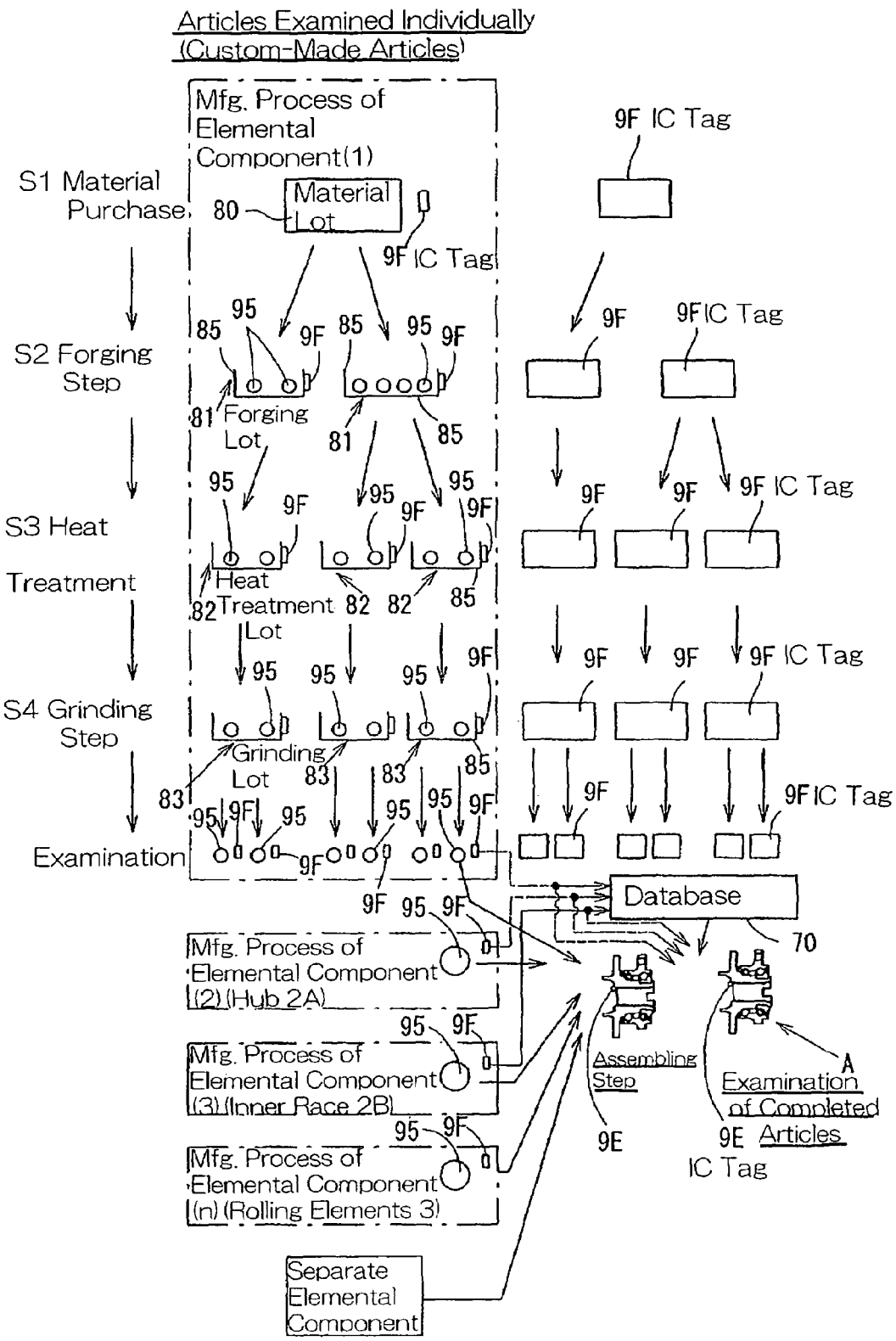
FIG. 30 is an explanatory diagram associated with the control of an elemental component in the quality control method for the wheel support bearing in FIG. 28.

While a method of utilizing the IC tag 9F for use during the manufacture will be described later with reference to FIG. 30 and the subsequent drawings, it can be summarized as follows. This method includes a step of recording the manufacturing information on a manufacturing process, including the purchase of material, the forging step, the heat treatment step, the grinding step and the examination step for the elemental components 95 of the wheel support bearing A, on the IC tag 9F provided for each of the lot numbers of the elemental components 95, at each stage of the manufacturing process, and a step of reading the recorded information and then recording portion or the whole of the information so read out on the IC tag 9E affixed to the wheel support bearing A. The manufacturing information to be recorded on the IC tag 9F for use during the manufacture includes processing condition information on at least one of the forging step, the heat treatment step and the grinding step.

Figure 31:
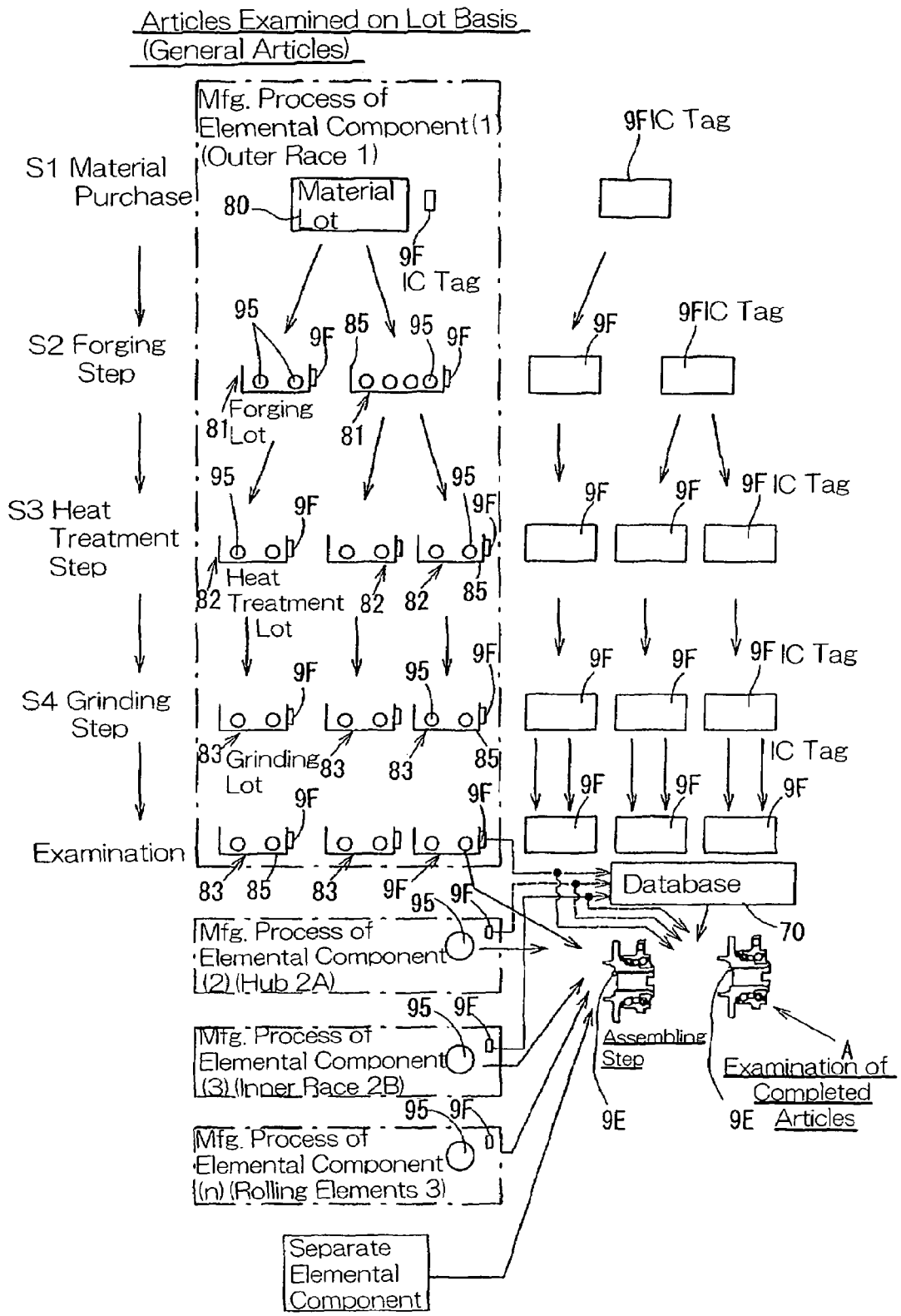
FIG. 31 is an explanatory diagram associated with an alternative control of the elemental component in the quality control method for the wheel support bearing in FIG. 28.

A method of utilizing the IC tag 9F for use during the manufacture may vary depending on whether the wheel support bearing A is individually examined such as is the case with the custom-made product or whether the wheel support bearing is examined on a lot basis such as is the case with general products. In general, examination on a lot basis is employed. FIG. 30 illustrates the case with the individually examined products (custom-made products) whereas FIG. 31 illustrates the case with the products examined on the lot basis (general products). Since the individually examined products (custom-made products) and the product examined on the lot basis are substantially identical with each other, except that they are different from each other in respect of whether the examination after the grinding step and also after the assemblage is carried out individually or on the lot basis, the individually examined products (custom-made products) will first be described and, as to the products examined on the lot basis, only the difference from the individually examined products (custom-made products) will be described subsequently.

The wheel support bearing A subject to the control by this quality control method is made by assembling different kinds of elemental components 95 ((1) to (n), (wherein n represents a natural number)), each of which has been manufactured sequentially through the material purchase step S1, the forging step S2, the heat treatment step S3 and the grinding step S4. The elemental components 95 ((1) to (n)) referred to above may, in the case of the wheel support bearing A of the inner race rotating type as shown in FIG. 14, represent an outer race 1, a hub 2A, an inner race 2B, and rolling elements 3, respectively. The elemental components 95 ((1) to (n)) referred to above may, in the case of the wheel support bearing A of the outer race rotating type as shown in FIG. 27, represent an outer race 31A, an inner race 32C, and rolling elements 33A, respectively.

The wheel support bearing A may include elemental components 96 different from the elemental components 95 that are manufactured through the material purchasing step S1 to the grinding step S4 by way of the forging step S2 and the heat treatment step S3. The different elemental components include the retainer 4 (FIG. 14), the seals 7, 8 or the like. In the case of the wheel support bearing A having the sensor incorporated therein such as in the example of FIG. 20, the sensor 48 and the other sensor associated component parts will represent the above mentioned different elemental components 96.

The flow from the material purchasing step S1 to the grinding step S4 by way of the forging step S2 and the heat treatment step S4 represent broadly divided sections of the flow from purchase of material to completion of the elemental components and each of those steps may be made up of a plurality of substeps or each step may include a step not included within the specific nomenclature. The nomenclatures used to denote the steps S1 to S4 are representative of the divided process steps.

This control method employs the following stages (1) to (4) for each of the elemental components 95 ((1) to (n)), but employs such stages as will be described later for the wheel support bearing A made up of the elemental components 95. It is to be noted that although the lots in each of the stages may separate from each other at the site downstream of the manufacturing line, they are not combined.

(1) Control Stage During Material Purchase (S1)

At the time of purchase of the material for each of the elemental components 95 the lot number of the material for each of the elemental components 95 and information concerning the purchased material are recorded on each of the IC tags 9F prepared for each of the material lots 80.

(2) Control Stage During Forging Step (S2)

The IC tags 9F for each of the material lots 80, or the IC tags 9F succeeding the information recorded on the IC tags 9F for each of the material lots 80 are separately prepared for each of forging lots 81, and the forging lot number for the corresponding forging lot 81 and information that can be obtained during the forging step are subsequently recorded on those IC tags 9F.

(3) Control Stage During Heat Treatment Step (S3)

The IC tags 9F for each of the forging lots 81, or the IC tags 9F succeeding the information recorded on the IC tags 9F for each of the forging lots 81 are separately prepared for each of heat treatment lots 82, and the heat treatment lot number for the corresponding heat treatment lot 82 and information that can be obtained during the heat treatment step are subsequently recorded in those IC tags 9F.

(4) Control Stage During Grinding Step (S4) and Subsequent Examination Step

The IC tags 9F for each of the heat treatment lots 82, or the IC tags 9F succeeding the information recorded on the IC tags 9F for each of heat treatment lots 82 are separately prepared for each of the grinding lots 83, on which the processing conditions for the corresponding grinding lot 83 are recorded. Also, the IC tags 9F for each of the grinding lots 83, or the IC tags 9F succeeding the information recorded on the IC tags 9F for each of grinding lots 83 are separately prepared for each of the elemental components 95 or a set of the elemental components 95 of the same kind, which provides a unit of examination, and the corresponding grinding lot number and information obtained during the examining step are recorded on those IC tags 9F.

To each of the wheel support bearings A that are made up of the elemental components 95 ((1) to (n)), the IC tags 9E, which may be used after the completion, are affixed during a period prior to the assemblage and after the assemblage, and, of the manufacturing number unique to the individual wheel support bearing A and the information recorded on the IC tag 9F after the step of examination of each of the elemental components 95 ((1) to (n)) used to form the wheel support bearing A, at least the manufacturing number is recorded on the IC tag 9E so affixed to the wheel support bearing A. In correspondence with the manufacturing number, the information recorded on the IC tag 9F after the step of examination of each of the elemental components 95 ((1) to (n)) used to form the wheel support bearing A and the information on examination after the completion of the wheel support bearing A are recorded in the database 70.

The IC tag 9F employed during each of the steps (S1) to (S4) may be identical throughout those steps, or different IC tags 9F may be employed during those steps, respectively, and the information recorded on the IC tag 9F used during the preceding step may be transcribed. Where the lots separate from each other during a step at a downstream side, a new IC tag 9F may be prepared, on which the information recorded during the preceding step may be transcribed or, alternatively, while the IC tags 9F may be prepared in a number equal to the number of lots that may separate, so that information can be additionally recorded on the same IC tag 9F throughout the process.

Figure 32:
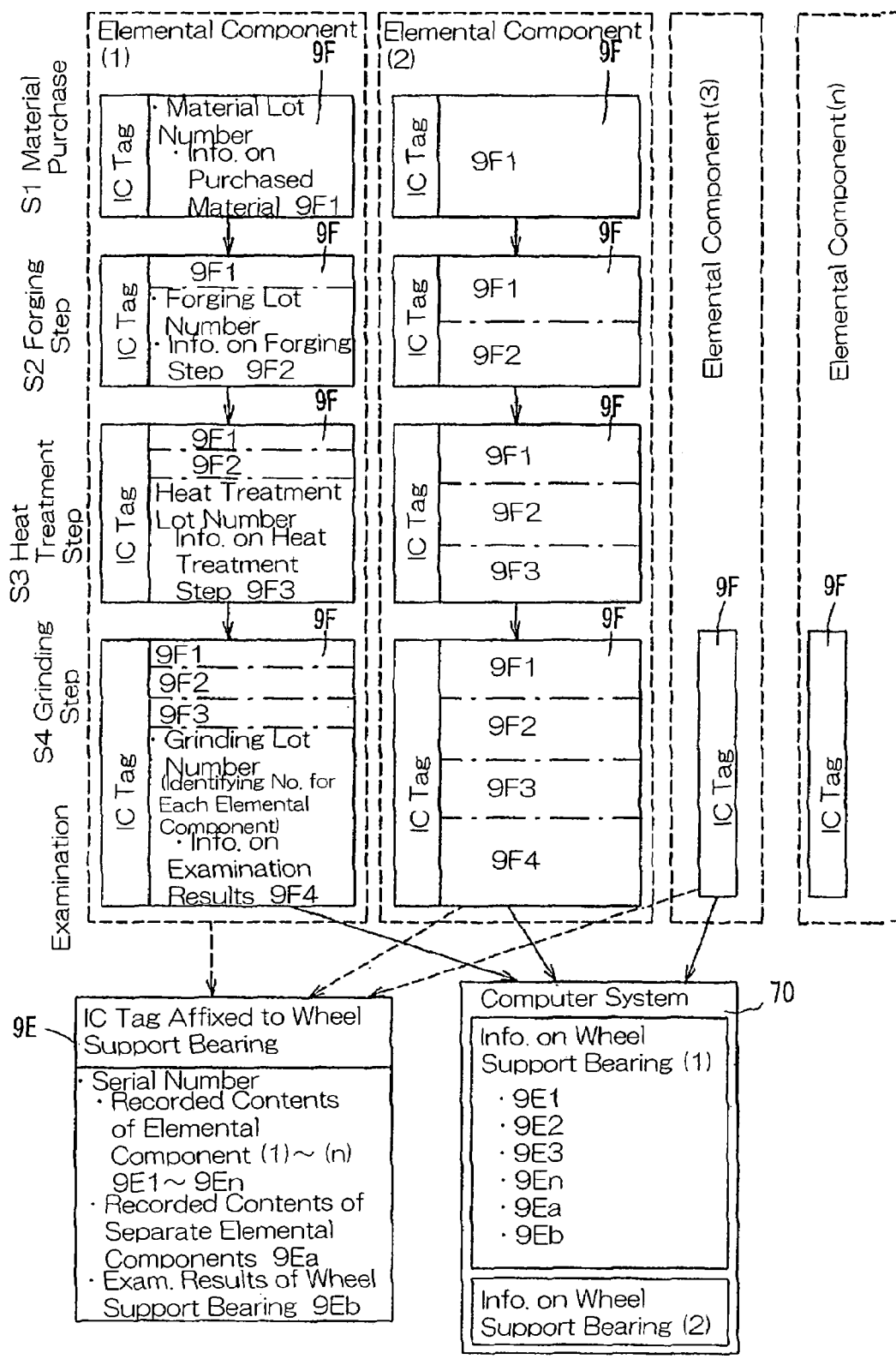
FIG. 32 is an explanatory diagram showing a change in recorded content of each of the IC tags.

In each of the steps (S1) to (S4), the lot number and the information on the respective step both recorded on the IC tag 9F will be supplemented as shown in FIG. 32 for each of those steps.

In each of the steps, the IC tag 9F is affixed to, for example, a transport container 85 accommodating therein the elemental components 95. The container 85 may be, for example, a cage, box or pallet. In such case, the IC tag 9F may be attached directly to the container 85 or may be affixed to a visual identifying tag 86 affixed to the container 85. Also, affixation of the IC tag 9F may be removably attached. When the IC tag 9F is so affixed to the container 85, the IC tag 9F prepared for each lot can be moved at all times together with the elemental components 95 and the IC tag 9F can be handled easily. In addition, recording of the information on the IC tag 9F may be carried out along a path of transport 87 of the elemental components 95 by means of, for example, a conveyor.

The details of each of the foregoing control stages will now be described.

(1) Control Stage at the Time of Purchase of Material

The material is generally purchased in the form of steel ingots, steel plates, steel tubes, steel wires or the like. The materials so purchased are quality examined, for example, for each of lots thereof. Information on the purchased material that is recorded on the IC tag 9F at this control stage can be classified into information on the origin and information on the quality. The origin information is descriptive of the name of a selling company, the place of a factory of such selling company and so on. The quality information is descriptive of the hardness of texture, inclusions of non-metallic material and so on. This quality information is such that although the results of examination of the materials conducted after the purchase of the materials are recorded on the IC tag 9F, the information obtained from the selling company can be recorded, or the both may be recorded. A method of recording the information on the IC tag 9F in this control stage may be such as to record the information made available from, for example, a purchase control computer (not shown) on the IC tag 9F by means of a recording terminal.

(2) Control Stage at the Forging Step (S2)

Figure 35:
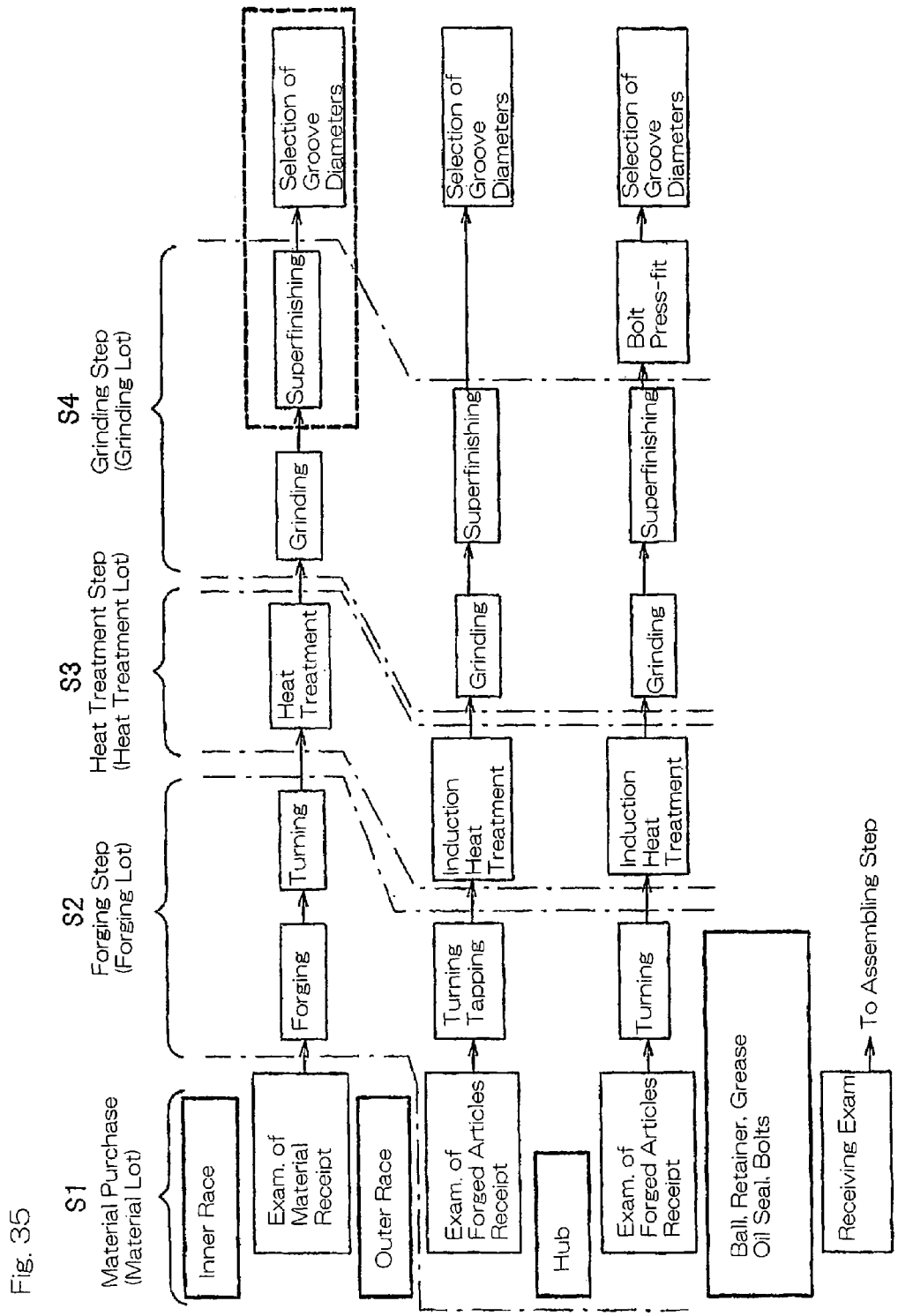
FIG. 35 is an explanatory diagram of a process of making each of the elemental components of the wheel support bearing.

The forging step (S2) varies depending on the kind of the wheel support bearing A and/or the kind of each of the elemental components 95. FIG. 35 illustrates the manufacturing process for manufacturing the elemental components 95 of the wheel support bearing A. In the case of the elemental components 95 being an inner race and an outer race, respectively, or in the case of the elemental component 95 being a hub, the forging step (S2) includes forging the inner races, the outer races and the hubs to a predetermined rough shape and turning the forged products. In the case of the elemental components 95 being rolling elements such as, for example, steel balls, the forging step (S2) includes closed die forging, brushing and polishing (polishing before heat treatment).

Figure 36:
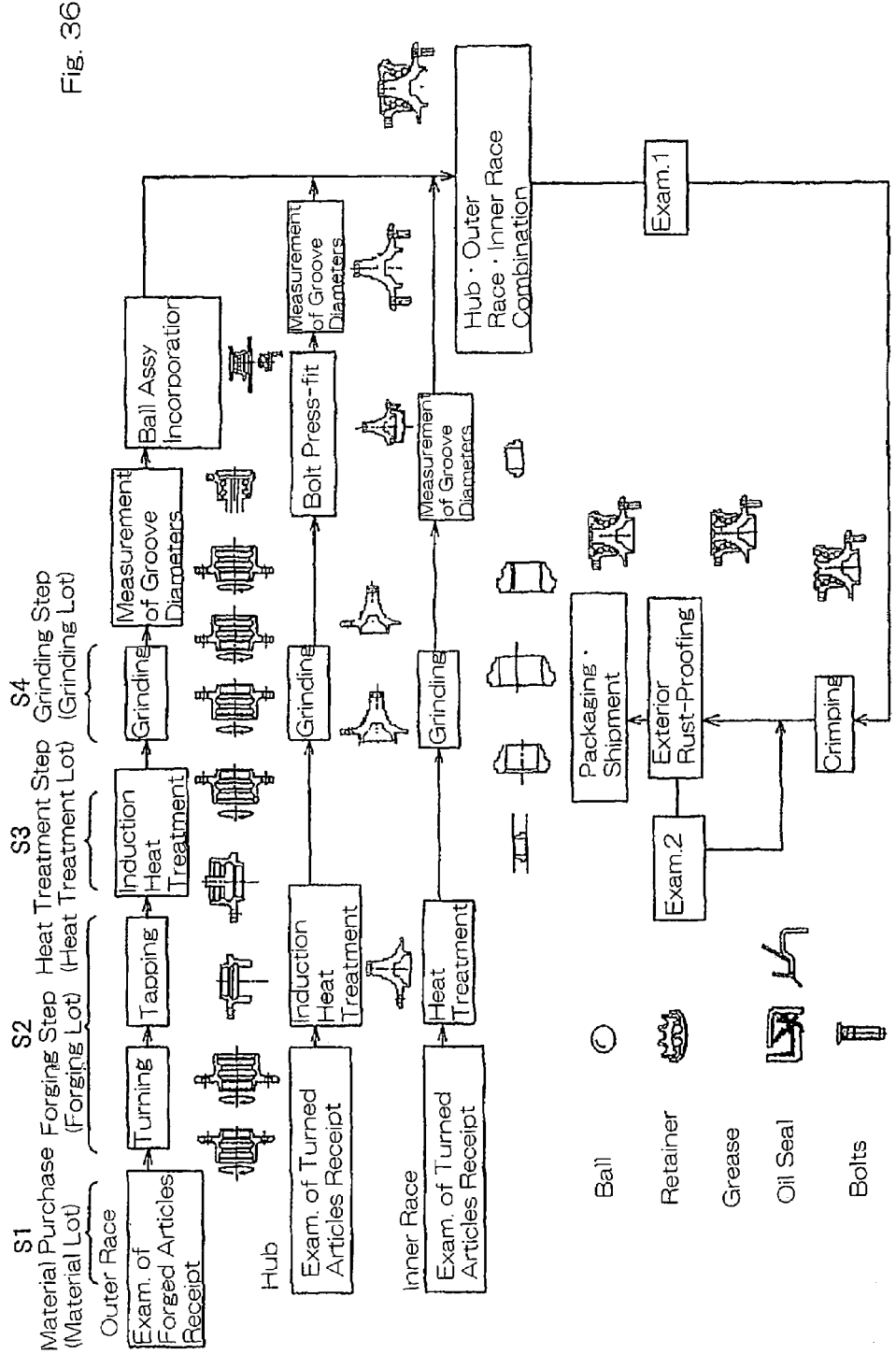
FIG. 36 is an explanatory diagram showing a different process of making each of the elemental components for the wheel support bearing.
Figure 37:
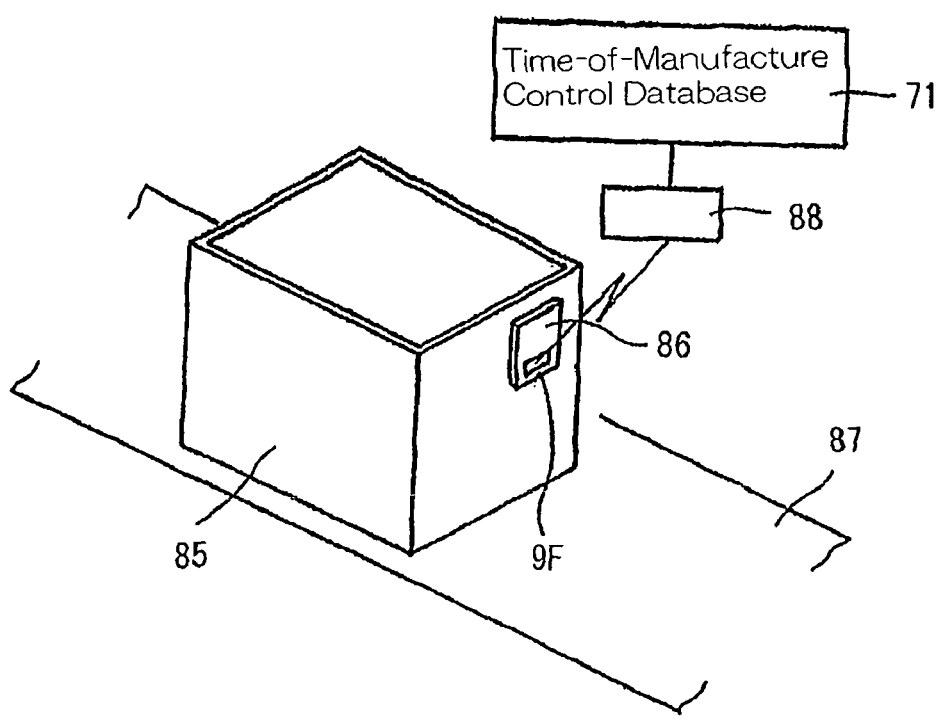

It is to be noted that in the example shown in FIG. 35, there is shown a case, in which the outer race and the hub are received as forged at other business establishments and are subsequently processed. In the example shown in FIG. 36, there is shown a case, in which the hub and the inner race are received as turned. Thus, it may occur that the manufacturing factory of the wheel support bearing may receive the material and other things having been processed to a certain extent, at each of the various stages. In the case where they are received as forged or turned, the manufacturing information is obtained from the manufacturer, where the forged products or the turned products are manufactured, and is then recorded subsequently in the IC tags 9E and 9F and the databases 70 and 71. The manufacturing information in this case may include the place of origin information and the quality information and the quality information may include information on dimensions after turning in the case of the turned products.

Recording of the information on the IC tag 9F in the forging step (S2) may be carried either out all at a time for the entire process of the forging step (S2), or on a piecemeal basis for each of substeps of the forging step (S2). By way of example, if the elemental components 95 are an inner race, an outer race or a hub and if forging and turning are carried out, information on the width, inner diameter, groove size and chamfering size all measured after the turning is recorded on the IC tag 9F. If the elemental components 2 are rolling elements, and if although in the examples shown in FIGS. 35 and 36, they are received as completed products, they are manufactured using the raw material, information on the size, strain and appearance after the closed die forging is recorded and, also, information on size, roundness and appearance measured after the brushing and also after the polishing (polishing before heat treatment) is recorded. Processing condition information is also recorded.

Figure 33:
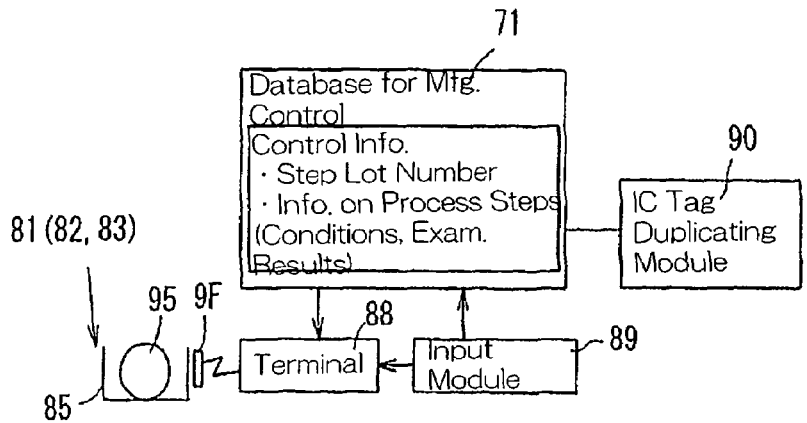
FIG. 33 is a conceptual explanatory diagram showing the manner of recording in the IC tag during a process of making the elemental component.

The method of recording the information on the IC tag 9F during this stage is carried out through a terminal 88 by means of the time-of-manufacture control database 71 (FIG. 33) such as, for example, for the process control or the examination control that is used for each step including, for example, the forging step (S2). With respect to the information required to be manually inputted by an operator, it is recorded directly from the terminal 88 or through the time-of-manufacture control database 71 by way of an input module 89 such as, for example, a keyboard.

Where the number of the forging lots 81 becomes greater than the material lots 80 in the preceding step, new IC tags 9F are made available, on which the information recorded on the IC tags 9F for the material lots 80 is then transcribed using an IC tag duplicating module 90, and the information on the forging step is thus recorded on the IC tags 9F having the information transcribed thereon. Even in each of the subsequent steps, the procedure similar to the foregoing is employed to transcribe the information onto the new IC tags 9F where the number of lots increases.

(3) Control Stage at Heat Treatment Step (S3)

When the heat treatment is carried out, examination takes place subsequently. In the case where the elemental components 95 are an inner race, an outer race or a hub, the hardness, the deformation, the texture and so on are tested. In the case where the elemental components 95 are rolling elements, the hardness, the texture and so on are tested. Information on the heat treatment includes results of those tests which are recorded. Other than this information, heat treatment conditions and others may be recorded.

(4) Control Stage at Grinding Step (S4) and Subsequent Examination Step

The grinding step (S4) may takes any of various forms depending on the kind of the wheel support bearing and the kind of the elemental components 95 used therein. Where the elemental components 95 are an inner race, an outer race or a hub, the machining step (S4) may include one or some of end face grinding, outer diameter grinding, groove grinding, inner diameter grinding, groove superfinishing and such others. On the other hand, where the elemental components 95 are rolling elements, one or some of rough polishing, medium polishing, fine polishing, lapping and such others are performed. In those steps, articles of manufacture completed in each of those steps are examined. Information recorded on the IC tag 9F includes processing conditions for each of the steps during the grinding step (S4) and the like. The information on those processing conditions may include, for example, the kind of a grinding stone, the grinding speed and others. After completion of the grinding step, examination is conducted, results of which are recorded on the IC tag 9F. Information on the results of the examination may include various dimensions, for example, the size, disparity in width, appearance and others in the case of the end face grinding of the inner or outer race, or the size of the outer diameter, roundness, cylindricality, appearance and others in the case of the outer diameter grinding of the outer race. In the case of the groove grinding of the inner or outer race, it includes the dimension at a portion subjected to the grinding, roundness, radial run-out, axial run-out, difference in groove center and others. In the case of the inner diameter grinding of the inner race, it includes the size of the inner diameter, roundness and others. In the case of the groove superfinishing of the inner or outer race, it includes the appearance and others. Where the elemental components 95 are rolling elements, the information includes the size, roundness and others contained in results of examination after the rough grinding or any other steps during the grinding step (S4), or the appearance, dimensions, roundness, difference in diameter, hardness, acoustic, microscopic test results and others of the elements 95 completed, which are a complete product in the grinding step (S4).

During the grinding step (S4), 100% examination is carried out in the case of the custom-made products and, in the case of the 100% examination, the IC tags 9F are prepared in a number equal to the number of the elemental components 95 and are recorded with such information as the grinding lot number, the individual results of examination and others. In addition to the grinding lot number, the number necessary to identify the individual elemental components 95 may be additionally recorded. In the case where a number of the elemental components 95 are employed for each wheel support bearing A as is the case with the rolling elements or the like, a set of the elemental components 95 used in each wheel support bearing A, or a set of the elemental components 95 used for each row may be considered as a single elemental component 95 and one IC tag 9F is prepared for each of the single elemental component 95, with the information recorded thereon for each set.

Control Stage at Assemblage of Wheel Support Bearing A and Thereafter

The elemental components 95 so manufactured as hereinbefore described are assembled into the wheel support bearing A during the assembling step. During a period prior to the assemblage and subsequent to the assemblage, the IC tag 9E is affixed to the wheel support bearing A. In other words, the IC tag 9E may be affixed either to the elemental components 95 prior to the assemblage or subsequent to the assemblage.

After completion of the assemblage, the wheel support bearing A is examined as a complete product. This examination is carried out after, for example, the IC tag 9E has been attached thereto, but may be carried out before the IC tag 9E is attached, depending on the manner of attaching. Items of examination effected to the complete product includes an inner diameter, outer diameter, end face size, roundness, cylindricality, radial run-out, axial run-out, lateral run-out, gap and other parameters. The examination of the complete product is carried out subject to all of the wheel support bearing A in the case where the custom-made products require the individual examination.

Figure 34:
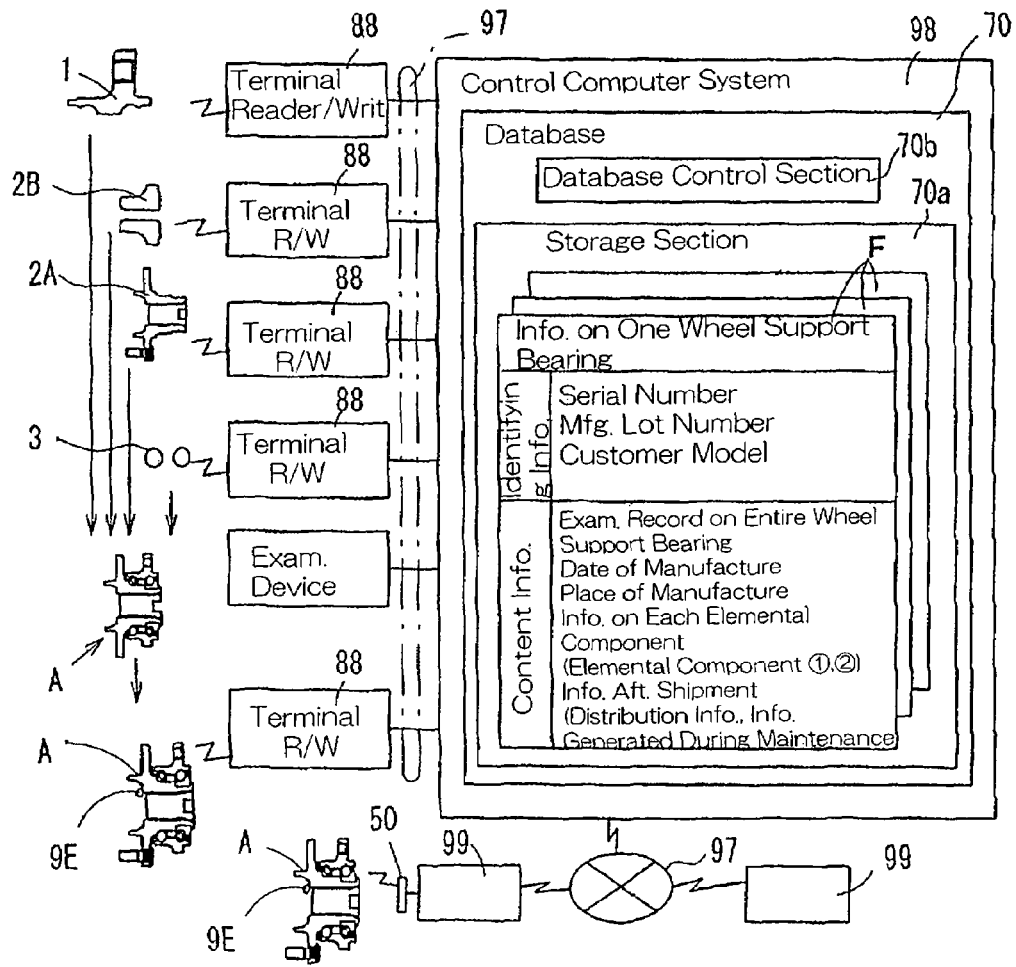
FIG. 34 is an explanatory diagram showing a relation between a database and the IC tag.

During the assemblage of the wheel support bearing A, the information recorded on the IC tag 9F in connection with each of the elemental components 95 forming respective parts of the wheel support bearing A is recorded through the database 70 in correspondence with the manufacturing number as shown in FIG. 34. Also, even the results of examination obtained during the examination of the completed product are recorded in correspondence with the manufacturing number. The manufacturing number is a number unique to the individual wheel support bearing and is represented by, for example, the manufacturer's serial number. Where the wheel support bearing A contains a different elemental component (for example, a retainer) 96 which does not pass through the above described steps, information on this different elemental component 96 is equally recorded in the database 70.

The IC tag 9E affixed to the wheel support bearing A in the manner described above contains at least the above described manufacturing number recorded therein. In addition to the manufacturing number, this IC tag 9E may also contain the information recorded on the IC tag 9F in connection with each of the elemental components 95 and the result of examination of the complete product. Where the result of examination of the completed product is recorded on the IC tag 9E affixed to the wheel support bearing A, the results of examination are recorded on the IC tag 9E during the examining step and such information may be transcribed from the IC tag 9E onto the database 70. Yet, the IC tag 9E may be affixed to not only the wheel support bearing A, but also the packaging container 72 (FIG. 28) for the wheel support bearing A and recorded therein the manufacturing number.

The database 70 is provided in a control computer system 98 placed in the environment of a computer network 97 as shown in FIG. 34. The above described information F associated with each of the wheel support bearings is recorded on a storage unit 70a of this database 70. The computer network 97 referred to above may be a global network such as, for example, Internet or a combination of it with a local area network established within the premises of a factory or plant. The database 70 includes a storage unit 70a and a database control unit 70b operable to control input, output and search with the storage unit 70a. The database 70 may be any type provided that it can be conceptually recognized as a database for the quality control, or may be an aggregation of a physically plurality of databases or a type capable of commonly sharing the information with any database employed for any other purpose. For example, the database 70 may be an aggregation of a plurality of computers distributed in the computer network 97 or may commonly share the information with the time-of-manufacture control database 71 or a database for the control of technical information.

Through the network 97 the database 70 is connected with various information processing instruments installed within the premises of the factory or plant and/or portable or mobile terminals or information processing instruments 99 installed in technical departments, warehouses, business offices, and/or customer's business offices.

According to the foregoing quality control method, since the information on the history from purchase of the material of the elemental components 95 to results of examination of the completed wheel support bearing A is stored in the control computer system 98 and the manufacturing number is recorded on the IC tag 9E affixed to the wheel support bearing, comparison of the manufacturing number with the control computer system 98 makes it possible to control the relation between the history information and the wheel support bearing A on one-to-one basis. By way of example, at any arbitrary stage subsequent to the shipment, the user of the wheel support bearing A or those who conduct maintenance servicing can know the history information on the wheel support bearing. The information generated in each of the manufacturing steps of the elemental components 95 for the wheel support bearing A is recorded on the IC tag 9F, provided on a lot basis for each of the manufacturing steps, together with the lot number and, therefore, the detailed history information can be controlled. Accordingly, the technical analysis and future's countermeasures for improvement can easily be accomplished and lifetime diagnosis and an advance replacement in anticipation of a trouble in the machine can be facilitated.

Since the information for each of the manufacturing steps is recorded on IC tag 9F used for each lot in the respective step, as compared with recording on a check sheet by handwriting, detailed information can be recorded and, since unlike inputting from, for example, the terminal into the computer, it is the IC tag 9F where the information must be inputted, visual recognition is possible, an inputting work is clear and an error will hardly occur. Also, since unlike recording in a computer the various and numerous pieces of information on the manufacturing process at every stage thereof ranging from the purchase of material for the elemental components 95 to the grinding, those piece of the recorded information is carried by the IC tag 9F at each stage of the manufacturing process, the computer is rather less loaded and the control can be facilitated. For this reason, it is possible to achieve an easy control of the detailed information.

Also, since the manufacturing number of the wheel support bearing A is recorded on the IC tag 9E affixed to such wheel support bearing A, the storage area remaining in this IC tag 9E can be used freely and can be used for various applications after the manufacture, for example, shipment control, marketing control, customer control, maintenance control and so on.

Specifically, the wheel support bearing A is, after having been completely assembled, examined and shipped, generally transported to a warehouse and then delivered to a customer, an automotive vehicle manufacturing corporation, through a delivery office as described with reference to FIG. 28. In the case of the custom-made product, they may be delivered directly to the customer after the shipment thereof. The customer will install the wheel support bearing A into an automotive vehicle and then sell it and, on the other hand, the owner, who purchased the automotive vehicle, uses the wheel support bearing A consequent on the use of the automotive vehicle and will eventually dispose of it when the lifetime expires or the like. At every stage, not only can the history information be ascertained by reading the manufacturing number recorded on the IC tag 9E affixed to such wheel support bearing A, but also the storage area left unoccupied in the IC tag 9E can be utilized for any purpose.

In the next place, the case in which the wheel support bearing A is a product to be examined for each of lots such as experienced with general products will be described with particular reference to FIG. 31. This control of the products to be examined lot-by-lot includes the following control stages (1) to (3) and (4') so long as the elemental components 95 ((1) to (n)) are concerned and, so long as the wheel support bearing A assembled with those elemental components 95, it includes control stages as will be described later. The control stages (1) to (3) from purchase to heat treatment previously described in connection with the individually examined products are equally applicable to the lot examined products and, therefore, those control levels (1) to (3) will not be reiterated.

(1) Control Stage at the Time of Purchase of Material (S1):

(2) Control Stage at the Forging Step (S2):

(3) Control Stage at the Heat Treatment Step (S3):

(4') Control Stage at Grinding Step (S4) and Subsequent Examination Step

At the examination step subsequent to the grinding step (S4), the IC tags 9F for each heat treatment lot 82 or the IC tags 9F each succeeding the information recorded on the corresponding IC tag 9F for each heat treatment lot 82, are prepared for each grinding lot 83 and the grinding lot number associated with the grinding lot 83 and information obtained during the examination step are recorded on those IC tags 9F. The process taken during the grinding step (S4) is equally applied not only to the lot examined products, but also the individually examined products. While the information recorded during this control stage (4') is descriptive of results of examination for each grinding lot 83, the same items to be examined are applied to the lot examined products and also to the individually examined products so long as the elemental components 95 are concerned, and accordingly, those results of examination are recorded. Although the items to be examined may be different between the lot examined products and the individually examined products, recording of the results of examination on the IC tags 9F should be identical regardless of the difference in item to be examined.

Assemblage of Wheel Support Bearing A and Subsequent Control Stage

To the wheel support bearings each assembled with the elemental components 95, the IC tags 9E are attached during a period prior to the assemblage and subsequent to the assemblage and, of the manufacturing lot number and the information recorded on the IC tags 9F after the step of examination of the elemental components 95 ((1) to (n)) employed to form the respective wheel support bearing A, at least the manufacturing lot number is recorded on each of those IC tags 9E affixed to the respective wheel support bearings A and, also, the information recorded on each of the IC tags 9F after the step of examination of the elemental components 95 ((1) to (n)) used to form the respective wheel support bearings A and the information on examination of the wheel support bearings A after the completion of the latter are recorded in the database 70 in correspondence with the manufacturing lot number referred to above.

It is to be noted that the control of the lot examined product is substantially similar to the contents previously described in connection with the individually examined products, unless otherwise specified.

In the case of this control method, it will be the control of the wheel support bearings A for each manufacturing lot, will not be a one-to-one control, but effects and advantages similar to those of the individually examined products described in connection with the quality control method of the previously described first wheel support bearings A can be obtained as far as the other matters are concerned. Comparison to the control computer system 98 is made using the lot number obtained from the IC tags 9E affixed to the respective wheel support bearings A.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A wheel support bearing device, which is for rotatably supporting a wheel relative to an automotive vehicle body and which comprises an outer member having an inner periphery formed with double rows of rolling surfaces, an inner member having rolling surfaces opposed to the rolling surfaces, and double rows of rolling elements interposed between the opposed rolling surfaces of the outer and inner members, comprising:

an IC tag affixed to a wheel support bearing, which IC tag is capable of conducting a contactless communication and capable of storing information concerning a control or a status of use, wherein the IC tag is a sensor incorporated IC tag integrated with or electrically connected with a sensor for detecting an object to be detected of the wheel support bearing device, and is inputted with a detection signal of the sensor through an input channel separate from a contactless communicating channel, and wherein the sensor incorporated IC tag is provided with an electric power supply circuit utilizing an electric power, acquired through a contactless communication of the IC tag as an electric drive power, and a sensor input processing module operable, when an electric operating power of a value higher than a predetermined value is available, to capture an input of the sensor to perform a predetermined storage process and wherein an electric power supply module for supplying an electric power to the IC tag through the contactless communication at all times or when a predetermined condition is satisfied is provided in the wheel support bearing device or an automotive vehicle, on which the wheel support bearing device is mounted.

2. The wheel support bearing device as claimed in claim 1, wherein the sensor comprises a coil and the sensor incorporated IC tag is affixed to one of the outer member and the inner member and a magnet is provided in the other of the outer member and the inner member and capable of moving past the sensor by a relative rotation of the inner and outer members, the IC tag utilizing an output of the coil as an electric power source.

3. The wheel support bearing device as claimed in claim 2, wherein the sensor incorporated IC tag is provided with a counting module for storing in a memory within the IC tag, a count of signals of the sensor when the magnet passes.

4. The wheel support bearing device as claimed in claim 2, wherein the sensor incorporated IC tag is provided with module for converting the signal of the sensor into a rotational speed when the magnet passes and for recording it in the IC tag.

5. The wheel support bearing device as claimed in claim 2, further comprising a seal for sealing an end portion of a bearing space delimited between the outer member and the inner member, the seal being a combination type seal including a sealing element, fitted to one of the outer member and the inner member, and a sealing element fitted to the other of the outer member and the inner member, and wherein the sensor incorporated IC tag is affixed to one of the sealing elements and the magnet is fitted to the other of the sealing elements.

6. The wheel support bearing device as claimed in claim 1, wherein the sensor is a temperature sensor.

7. The wheel support bearing device as claimed in claim 1, wherein the sensor is a strain sensor and one of the outer member and the inner member has a wheel mounting flange and wherein the sensor incorporated IC tag is affixed to a root portion of a wheel mounting flange of such one of the outer member and the inner member.

8. The wheel support bearing device as claimed in claim 1, wherein the sensor is a strain sensor and one of the outer member and the inner member has a flange, to which the wheel and a brake rotor are fitted and wherein the sensor incorporated IC tag is fitted having been positioned within a range from a generally intermediate portion of the flange in a radial direction to an outer diametric end thereof.

9. The wheel support bearing device as claimed in claim 1, further comprising seals for sealing respective ends of a bearing space delimited between the outer member and the inner member and wherein the sensor incorporated IC tag is arranged between the seals and the rolling surfaces and the sensor of the sensor incorporated IC tag is a water detecting sensor.

10. The wheel support bearing device as claimed in claim 1, wherein a sensor unit for detecting an object to be detected of the wheel support bearing device is fitted, the IC tag having an external input terminal capable of accomplishing a contactless communication and having an input terminal separate from a contactless communication channel is provided and a signal line of the sensor unit is connected with the input terminal of the IC tag.

11. A quality control method for a wheel support bearing, which using the wheel support bearing device as defined in claim 1, a predetermined information associated with the wheel support bearing is recorded and controlled.

12. The quality control method for the wheel support bearing as claimed in claim 11, which comprises a step of fitting the IC tag to the wheel support bearing, a step of recording a predetermined information on the IC tag fitted to the wheel support bearing, and a utilizing step of reading information recorded on the IC tag at any arbitrary time subsequent to shipment and confirming the predetermined information from the information read therefrom.

13. The quality control method for the wheel support bearing as claimed in claim 12, wherein reading of the IC tag during the utilizing step is carried out by a use of a tag reader while the wheel support bearing remains mounted on an automotive vehicle and wherein a determination of whether or not the bearing is a predetermined object to be inspected is carried out in the reading of the IC tag during the utilizing step by means of an information processing module integrated with the tab reader or an information processing module connected with the tag reader by means of a wired connection or a wireless connection.

14. The quality control method for the wheel support bearing as claimed in claim 12, wherein the IC tag is fitted to a plurality of elemental components forming the wheel support bearing and a manufacturing information on each of the elemental components fitted to the respective IC tag is recorded in each of the IC tags.

15. The quality control method for the wheel support bearing as claimed in claim 12, wherein, during an inspection of the sensor, information on the wheel support bearing is recorded on a sensor associated component part.

16. The quality control method for the wheel support bearing as claimed in claim 11, further comprising a step of fitting the IC tag to one of a plurality of elemental components, forming the wheel support bearing, to the wheel support bearing;
   a step of recording on the IC tag fitted to the wheel support bearing, information concerning a manufacturing process of the wheel support bearing; and
   a step of reading information, recorded on the IC tag, at any arbitrary time subsequent to shipment, and confirming a predetermined information from the information read therefrom.

17. The quality control method for the wheel support bearing as claimed in claim 16, wherein of the plural elemental components, the IC tag is fitted to a non-machine finished surface of a forging subsequent to completion of the forging and a manufacturing information of each of manufacturing steps of the forging subsequent to the forging is recorded during each of those manufacturing steps.

18. The quality control method for the wheel support bearing as claimed in claim 17, wherein as each of the manufacturing steps subsequent to the casing, a heat treatment step, a turning step and a grinding step are included.

19. The quality control method for the wheel support bearing as claimed in claim 11, which utilizes a database having recorded therein, a predetermined manufacturing information on the wheel support bearing is stored in association with an identifying information on the wheel support bearing, contents of which are extractable by the identifying information, and the IC tag, said method comprising:
   a step of fitting the IC tag to the wheel support bearing to one of a plurality of elemental components forming the wheel support bearing;
   a step of recording in the IC tag by a time of shipment or delivery to a customer in accordance with the database, an identifying information on the wheel support bearing and, also, information in connection with the manufacturing process of the wheel support bearing;
   a utilizing step of reading information, recorded on the IC tag and confirming the information in connection with the manufacturing process from the information read from the IC tag or by referring the information so read to the database at any arbitrary time subsequent to shipment.

20. The quality control method for the wheel support bearing as claimed in claim 11, which utilizes a database having recorded therein, a predetermined manufacturing information, contents of which are extractable, and the IC tag, said method comprising:
   a step of fitting the IC tag to one of a plurality of elemental components forming the wheel support bearing;
   a step of writing a predetermined shipment information on the wheel support bearing in the IC tag, fitted to the wheel support bearing, in accordance with the database; and
   a utilizing step of reading information recorded on the IC tag and confirming the information on the wheel support bearing from the information read from the IC tag or by referring the information so read to the database at any arbitrary time subsequent to shipment.

21. The quality control method for the wheel support bearing as claimed in claim 20, wherein the predetermined shipment information on the wheel support bearing, which is written in the IC tag, includes an identifying information on the wheel support bearing and wherein the database stores a predetermined manufacturing information concerning the wheel support bearing in association with the identifying information on the wheel support bearing and having recorded contents that are extractable by the identifying information.

22. The quality control method for the wheel support bearing as claimed in claim 20, wherein as the predetermined shipment information on the wheel support bearing that is to be written in the IC tag, information on a date of manufacture is included.

23. The quality control method for the wheel support bearing as claimed in claim 20, wherein as the predetermined shipment information on the wheel support bearing that is to be written in the IC tag, information on a place of manufacture is included.

24. The quality control method for the wheel support bearing as claimed in claim 11, wherein using the IC tag, the wheel support bearing is controlled by recording a predetermined manufacturing information concerning a process flow, associated with the wheel support bearing, from purchase of material to a step of examination through at least one of forging and turning steps, a heat treatment step and a grinding step, which method comprises:
   a step of attaching the IC tag to one of elemental components forming the wheel support bearing during a manufacture of the wheel support bearing or at a time of completion of manufacture thereof;
   a step of recording in the IC tag affixed to the wheel support bearing at least one of processing condition information on at least one of the manufacturing steps and material information for the wheel support bearing by a time of shipment or delivery to a customer; and
   an information reading and utilizing step of reading the information recorded in the IC tag and confirming the at least one of the processing condition information and the material information from the information read from the IC tag at an arbitrary time subsequent to shipment.

25. The quality control method for the wheel support bearing as claimed in claim 11, wherein the wheel support bearing is controlled using a database, in which a predetermined manufacturing information concerning a process flow ranging from purchase of material for the wheel support bearing to a step of examination through at least one of forging and turning steps, a heat treatment step and a grinding step, in association with an identifying information, is stored, stored contents of which are capable of being extracted therefrom by the identifying information, and the IC tag, said method comprising:
   a step of attaching the IC tag to one of elemental components forming the wheel support bearing at a time of manufacture of the wheel support bearing or at a time of completion of manufacture thereof;
   a step of recording in the IC tag affixed to the wheel support bearing by a time of shipment or delivery to a customer in accordance with the database, an identifying information on the wheel support bearing and, also, at least one of processing condition manufacturing information on at least one of the steps of the process flow and material information; and
   an information reading and utilizing step of performing one of a confirmation of purchased material, manufacturing steps, at least one of the processing condition information and material information, and results of examination, at an arbitrary time subsequent to shipment from information obtained by reading the information recorded in the IC tag or from information obtained by referring the information read from the IC tag to the database.

26. The quality control method for the wheel support bearing as claimed in claim 11, wherein the wheel support bearing is controlled using a database, in which a predetermined manufacturing information concerning a process flow ranging from purchase of material for the wheel support bearing to a step of examination through at least one of forging and turning steps, a heat treatment step and a grinding step, in association with an identifying information, is stored, stored contents of which are extractable therefrom by the identifying information, and the IC tag, said method comprising:

a step of attaching the IC tag to one of elemental components forming the wheel support bearing at a time of manufacture of the wheel support bearing or at a time of completion of manufacture thereof;

a step of recording in the IC tag affixed to the wheel support bearing by a time of shipment or delivery to a customer in accordance with the database, information on at least one of a date of manufacture, a place of manufacture, a brand of a grease filled, a gap between elemental components, a term of warranty, and handing precautions of the wheel support bearing; and an information reading and utilizing step of performing one of a confirmation of purchased material, manufacturing steps, at least one of the processing condition information and material information, and results of examination, at an arbitrary time subsequent to shipment from information obtained by reading the information recorded in the IC tag or from information obtained by referring the information read from the IC tag to the database.

27. The quality control method for the wheel support bearing as claimed in claim 24, further comprising a recording, for each process step, in the IC tag for the manufacturing process, that is prepared for each of lot numbers of the elemental components, a predetermined manufacturing information concerning a process flow ranging from purchase of material for the elemental components, associated with the wheel support bearing, to the grinding step through at least one of forging and turning steps, the heat treatment step, and a step of recording in the IC tag affixed to the wheel support bearing, a portion or whole of information read from the recorded information, and wherein as the manufacturing information to be recorded in the IC tag for the manufacturing process, at least one of processing condition information on at least one of the process steps and material information.

28. The quality control method for the wheel support bearing as claimed in claim 24, further comprising a step of recording a predetermined manufacturing information concerning a process flow ranging from purchase of material for the elemental components of the wheel support bearing to the step of examination through at least one of forging and turning steps, the heat treatment step and the grinding step, in a time-of-manufacture control database in association with a lot number of the elemental components or an identifying number of the individual elemental components, and a step of recording the recorded information in the IC tag affixed to the mechanical elemental component.

29. The quality control method for the wheel support bearing as claimed in claim 11, wherein wheel support bearings are assembled with a plurality of elemental components that are manufactured through a process flow ranging from purchase of material to a grinding step through a forging and turning step, which is at least one of forging and turning steps, and a heat treatment step, and are individually examined, said method comprising, with respect to each of the elemental components:

a step of recording in the IC tag, prepared for each material lot, at a time of purchase of material for each of elemental components, a material lot number of the corresponding material lot and information concerning purchased material;

a step of preparing, during a forging and tuning step, the IC tag for each material lot or an IC tag succeeding the information recorded in the IC tag for each material lot, for each of forging and turning lots, and recording in those IC tags, the forging and turning lot number and information obtained from the forging and turning step in connection with the corresponding forging and turning lot;

a step of preparing, during a heat treatment step, an IC tag for each forging and turning lot or an IC tag succeeding the information recorded in the IC tag for each forging and turning lot for each heat treatment lot, and recording in those IC tags, a heat treatment lot number and information obtained from a heat treatment step in connection with the corresponding heat treatment lot;

a step of preparing, during a step of examination subsequent to the grinding step, an IC tag for each heat treatment lot or a an IC tag succeeding the information recorded in the IC tag for each heat treatment lot, for each of elemental components or each set of the elemental components of the same kind, which forms each unit of examination, and recording in those IC tags, a corresponding grinding lot number and information obtained from the step of examination; and a step fitting the IC tag to each of wheel support bearings, assembled with the elemental components, during a period prior to assemblage and subsequent to the assemblage, recording in the IC tag affixed to the wheel support bearing, at least a manufacturer's serial number out from a manufacturer's serial number unique to the individual wheel support bearing and the information recorded in the IC tag subsequent to the step of examination of the elemental components used in the wheel support bearing, and recording in a database in correspondence with the manufacturer's serial number, the information recorded in the IC tag subsequent to the step of examination in connection with each elemental component used in the wheel support bearing and information on the examination subsequent to completion of the wheel support bearing.

30. The quality control method for the wheel support bearing as claimed in claim 29, wherein the IC tag prepared for each material lot, the IC tag prepared for each forging and turning lot and the IC tag prepared for each heat treatment lot are affixed to containers accommodating therein a plurality of materials of the same material lot, containers accommodating therein the elemental components of the same forging and turning lot, and containers accommodating therein the elemental components of the same heat treatment lot, respectively.

31. The quality control method for the wheel support bearing as claimed in claim 29, wherein the wheel support bearing includes elemental components separate from the elemental components manufactured through a process flow ranging from purchase of material to a grinding step by way of a forging and turning step and a heat treatment step, and information on those separate elemental components is recorded in the database subsequent to assemblage of the wheel support bearing in correspondence with the manufacturer's serial number or the lot number.

32. The quality control method for the wheel support bearing as claimed in claim 11, wherein the wheel support bearing is assembled with a plurality of elemental components manufactured through a process flow ranging from purchase of material to a grinding step through a forging and turning step, which is at least one of forging and turning steps, and a heat treatment step, and is examined for each lot, said method comprising, with respect to each of the elemental components:
- a step of recording in the IC tag, prepared for each material lot, at a time of purchase of material for each elemental component, a material lot number of the corresponding material lot and information in connection with purchased material;
- a step of preparing, during the forging and turning step, an IC tag for each material lot or an IC tag succeeding the information recorded in the IC tag for each material lot, for each of forging and turning lots, and recording in those IC tags, the forging and turning lot number and information obtained from the forging and turning step in connection with the corresponding forging and turning lot;
- a step of preparing, during the heat treatment step, an IC tag for each forging and turning lot or an IC tag succeeding the information recorded in the IC tag for each forging and turning lot for each heat treatment lot, and recording in those IC tags, a heat treatment lot number and information obtained from the heat treatment step in connection with the corresponding heat treatment lot;
- a step of preparing, during an step of examination subsequent to the grinding step, an IC tag for each heat treatment lot or an IC tag succeeding the information recorded in the IC tag for each heat treatment lot for each grinding step and recording in those IC tags, a grinding lot number of the corresponding grinding lot and information obtained from the step of examination; and
- a step of fitting the IC tag to the wheel support bearing, assembled with the elemental components, during a period prior to assemblage and subsequent to the assemblage, recording in the IC tag affixed to the wheel support bearing, at least a manufacturing lot number out of a manufacturing lot number and the information recorded in the IC tag subsequent to the step of examination of the elemental components used in the wheel support bearing, and recording in a database in correspondence with the manufacturing lot number, the information recorded in the IC tag subsequent to the step of examination in connection with each elemental component, used in the wheel support bearing and information on the examination subsequent to completion of the wheel support bearing.

33. The quality control method for the wheel support bearing as claimed in claim 11, wherein as an elemental component manufactured through a process flow, for the wheel support bearing, ranging from purchase of material to a grinding step by way of at least one of forging and turning steps and a heat treatment step, an outer race, an inner race, rolling elements and, selectively, a hub are included.

34. The quality control method for the wheel support bearing as claimed in claim 11, wherein the wheel support bearing has a grease filled therein during assemblage thereof and the IC tag affixed to the wheel support bearing is recorded with a date of assemblage of the wheel support bearing.

35. The quality control method for the wheel support bearing as claimed in claim 11, wherein the IC tag affixed to the wheel support bearing is recorded with information on whereabouts of the wheel support bearing starting from shipment of the wheel support bearing to delivery thereof to a customer.

\* \* \* \* \*